US012466840B2

(12) United States Patent
Kawamura et al.

(10) Patent No.: US 12,466,840 B2
(45) Date of Patent: Nov. 11, 2025

(54) SMALL MOLECULE INHIBITORS OF KRAS PROTEINS

(71) Applicant: Merck Sharp & Dohme LLC, Rahway, NJ (US)

(72) Inventors: Shuhei Kawamura, Cambridge, MA (US); Yu Kobayakawa, Ibaraki (JP); Tsuyoshi Oshima, Ibaraki (JP); Takao Uno, Ibaraki (JP); Patrick Schöpf, London (GB)

(73) Assignee: Merck Sharp & Dohme LLC, Rahway, NJ (US)

( * ) Notice: Subject to any disclaimer, the term of this patent is extended or adjusted under 35 U.S.C. 154(b) by 0 days.

(21) Appl. No.: 18/920,212

(22) Filed: Oct. 18, 2024

(65) Prior Publication Data
US 2025/0136615 A1 May 1, 2025

Related U.S. Application Data

(60) Provisional application No. 63/680,205, filed on Aug. 7, 2024, provisional application No. 63/638,789, filed on Apr. 25, 2024, provisional application No. 63/591,871, filed on Oct. 20, 2023.

(51) Int. Cl.
C07D 498/22 (2006.01)
A61K 31/553 (2006.01)
A61K 45/06 (2006.01)
A61P 35/00 (2006.01)
C07D 519/00 (2006.01)

(52) U.S. Cl.
CPC .......... C07D 498/22 (2013.01); A61K 31/553 (2013.01); A61K 45/06 (2013.01); A61P 35/00 (2018.01); C07D 519/00 (2013.01)

(58) Field of Classification Search
None
See application file for complete search history.

(56) References Cited

U.S. PATENT DOCUMENTS

| 4,034,075 | A  | 7/1977  | Bays et al. |
| 9,840,516 | B2 | 12/2017 | Li et al. |
| 10,125,134 | B2 | 11/2018 | Blake et al. |
| 10,144,724 | B2 | 12/2018 | Li et al. |
| 10,556,906 | B2 | 2/2020 | Kuramoto et al. |
| 10,662,204 | B2 | 5/2020 | Planken et al. |
| 10,988,485 | B2 | 4/2021 | Minatti et al. |
| 11,045,484 | B2 | 6/2021 | Wurz et al. |
| 11,090,304 | B2 | 8/2021 | Allen et al. |
| 11,096,939 | B2 | 8/2021 | Booker et al. |
| 11,299,491 | B2 | 4/2022 | Parsons et al. |
| 11,453,683 | B1 | 9/2022 | Wang et al. |
| 11,459,327 | B1 | 10/2022 | Lv et al. |
| 11,530,218 | B2 | 12/2022 | Zhao et al. |
| 11,697,657 | B2 | 7/2023 | Bharathan et al. |
| 11,932,633 | B2 | 3/2024 | Marx et al. |
| 12,208,099 | B2 | 1/2025 | Aranda et al. |
| 2006/0135532 | A1 | 6/2006 | Bryant et al. |
| 2010/0331305 | A1 | 12/2010 | Bergeron et al. |
| 2014/0275070 | A1 | 9/2014 | Grembecka et al. |
| 2014/0288045 | A1 | 9/2014 | Ren et al. |
| 2014/0371203 | A1 | 12/2014 | Madge et al. |
| 2015/0176010 | A1 | 6/2015 | Wersinger |
| 2015/0239900 | A1 | 8/2015 | Li et al. |
| 2015/0246934 | A1 | 9/2015 | Bensen et al. |
| 2016/0046647 | A1 | 2/2016 | Grembecka et al. |
| 2016/0108019 | A1 | 4/2016 | Li et al. |
| 2016/0137665 | A1 | 5/2016 | Grembecka et al. |
| 2016/0152634 | A1 | 6/2016 | Madge et al. |
| 2016/0159738 | A1 | 6/2016 | Ren et al. |
| 2016/0297774 | A1 | 10/2016 | Li et al. |
| 2016/0318866 | A1 | 11/2016 | Becker-Pelster et al. |
| 2017/0131278 | A1 | 5/2017 | Patricelli et al. |
| 2017/0197945 | A1 | 7/2017 | Li et al. |
| 2017/0253611 | A1 | 9/2017 | Grembecka et al. |
| 2018/0072723 | A1 | 3/2018 | Blake et al. |
| 2018/0118757 | A1 | 5/2018 | Li et al. |
| 2018/0127396 | A1 | 5/2018 | Li et al. |
| 2018/0141927 | A1 | 5/2018 | Li et al. |

(Continued)

FOREIGN PATENT DOCUMENTS

| CN | 104011054 A | 8/2014 |
| CN | 107556289 A | 1/2018 |

(Continued)

OTHER PUBLICATIONS

Wang et.al. (2023, Annual review of KRAS inhibitors in 2022, European Journal of Medicinal Chemistry, 249, 1-14) (Year: 2023).*
D.S. Hong, et al., "KRASG12C Inhibition with Sotorasib in Advanced Solid Tumors", The New England Journal of Medicine, vol. 383 No. 13 pp. 1207-1217 (2020).
D. Gentile, et al., "Ras Binder Induces a Modified Switch-II Pocket in GTP and GDP States", Cell Chemical Biology, 24, pp. 1455-1466 (2017).
D. Kessler, et al, "Drugging an undruggable pocket on KRAS", Proceedings of the National Academy of Sciences (PNAS), vol. 116, No. 32, pp. 15823-15829 (2019).

(Continued)

Primary Examiner — Kortney L. Klinkel
Assistant Examiner — Dawanna Shar-Day White
(74) Attorney, Agent, or Firm — Venable LLP

(57) ABSTRACT

Compounds of Formulae (I)-(VII) or their pharmaceutically acceptable salts can inhibit the G12C, G12D, G12V, and/or G13D mutants of Kirsten rat sarcoma (KRAS) protein and are expected to have utility as therapeutic agents, for example, for treating cancer. The disclosure also provides pharmaceutical compositions which comprise compounds of Formulae (I)-(VII) or pharmaceutically acceptable salts thereof. The disclosure also relates to methods for use of the compounds or their pharmaceutically acceptable salts in the therapy and prophylaxis of cancer and for preparing pharmaceuticals for this purpose.

28 Claims, 3 Drawing Sheets
Specification includes a Sequence Listing.

(56) References Cited

U.S. PATENT DOCUMENTS

| | | |
|---|---|---|
| 2018/0162812 A1 | 6/2018 | Ren et al. |
| 2018/0177767 A1 | 6/2018 | Lanman et al. |
| 2018/0334454 A1 | 11/2018 | Lanman et al. |
| 2019/0062313 A1 | 2/2019 | Li et al. |
| 2019/0062330 A1 | 2/2019 | Blake et al. |
| 2019/0127336 A1 | 5/2019 | Li et al. |
| 2019/0144444 A1 | 5/2019 | Blake et al. |
| 2019/0233440 A1 | 8/2019 | Planken et al. |
| 2019/0248767 A1 | 8/2019 | Planken et al. |
| 2019/0270743 A1 | 9/2019 | Marx et al. |
| 2019/0276432 A1 | 9/2019 | Beaumont et al. |
| 2019/0284144 A1 | 9/2019 | Li et al. |
| 2019/0292182 A1 | 9/2019 | Kuramoto et al. |
| 2019/0343838 A1 | 11/2019 | Allen et al. |
| 2019/0374542 A1 | 12/2019 | Allen et al. |
| 2019/0375749 A1 | 12/2019 | Chen et al. |
| 2020/0055845 A1 | 2/2020 | Lanman et al. |
| 2020/0069657 A1 | 3/2020 | Lanman et al. |
| 2020/0115363 A1 | 4/2020 | Li et al. |
| 2020/0115375 A1 | 4/2020 | Barda et al. |
| 2020/0140437 A1 | 5/2020 | Kuramoto et al. |
| 2020/0165231 A1 | 5/2020 | Shin et al. |
| 2020/0181118 A1 | 6/2020 | Malhotra et al. |
| 2020/0237771 A1 | 7/2020 | Hallur et al. |
| 2020/0262837 A1 | 8/2020 | Marx et al. |
| 2020/0289503 A1 | 9/2020 | Huang |
| 2020/0331911 A1 | 10/2020 | Marx et al. |
| 2021/0009577 A1 | 1/2021 | Lanman et al. |
| 2021/0024501 A1 | 1/2021 | Li et al. |
| 2021/0040089 A1 | 2/2021 | Gao et al. |
| 2021/0047297 A1 | 2/2021 | Schulze et al. |
| 2021/0122764 A1 | 4/2021 | Bharathan et al. |
| 2021/0395234 A1 | 12/2021 | Sakamoto et al. |
| 2022/0064141 A1 | 3/2022 | Fang et al. |
| 2022/0298174 A1 | 9/2022 | Guo et al. |
| 2022/0315597 A1 | 10/2022 | Su et al. |
| 2022/0315598 A1 | 10/2022 | Xu et al. |
| 2022/0370416 A1 | 11/2022 | Chu et al. |
| 2022/0389029 A1 | 12/2022 | Guo et al. |
| 2022/0402916 A1 | 12/2022 | Hoover et al. |
| 2023/0023023 A1 | 1/2023 | Shibata et al. |
| 2023/0049402 A1 | 2/2023 | Sakamoto et al. |
| 2023/0174518 A1 | 6/2023 | Kawai |
| 2023/0181536 A1 | 6/2023 | Abe et al. |
| 2023/0348495 A1 | 11/2023 | Kawai et al. |
| 2023/0416266 A1 | 12/2023 | Han et al. |
| 2024/0043448 A1 | 2/2024 | Bharathan et al. |
| 2024/0083913 A1 | 3/2024 | Bharathan et al. |
| 2024/0124478 A1 | 4/2024 | Han et al. |
| 2024/0174691 A1 | 5/2024 | Jiang et al. |
| 2024/0239788 A1 | 7/2024 | Sloman et al. |
| 2024/0246968 A1 | 7/2024 | Shibata et al. |
| 2024/0262842 A1 | 8/2024 | Shibata et al. |
| 2024/0317759 A1 | 9/2024 | Kobayakawa et al. |
| 2024/0376123 A1 | 11/2024 | Zhou et al. |
| 2024/0417408 A1 | 12/2024 | Shibata et al. |

FOREIGN PATENT DOCUMENTS

| | | |
|---|---|---|
| CN | 109843856 A | 6/2019 |
| CN | 112390788 A1 | 2/2021 |
| CN | 112430234 A | 3/2021 |
| CN | 114615981 A | 6/2022 |
| EP | 3871673 A1 | 9/2021 |
| EP | 4053120 A1 | 9/2022 |
| EP | 4397664 A1 | 10/2024 |
| JP | 2016-519072 A | 6/2016 |
| JP | 2016-532656 A | 10/2016 |
| JP | 2017-528498 A | 9/2017 |
| WO | 03/037898 A1 | 5/2003 |
| WO | 2005/019177 A1 | 3/2005 |
| WO | 2009/114575 A1 | 9/2009 |
| WO | 2010/064705 A1 | 6/2010 |
| WO | 2013/072694 A1 | 5/2013 |
| WO | 2014/043272 A1 | 3/2014 |
| WO | 2014/143659 A1 | 9/2014 |
| WO | 2014/152588 A1 | 9/2014 |
| WO | 2014/164543 A1 | 10/2014 |
| WO | 2015/054572 A1 | 4/2015 |
| WO | 2015/091415 A1 | 6/2015 |
| WO | 2015/131005 A1 | 9/2015 |
| WO | 2016/029454 A1 | 3/2016 |
| WO | 2016/044772 A1 | 3/2016 |
| WO | 2016/049524 A1 | 3/2016 |
| WO | 2016/049565 A1 | 3/2016 |
| WO | 2016/049568 A1 | 3/2016 |
| WO | 2016/164675 A1 | 10/2016 |
| WO | 2016/168540 A1 | 10/2016 |
| WO | 2017/015562 A1 | 1/2017 |
| WO | 2017/058728 A1 | 4/2017 |
| WO | 2017/058768 A1 | 4/2017 |
| WO | 2017/058792 A1 | 4/2017 |
| WO | 2017/058805 A1 | 4/2017 |
| WO | 2017/058807 A1 | 4/2017 |
| WO | 2017/058902 A1 | 4/2017 |
| WO | 2017/058915 A1 | 4/2017 |
| WO | 2017/070256 A2 | 4/2017 |
| WO | 2017/087528 A1 | 5/2017 |
| WO | 2017/100546 A1 | 6/2017 |
| WO | 2017/172979 A1 | 10/2017 |
| WO | 2017/201161 A1 | 11/2017 |
| WO | 2018/022897 A1 | 2/2018 |
| WO | 2018/064510 A1 | 4/2018 |
| WO | 2018/068017 A1 | 4/2018 |
| WO | 2018/119183 A2 | 6/2018 |
| WO | 2018/140512 A1 | 8/2018 |
| WO | 2018/140513 A1 | 8/2018 |
| WO | 2018/140514 A1 | 8/2018 |
| WO | 2018/140598 A1 | 8/2018 |
| WO | 2018/140599 A1 | 8/2018 |
| WO | 2018/140600 A1 | 8/2018 |
| WO | 2018/143315 A1 | 8/2018 |
| WO | 2018/206539 A1 | 11/2018 |
| WO | 2018/217651 A1 | 11/2018 |
| WO | 2018/218069 A1 | 11/2018 |
| WO | 2018/218070 A2 | 11/2018 |
| WO | 2018/218071 A1 | 11/2018 |
| WO | 2019/051291 A1 | 3/2019 |
| WO | 2019/058132 A1 | 3/2019 |
| WO | 2019/058393 A1 | 3/2019 |
| WO | 2019/077631 A1 | 4/2019 |
| WO | 2019/099524 A1 | 5/2019 |
| WO | 2019/099703 A1 | 5/2019 |
| WO | 2019/110751 A1 | 6/2019 |
| WO | 2019/155399 A1 | 8/2019 |
| WO | 2019/167000 A1 | 9/2019 |
| WO | 2019/185525 A1 | 10/2019 |
| WO | 2019/215203 A1 | 11/2019 |
| WO | 2019213526 | 11/2019 |
| WO | 2019/217307 A1 | 11/2019 |
| WO | 2019/217691 A1 | 11/2019 |
| WO | 2019232419 | 12/2019 |
| WO | 2020/035031 A1 | 2/2020 |
| WO | 2020/041331 A1 | 2/2020 |
| WO | 2020/050890 A2 | 3/2020 |
| WO | 2020047192 A1 | 3/2020 |
| WO | 2020/055755 A1 | 3/2020 |
| WO | 2020/055756 A1 | 3/2020 |
| WO | 2020/055758 A1 | 3/2020 |
| WO | 2020/055760 A1 | 3/2020 |
| WO | 2020/055761 A1 | 3/2020 |
| WO | 2020/085493 A1 | 4/2020 |
| WO | 2020/097537 A2 | 5/2020 |
| WO | 2020/101736 A1 | 5/2020 |
| WO | 2020102730 A1 | 5/2020 |
| WO | 2020/113071 A1 | 6/2020 |
| WO | 2020118066 A1 | 6/2020 |
| WO | 2020/146613 A1 | 7/2020 |
| WO | 2020/156285 A1 | 8/2020 |
| WO | 2020/177629 A1 | 9/2020 |
| WO | 2020/178282 A1 | 9/2020 |
| WO | 2020/221239 A1 | 11/2020 |
| WO | 2020/233592 A1 | 11/2020 |
| WO | 2020/234103 A1 | 11/2020 |

(56) References Cited

FOREIGN PATENT DOCUMENTS

| | | |
|---|---|---|
| WO | 2020/236940 A1 | 11/2020 |
| WO | 2020/238791 A1 | 12/2020 |
| WO | 2020/239077 A1 | 12/2020 |
| WO | 2020/239123 A1 | 12/2020 |
| WO | 2020/244637 A1 | 12/2020 |
| WO | 2020/259432 A1 | 12/2020 |
| WO | 2020/259513 A1 | 12/2020 |
| WO | 2020/259573 A1 | 12/2020 |
| WO | 2021/000885 A1 | 1/2021 |
| WO | 2021/023154 A1 | 2/2021 |
| WO | 2021/027911 A1 | 2/2021 |
| WO | 2021/027943 A1 | 2/2021 |
| WO | 2021/031952 A1 | 2/2021 |
| WO | 2021/037018 A1 | 3/2021 |
| WO | 2021/041671 A1 | 3/2021 |
| WO | 2021/043322 A1 | 3/2021 |
| WO | 2021/052499 A1 | 3/2021 |
| WO | 2021/055728 A1 | 3/2021 |
| WO | 2021/057832 A1 | 4/2021 |
| WO | 2021/058018 A1 | 4/2021 |
| WO | 2021/063346 A1 | 4/2021 |
| WO | 2021/078312 A1 | 4/2021 |
| WO | 2021/081212 A1 | 4/2021 |
| WO | 2021/083167 A1 | 5/2021 |
| WO | 2021/084765 A1 | 5/2021 |
| WO | 2021/085653 A1 | 5/2021 |
| WO | 2021/086833 A1 | 5/2021 |
| WO | 2021/088458 A1 | 5/2021 |
| WO | 2021/093758 A1 | 5/2021 |
| WO | 2021/098859 A1 | 5/2021 |
| WO | 2021/104431 A1 | 6/2021 |
| WO | 2021/106230 A1 | 6/2021 |
| WO | 2021/106231 A1 | 6/2021 |
| WO | 2021/107160 A1 | 6/2021 |
| WO | 2021/109737 A1 | 6/2021 |
| WO | 2021/113595 A1 | 6/2021 |
| WO | 2021/118877 A1 | 6/2021 |
| WO | 2021/121330 A1 | 6/2021 |
| WO | 2021/121367 A1 | 6/2021 |
| WO | 2021/121371 A1 | 6/2021 |
| WO | 2021/124222 A1 | 6/2021 |
| WO | 2021/127404 A1 | 6/2021 |
| WO | 2021/129824 A1 | 7/2021 |
| WO | 2021/147965 A1 | 7/2021 |
| WO | 2021/147967 A1 | 7/2021 |
| WO | 2021142252 A1 | 7/2021 |
| WO | 2021150613 A1 | 7/2021 |
| WO | 2021/215544 A1 | 10/2021 |
| WO | 2021/215545 A1 | 10/2021 |
| WO | 2021211864 A1 | 10/2021 |
| WO | 2021/219072 A1 | 11/2021 |
| WO | 2022015375 A1 | 1/2022 |
| WO | 2022031678 A1 | 2/2022 |
| WO | 2022/066646 A1 | 3/2022 |
| WO | 2022042630 A1 | 3/2022 |
| WO | 2022047260 A1 | 3/2022 |
| WO | 2022061251 A1 | 3/2022 |
| WO | 2022068921 A1 | 4/2022 |
| WO | 2022083569 A1 | 4/2022 |
| WO | 2022087371 A1 | 4/2022 |
| WO | 2022087375 A1 | 4/2022 |
| WO | 2022/105857 A1 | 5/2022 |
| WO | 2022/109485 A1 | 5/2022 |
| WO | 2022/109487 A1 | 5/2022 |
| WO | 2022/132200 A1 | 6/2022 |
| WO | 2022/133038 A1 | 6/2022 |
| WO | 2022/148422 A1 | 7/2022 |
| WO | 2022/173870 A1 | 8/2022 |
| WO | 2022/177917 A2 | 8/2022 |
| WO | 2022187688 A1 | 9/2022 |
| WO | 2022/221739 A1 | 10/2022 |
| WO | 2022002102 A1 | 10/2022 |
| WO | 2022/232318 A1 | 11/2022 |
| WO | 2022/232320 A1 | 11/2022 |
| WO | 2022/250170 A1 | 12/2022 |
| WO | 2022/251576 A1 | 12/2022 |
| WO | 2022/256459 A1 | 12/2022 |
| WO | 2022248885 A1 | 12/2022 |
| WO | 2022258974 A1 | 12/2022 |
| WO | 2022261210 A1 | 12/2022 |
| WO | 2022262686 A1 | 12/2022 |
| WO | 2022266069 A1 | 12/2022 |
| WO | 2022271658 A1 | 12/2022 |
| WO | 2023018699 A1 | 2/2023 |
| WO | 2023018809 A1 | 2/2023 |
| WO | 2023018812 A1 | 2/2023 |
| WO | 2023020518 A1 | 2/2023 |
| WO | 2023020519 A1 | 2/2023 |
| WO | 2023020521 A1 | 2/2023 |
| WO | 2023020523 A1 | 2/2023 |
| WO | 2023/046135 A1 | 3/2023 |
| WO | 2023034290 A1 | 3/2023 |
| WO | 2023049697 A1 | 3/2023 |
| WO | 2023056421 A1 | 4/2023 |
| WO | 2023056951 A1 | 4/2023 |
| WO | 2023060253 A1 | 4/2023 |
| WO | 2023061294 A1 | 4/2023 |
| WO | 2023061463 A1 | 4/2023 |
| WO | 2023064857 A1 | 4/2023 |
| WO | 2023072188 A1 | 5/2023 |
| WO | 2023/097227 A1 | 6/2023 |
| WO | 2023/103523 A1 | 6/2023 |
| WO | 2023098425 A1 | 6/2023 |
| WO | 2023098426 A1 | 6/2023 |
| WO | 2023098832 A1 | 6/2023 |
| WO | 2023099592 A1 | 6/2023 |
| WO | 2023099608 A1 | 6/2023 |
| WO | 2023099612 A1 | 6/2023 |
| WO | 2023099620 A1 | 6/2023 |
| WO | 2023099623 A1 | 6/2023 |
| WO | 2023099624 A1 | 6/2023 |
| WO | 2023101928 A1 | 6/2023 |
| WO | 2023103906 A1 | 6/2023 |
| WO | 2023104018 A1 | 6/2023 |
| WO | 2023105491 A1 | 6/2023 |
| WO | 2023114733 A1 | 6/2023 |
| WO | 2023117681 A1 | 6/2023 |
| WO | 2023122154 A1 | 6/2023 |
| WO | 2023125627 A1 | 7/2023 |
| WO | 2023125989 A1 | 7/2023 |
| WO | 2023133183 A | 7/2023 | |
| WO | WO-2023244615 A1 * | 12/2023 | ........... A61K 31/519 |
| WO | 2024/009191 A1 | 1/2024 |
| WO | 2024/015262 A1 | 1/2024 |
| WO | 2024/032704 A1 | 2/2024 |
| WO | 2024/041573 A1 | 2/2024 |
| WO | 2024/044667 A2 | 2/2024 |
| WO | 2024031088 A1 | 2/2024 |
| WO | 2024/063578 A1 | 3/2024 |
| WO | 2024/083168 A1 | 4/2024 |
| WO | 2024/103010 A1 | 5/2024 |
| WO | 2024/120433 A1 | 6/2024 |
| WO | 2024/209339 A1 | 10/2024 |
| WO | 2024/213979 A1 | 10/2024 |
| WO | 2024/233776 A1 | 11/2024 |
| WO | 2024/238343 A1 | 11/2024 |
| WO | 2025/019819 A1 | 1/2025 |
| WO | 2025/019823 A1 | 1/2025 |

OTHER PUBLICATIONS

Y. Mao, et al., "Design, synthesis and biological evaluation of novel pyrimidine, 3-cyanopyridine and m-amino-N-phenylbenzamide based monocyclic EGFR tyrosine kinase inhibitors", Bioorganic & Medicinal Chemistry, 21, pp. 3090-3104 (2013).

PubChem CID 10121096, PubChem release Jun. 18, 2019, modify date Nov. 21, 2020, retrieved on Feb. 10, 2021 (9 pages).

G. Palfy, et al., "1H, 15N backbone assignment and comparative analysis of the wild type and G12C, G12D, G12V mutants of K-Ras bound to GDP at physiological pH", Biomolecular NMR Assignment, vol. 14, No. 1, pp. 1-7 (2019).

M.R. Janes, et al., "Targeting KRAS Mutant Cancers with a Covalent G12C-Specific Inhibitor", Cell, 172, pp. 578-589 (2018).

(56) References Cited

OTHER PUBLICATIONS

M.P. Patricelli, et al., "Selective Inhibition of Oncogenic KRAS Output with Small Molecules Targeting the Inactive State", Cancer Discovery, 6(3), pp. 316-329 (2016).
H. Chuang, et al., "Pharmacological strategies to target oncogenic KRAS signaling in pancreatic cancer", Pharmacological Research, 117, pp. 370-376 (2017).
Lopez-Tapia, F., et al., "Linker Variation and Structure-Activity Relationship Analyses of Carboxylic Acid-based Small Molecule STAT3 Inhibitors", ACS Med. Chem. Lett. 2018, 9, 250-255.
R.B. Kargbo, "Small Molecule Inhibitors of KRAS G12C Mutant", Acs Med. Chem. Lett., vol. 12, pp. 1210-1211 (2021).
PubChem SID 469710826, available Jul. 28, 2022.
J.G. Kettle, et al., "Structure-Based Design and Pharmacokinetic Optimization of Covalent Allosteric Inhibitors of the Mutant GTPase KRAS G12C", J. Med. Chem., vol. 63, pp. 4468-4483 (2020).
Q. Zheng, et al., "Drugging the Next Undruggable KRAS Allele-Gly12Asp", J. Med. Chem, vol. 65, pp. 3119-3122 (2022).
International Search Report and Written Opinion in international application No. PCT/US2024/051975, dated Jan. 24, 2025 (15 pages).

\* cited by examiner

SMALL MOLECULE INHIBITORS OF KRAS PROTEINS

CROSS REFERENCE TO RELATED APPLICATIONS

This application claims the benefit of U.S. Provisional Application Nos. 63/591,871, filed Oct. 20, 2023, 63/638,789, filed Apr. 25, 2024, and 63/680,205, filed Aug. 7, 2024, the disclosures of which are incorporated herein by reference in their entireties.

REFERENCE TO AN ELECTRONIC SEQUENCE LISTING

The contents of the electronic sequence listing (Sequence Listing 145021.601951_002200.US.xml; Size: 13,921 bytes; and Date of Creation: Oct. 17, 2024) is herein incorporated by reference in its entirety.

FIELD OF THE INVENTION

The present disclosure relates to small molecule inhibitors of KRAS that inhibit, for example, the G12C mutant, G12D mutant, G12V mutant, G13D mutant, and the wild-type (WT) of Kirsten rat sarcoma (KRAS) protein and relates to a pharmaceutical composition comprising a compound of Formulae (I)-(VII) as well as methods of using such a compound for treatment of diseases, including cancers.

BACKGROUND

RAS, which is a small monomeric GTP-binding protein having a molecular weight of about 21 kDa, acts as a molecular on/off switch. RAS can bind to GTP by binding to proteins of a guanine nucleotide exchange factor (GEF) (e.g., SOS1), which forces the release of a bound nucleotide, and releases GDP. When RAS binds to GTP, it becomes activated (turned on) and recruits and activates proteins necessary for the propagation of other receptors' signals, such as c-Raf and PI 3-kinase. RAS also possesses enzymatic activity with which it cleaves the terminal phosphate of the GTP nucleotide and converts the nucleotide into GDP. The rate of conversion is usually slow, but can be dramatically sped up by a protein of the GTPase-activating protein (GAP) class, such as RasGAP. When GTP is converted into GDP, RAS is deactivated (turned off).

The commonly known members of the RAS subfamily include HRAS, KRAS, and NRAS. Of these, mutations of KRAS are observed in many malignant tumors: in 86% of pancreatic ductal adenocarcinoma (PDAC), in 41% of colorectal cancers (CRC), and in 32% of lung adenocarcinoma (LUAD; a subtype of non-small-cell lung cancer (NSCLC)). The mutations often occur in the glycine residue at position 12 of KRAS ("G12"); the mutation at G12 dominates 91% (PDAC), 68% (CRC) and 85% (LUAD) of the total KRAS mutations, respectively. The distributions of amino acid substitutions at G12 vary among each tissue type. The most prevalent mutation in LUAD is the mutation into cysteine ("G12C") (46%), while the predominant mutation in PDAC (45%) and CRC (45%) is the mutation into aspartic acid ("G12D"). The mutation at G12 into valine ("G12V") is observed in a significant portion of G12 mutations in all of PDAC (35%), CRC (30%) and LUAD (23%). (Nature Reviews Drug Discovery, 19, 533-552, 2020).

Intense efforts in developing KRAS-G12C inhibitors are underway. Several covalent inhibitors which focus on the cysteine residue have been reported, and some of them have been subjected to clinical studies, such as AMG510 (NCT03600883), MRTX849 (NCT03785249) and JNJ-74699157 (NCT04006301). However, the KRAS-G12C mutation only accounts for a fraction of all KRAS mutations and is primarily found in LUAD. To effectively inhibit the other commonly-occurring KRAS mutated proteins, such as KRAS-G12D and KRAS-G12V, different approaches are needed as these mutants lack reactive cysteines in the active site (Nature Reviews Drug Discovery, 19, 533-552, 2020).

Studies have also indicated that gene amplification and high expression of WT KRAS in the absence of coding mutations can also occur in certain cancers. These amplifications were observed most frequently in esophageal, gastric and ovarian adenocarcinomas (Nature Medicine, 24, 968-977, 2018). Thus, effective inhibition of WT KRAS could provide a therapeutic benefit to patients suffering from such cancers.

SUMMARY OF THE DISCLOSURE

The present disclosure provides small molecule inhibitors which modulate mutant and WT KRAS proteins and may be valuable pharmaceutically active compounds for the treatment of cancer. In some embodiments the disclosed compounds selectively inhibit the KRAS-G12C, KRAS-G12D and/or KRAS-G12V proteins. The compounds of Formulae (I)-(VII):

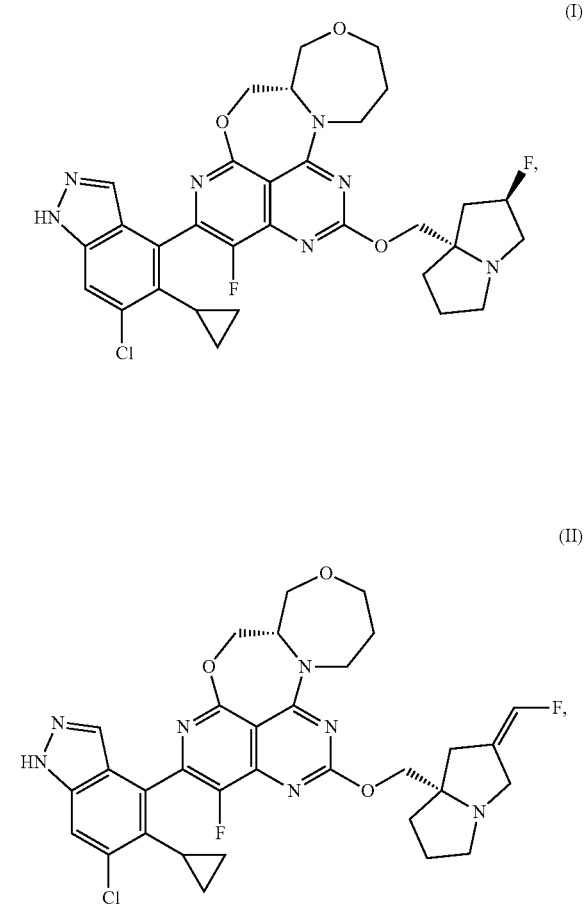

(III)

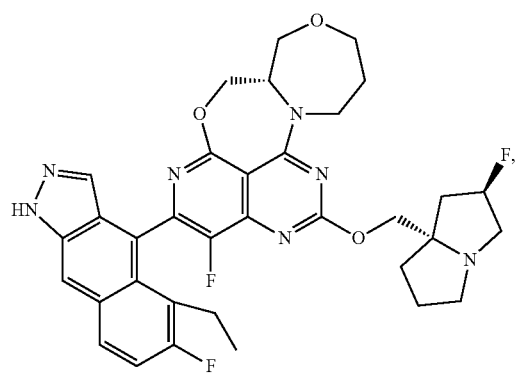

(IV)

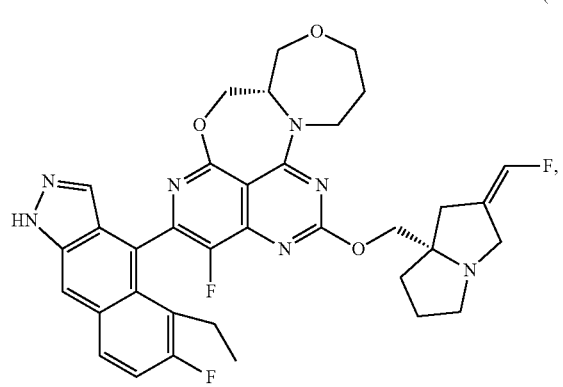

(V)

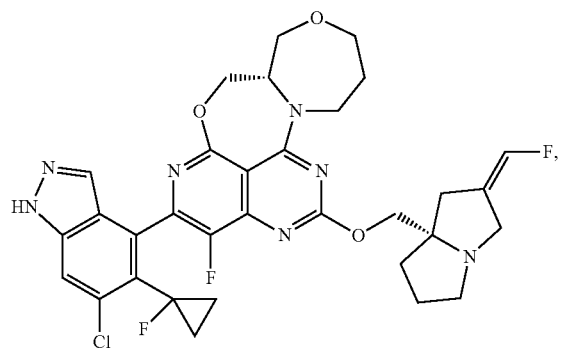

(VI)

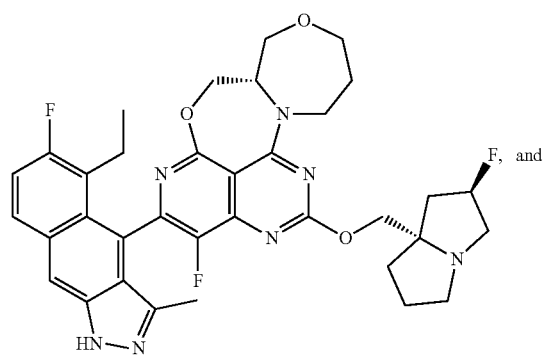 [SMILES: CCc1c(F)ccc2cc3[nH]ncc3c(-c3nc4c5c(nc(OC[C@@]67CCCN6C/C(=C\F)C7)nc5c3F)N3CCCOC[C@H]3CO4)c12], and (VII)

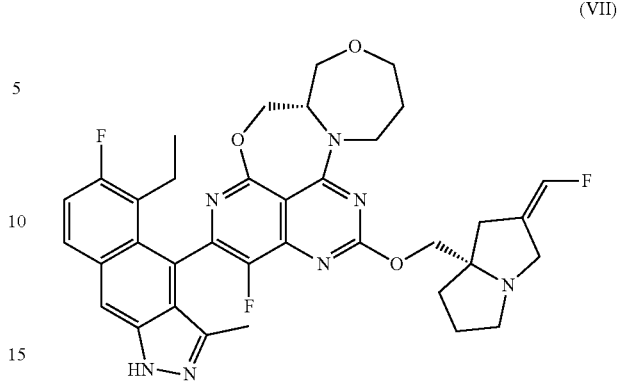

and their pharmaceutically acceptable salts, can modulate the activity of KRAS and thereby affect the signaling pathway which regulates cell growth, differentiation, and proliferation associated with oncological disorders. In certain embodiments, the compounds of Formulae (I)-(VII) can inhibit the KRAS-G12C, KRAS-G12D, KRAS-G12V, KRAS-G13D, and/or WT KRAS proteins. The disclosure furthermore provides processes for preparing compounds of Formulae (I)-(VII), methods for using such compounds to treat oncological disorders, and pharmaceutical compositions which comprise compounds of Formulae (I)-(VII).

The present disclosure also provides small molecule inhibitors which modulate mutant and WT KRAS proteins and may be valuable pharmaceutically active compounds for the treatment of cancer. In some embodiments the disclosed compounds selectively inhibit the KRAS-G12C, KRAS-G12D and/or KRAS-G12V proteins. The compound of Formula (III):

(III)

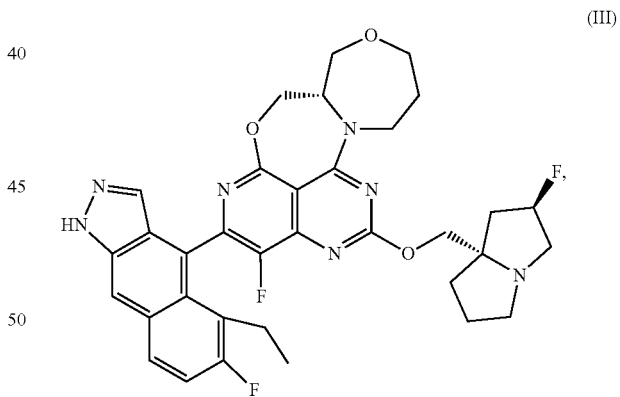

and its pharmaceutically acceptable salt, can modulate the activity of KRAS and thereby affect the signaling pathway which regulates cell growth, differentiation, and proliferation associated with oncological disorders. In certain embodiments, the compound of Formula (III) can inhibit the KRAS-G12C, KRAS-G12D, KRAS-G12V, KRAS-G13D, and/or WT KRAS proteins. The disclosure furthermore provides processes for preparing a compound of Formula (III), methods for using such compound to treat oncological disorders, and pharmaceutical compositions which comprise the compound of Formula (III).

The present disclosure also provides small molecule inhibitors which modulate mutant and WT KRAS proteins and may be valuable pharmaceutically active compounds for the treatment of cancer. In some embodiments the disclosed compounds selectively inhibit the KRAS-G12C, KRAS-G12D and/or KRAS-G12V proteins. The compound of Formula (IV):

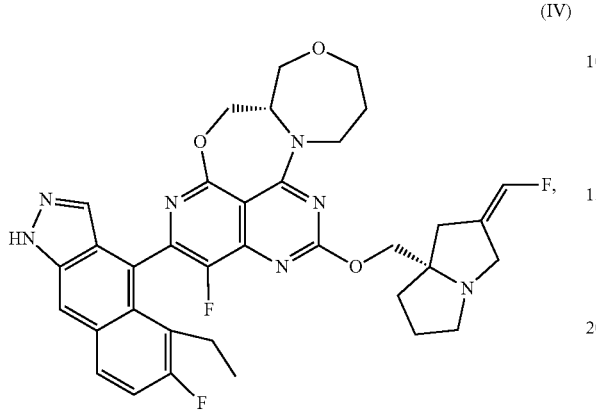

(IV)

and its pharmaceutically acceptable salt, can modulate the activity of KRAS and thereby affect the signaling pathway which regulates cell growth, differentiation, and proliferation associated with oncological disorders. In certain embodiments, the compound of Formula (IV) can inhibit the KRAS-G12C, KRAS-G12D, KRAS-G12V, KRAS-G13D, and/or WT KRAS proteins. The disclosure furthermore provides processes for preparing a compound of Formula (IV), methods for using such compound to treat oncological disorders, and pharmaceutical compositions which comprise the compound of Formula (IV).

The present disclosure also provides small molecule inhibitors which modulate mutant and WT KRAS proteins and may be valuable pharmaceutically active compounds for the treatment of cancer. In some embodiments the disclosed compounds selectively inhibit the KRAS-G12C, KRAS-G12D and/or KRAS-G12V proteins. The compound of Formula (VI):

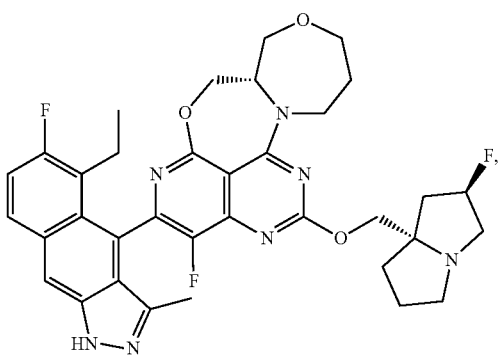

(VI)

and its pharmaceutically acceptable salt, can modulate the activity of KRAS and thereby affect the signaling pathway which regulates cell growth, differentiation, and proliferation associated with oncological disorders. In certain embodiments, the compound of Formula (VI) can inhibit the KRAS-G12C, KRAS-G12D, KRAS-G12V, KRAS-G13D, and/or WT KRAS proteins. The disclosure furthermore provides processes for preparing a compound of Formula (VI), methods for using such compound to treat oncological disorders, and pharmaceutical compositions which comprise the compound of Formula (VI).

The present disclosure also provides small molecule inhibitors which modulate mutant and WT KRAS proteins and may be valuable pharmaceutically active compounds for the treatment of cancer. In some embodiments the disclosed compounds selectively inhibit the KRAS-G12C, KRAS-G12D and/or KRAS-G12V proteins. The compound of Formula (VII):

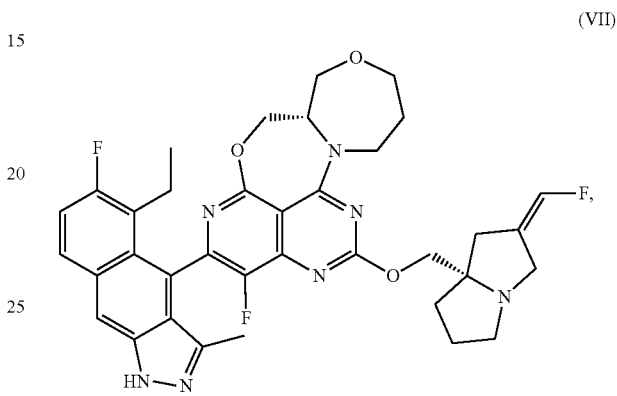

(VII)

and its pharmaceutically acceptable salt, can modulate the activity of KRAS and thereby affect the signaling pathway which regulates cell growth, differentiation, and proliferation associated with oncological disorders. In certain embodiments, the compound of Formula (VII) can inhibit the KRAS-G12C, KRAS-G12D, KRAS-G12V, KRAS-G13D, and/or WT KRAS proteins. The disclosure furthermore provides processes for preparing a compound of Formula (VII), methods for using such compound to treat oncological disorders, and pharmaceutical compositions which comprise the compound of Formula (VII).

DETAILED DESCRIPTION OF THE INVENTION

Compounds of the Disclosure

Figure 1:
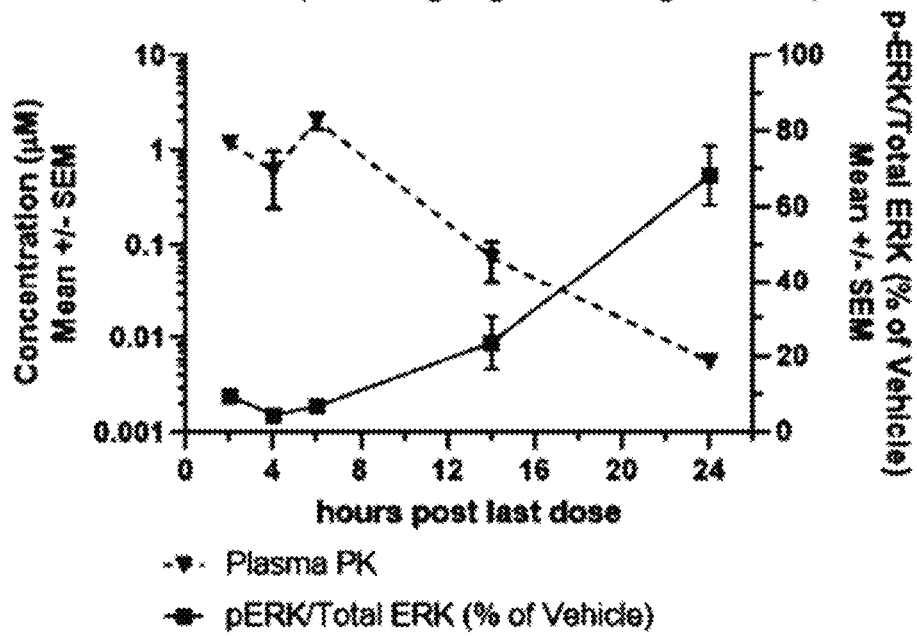
FIG. 1 is a graphical representation showing a PKPD study with respect to Ex-1.

In one embodiment, the present disclosure provides a compound having structural Formulae (I)-(VII), or a pharmaceutically acceptable salt thereof, as shown above, wherein the compound is

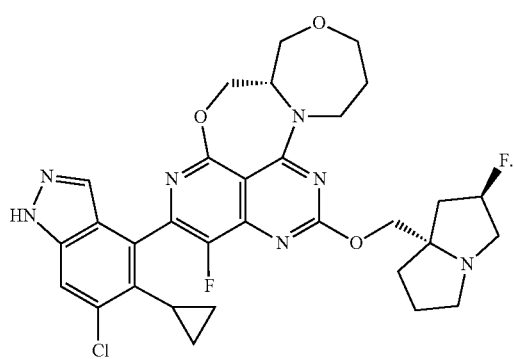

(I)

In one embodiment, the present disclosure provides a compound having structural Formulae (I)-(VII), or a pharmaceutically acceptable salt thereof, as shown above, wherein the compound is

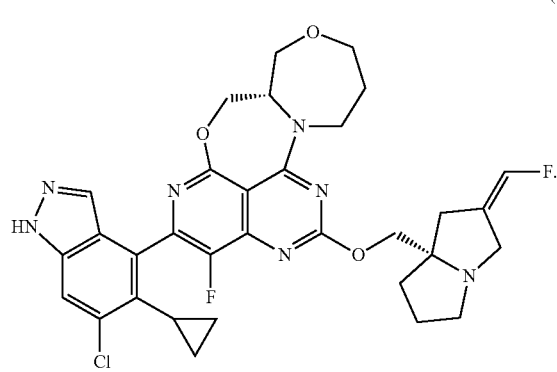

(II)

In one embodiment, the present disclosure provides a compound having structural Formulae (I)-(VII), or a pharmaceutically acceptable salt thereof, as shown above, wherein the compound is

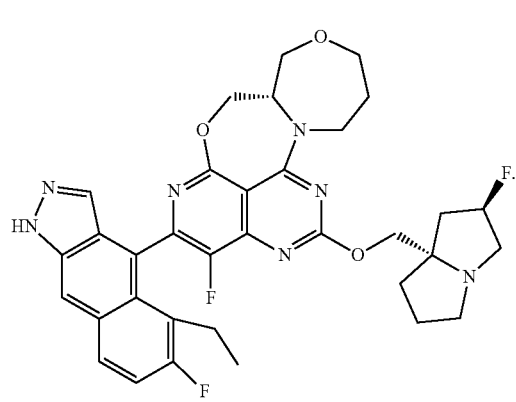

(III)

In one embodiment, the present disclosure provides a compound having structural Formulae (I)-(VII), or a pharmaceutically acceptable salt thereof, as shown above, wherein the compound is

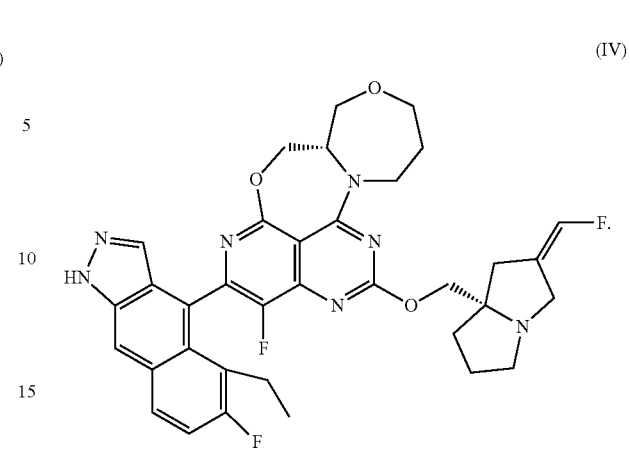

(IV)

In one embodiment, the present disclosure provides a compound having structural Formulae (I)-(VII), or a pharmaceutically acceptable salt thereof, as shown above, wherein the compound is

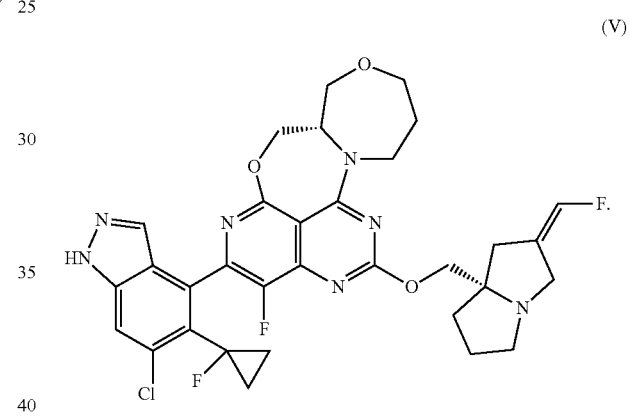

(V)

In one embodiment, the present disclosure provides a compound having structural Formulae (I)-(VII), or a pharmaceutically acceptable salt thereof, as shown above, wherein the compound is

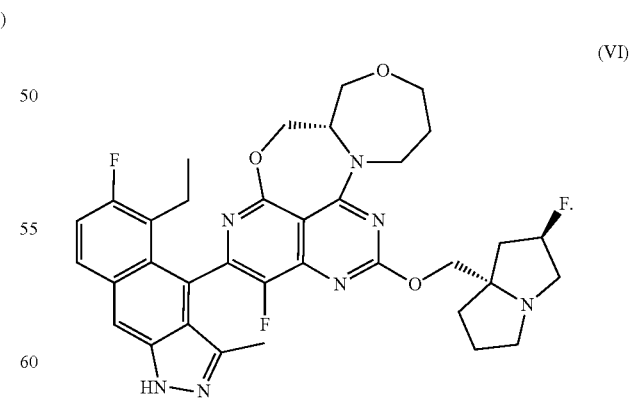

(VI)

In one embodiment, the present disclosure provides a compound having structural Formulae (I)-(VII), or a pharmaceutically acceptable salt thereof, as shown above, wherein the compound is (VII)

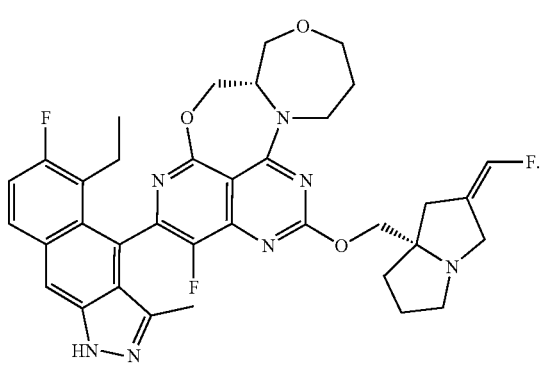

In specific embodiments, the present disclosure provides a compound as described in any one of Examples 1-7 as set forth below, or a pharmaceutically acceptable salt thereof.

In some embodiments, the present disclosure provides compounds which have low predicted oral human doses which result from superior pharmacodynamic properties (e.g., as demonstrated in AsPC-1 xenograft mouse model measured as tumor phospho-ERK inhibition) and superior preclinical pharmacokinetic properties with preferable oral exposure (e.g., as determined in rat, dog and rhesus monkey).

The present disclosure includes the pharmaceutically acceptable salts of the compounds defined herein, including the pharmaceutically acceptable salts of all structural formulas, embodiments and classes defined herein.

Definitions

Unless defined otherwise, all technical and scientific terms used herein have the same meaning as is commonly understood by one of skill in the art to which this invention belongs.

As used throughout this disclosure, "compound(s) of Formulae (I)-(VII)", "compound(s) disclosed herein", "compound(s) described herein", "compound(s) of the disclosure", etc., are used interchangeably and are to be understood to include the disclosed compounds of Formulae (I)-(VII). The compounds of Formulae (I)-(VII) can form salts which are also within the scope of the present disclosure. Reference to a compound of the disclosure (or compound of Formulae (I)-(VII)) herein is understood to include reference to salts thereof, unless otherwise indicated.

The wavy line ⌇⌇⌇, as used herein, indicates a point of attachment to the compound that can be in either E or Z form.

The compounds of Formulae (I)-(VII) may contain one or more asymmetric centers and can thus occur as racemates and racemic mixtures, single enantiomers, diastereoisomeric mixtures and individual diastereoisomers. Centers of asymmetry that are present in the compounds of Formulae (I)-(VII) can all independently of one another have S configuration or R configuration. The compounds of Formulae (I)-(VII) include all possible enantiomers and diastereomers and mixtures of two or more stereoisomers, for example, mixtures of enantiomers and/or diastereomers, in all ratios. Thus, enantiomers are a subject of the disclosure in enantiomerically pure form, both as levorotatory and as dextrorotatory antipodes, in the form of racemates and in the form of mixtures of the two enantiomers in all ratios. In the case of a cis/trans isomerism, the disclosure includes both the cis form and the trans form (and both the E form and the Z form) as well as mixtures of these forms in all ratios. The present disclosure is meant to comprehend all such stereoisomeric forms of the compounds of Formulae (I)-(VII). Where a structural formula or chemical name specifies a particular configuration at a stereocenter, the enantiomer or stereoisomer of the compound resulting from that specified stereocenter is intended. Where a structural formula of the compounds of Formulae (I)-(VII) indicates a straight line at a chiral center, the structural formula includes both the S and R stereoisomers associated with the chiral center and mixtures thereof.

The compounds of Formulae (I)-(VII) may be separated into their individual diastereoisomers by, for example, fractional crystallization from a suitable solvent, for example, methanol or ethyl acetate or a mixture thereof, or via chiral chromatography using an optically active stationary phase. Absolute stereochemistry may be determined by X-ray crystallography of crystalline products or crystalline intermediates which are derivatized, if necessary, with a reagent containing an asymmetric center of known absolute configuration. Vibrational circular dichroism (VCD) may also be used to determine the absolute stereochemistry. Alternatively, any stereoisomer or isomers of the compounds of Formulae (I)-(VII) may be obtained by stereospecific synthesis using optically pure starting materials or reagents of known absolute configuration.

If desired, racemic mixtures of the compounds may be separated so that the individual enantiomers are isolated. The separation can be carried out by methods well known in the art, such as the coupling of a racemic mixture of compounds to an enantiomerically pure compound to form a diastereoisomeric mixture, followed by separation of the individual diastereoisomers by standard methods, such as fractional crystallization or chromatography. The coupling reaction is often the formation of salts using an enantiomerically pure acid or base. The diasteromeric derivatives may then be converted to the pure enantiomers by cleavage of the added chiral residue. The racemic mixture of the compounds can also be separated directly by chromatographic methods utilizing chiral stationary phases, which methods are well known in the art.

The compounds of Formulae (I)-(VII) which contain olefinic double bonds, unless specified otherwise, they are meant to include both E and Z geometric isomers.

Some of the compounds described herein may exist as tautomers which have different points of attachment of hydrogen accompanied by one or more double bond shifts. For example, a ketone and its enol form are keto-enol tautomers. The individual tautomers as well as mixtures thereof are encompassed by the compounds of Formulae (I)-(VII).

Some of the compounds of Formulae (I)-(VII) described herein may exist as atropisomers when the rotational energy barrier around a single bond is sufficiently high to prevent free rotation at a given temperature, thus allowing isolation of individual conformers with distinct properties. The individual atropisomers as well as mixtures thereof are encompassed with compounds of Formulae (I)-(VII) of the present disclosure. When resolved, individual atropisomers can be designated by established conventions such as those specified by the International Union of Pure Applied Chemistry (IUPAC) 2013 Recommendations.

In the compounds of Formulae (I)-(VII), the atoms may exhibit their natural isotopic abundances, or one or more of the atoms may be artificially enriched in a particular isotope having the same atomic number, but an atomic mass or mass number different from the atomic mass or mass number predominantly found in nature. The present disclosure as described and claimed herein is meant to include all suitable isotopic variations of the compounds of Formulae (I)-(VII) and embodiments thereof. For example, different isotopic forms of hydrogen (H) include protium ($^1$H) and deuterium ($^2$H, also denoted herein as D). Protium is the predominant hydrogen isotope found in nature. Enriching for deuterium may afford certain therapeutic advantages, such as increasing in vivo half-life or reducing dosage requirements or may provide a compound useful as a standard for characterization of biological samples. Isotopically-enriched compounds can be prepared without undue experimentation by conventional techniques well known to those skilled in the art or by processes analogous to those described in the Schemes and Examples herein using appropriate isotopically-enriched reagents and/or intermediates.

The term "pharmaceutically acceptable salts" refers to salts prepared from pharmaceutically acceptable non-toxic bases or acids. When a compound of Formulae (I)-(VII) is acidic, its corresponding salt can be conveniently prepared from pharmaceutically acceptable non-toxic bases, including inorganic bases and organic bases. Salts derived from such inorganic bases include aluminum, ammonium, calcium, copper (ic and ous), ferric, ferrous, lithium, magnesium, manganese (ic and ous), potassium, sodium, zinc and the like salts. Preferred are the ammonium, calcium, magnesium, potassium and sodium salts. Salts prepared from pharmaceutically acceptable organic non-toxic bases include salts of primary, secondary, and tertiary amines derived from both naturally occurring and synthetic sources. Pharmaceutically acceptable organic non-toxic bases from which salts can be formed include, for example, arginine, betaine, caffeine, choline, N,N'-dibenzylethylenediamine, diethylamine, 2-diethylaminoethanol, 2-dimethylaminoethanol, ethanolamine, ethylenediamine, N-ethyl-morpholine, N-ethylpiperidine, glucamine, glucosamine, histidine, hydrabamine, isopropylamine, dicyclohexylamine, lysine, methylglucamine, morpholine, piperazine, piperidine, polyamine resins, procaine, purines, theobromine, triethylamine, trimethylamine, tripropylamine, tromethamine and the like.

When a compound of Formulae (I)-(VII) is basic, its corresponding salt can be conveniently prepared from pharmaceutically acceptable non-toxic inorganic and organic acids. Such acids include, for example, acetic, benzenesulfonic, benzoic, camphorsulfonic, citric, ethanesulfonic, fumaric, gluconic, glutamic, hydrobromic, hydrochloric, isethionic, lactic, maleic, malic, mandelic, methanesulfonic, mucic, nitric, pamoic, pantothenic, phosphoric, succinic, sulfuric, tartaric, p-toluenesulfonic acid and the like. Preferred are citric, hydrobromic, hydrochloric, maleic, phosphoric, sulfuric, and tartaric acids. If a compound of Formulae (I)-(VII) simultaneously contains acidic and basic groups in the molecule, the disclosure also includes, in addition to the salt forms mentioned, inner salts or betaines (zwitterions). Salts can be obtained from the compounds of Formulae (I)-(VII) by customary methods which are known to the person skilled in the art, for example, by combination with an organic or inorganic acid or base in a solvent or dispersant, or by anion exchange or cation exchange from other salts. The present disclosure also includes all salts of the compounds of Formulae (I)-(VII) which, owing to low physiological compatibility, are not directly suitable for use in pharmaceuticals but which can be used, for example, as intermediates for chemical reactions or for the preparation of pharmaceutically acceptable salts.

Furthermore, the compounds of Formulae (I)-(VII) may exist in amorphous form and/or one or more crystalline forms, and as such all amorphous and crystalline forms and mixtures thereof of the compounds of Formulae (I)-(VII), including the Examples, are intended to be included within the scope of the present disclosure. In addition, some of the compounds of Formulae (I)-(VII) may form solvates with water (i.e., a hydrate) or common organic solvents such as but not limited to ethyl acetate. Such solvates and hydrates, particularly the pharmaceutically acceptable solvates and hydrates, of the instant compounds are likewise encompassed within the scope of this disclosure, along with un-solvated and anhydrous forms.

Any pharmaceutically acceptable pro-drug modification of a compound of Formulae (I)-(VII) which results in conversion in vivo to a compound within the scope of this disclosure is also within the scope of this disclosure.

The terms "therapeutically effective (or efficacious) amount" and similar descriptions such as "an amount efficacious for treatment" or "an effective dose" are intended to mean that amount of a compound of Formulae (I)-(VII) that will elicit the biological or medical response of a tissue, a system, animal or human that is being sought by a researcher, veterinarian, medical doctor or other clinician. In a preferred embodiment, the term "therapeutically effective amount" means an amount of a compound of Formulae (I)-(VII) that alleviates at least one clinical symptom in a human patient. The terms "prophylactically effective (or efficacious) amount" and similar descriptions such as "an amount efficacious for prevention" are intended to mean that amount of a compound of Formulae (I)-(VII) that will prevent or reduce the risk of occurrence of the biological or medical event that is sought to be prevented in a tissue, a system, animal or human by a researcher, veterinarian, medical doctor or other clinician.

Dosages of the Compounds of Formulae (I)-(VII)

The dosage regimen utilizing a compound of Formulae (I)-(VII) is selected in accordance with a variety of factors including type, species, age, weight, sex and medical condition of the patient; the severity of the condition to be treated; the potency of the compound chosen to be administered; the route of administration; and the renal and hepatic function of the patient. A consideration of these factors is well within the purview of the ordinarily skilled clinician for the purpose of determining the therapeutically effective or prophylactically effective dosage amount needed to prevent, counter, or arrest the progress of the condition. It is understood that a specific daily dosage amount can simultaneously be both a therapeutically effective amount, e.g., for treatment of an oncological condition, and a prophylactically effective amount, e.g., for prevention of an oncological condition.

While individual needs vary, determination of optimal ranges of effective amounts of the compounds of Formulae (I)-(VII) is within the skill of the art. For administration to a human in, for example, the curative or prophylactic treatment of the conditions and disorders identified herein, the typical dosages of the compounds of Formulae (I)-(VII) can be about 0.05 mg/kg/day to about 50 mg/kg/day, or at least 0.05 mg/kg, or at least 0.08 mg/kg, or at least 0.1 mg/kg, or at least 0.2 mg/kg, or at least 0.3 mg/kg, or at least 0.4 mg/kg, or at least 0.5 mg/kg, and any amount therebetween, to about 50 mg/kg or less, or about 40 mg/kg or less, or about 30 mg/kg or less, or about 20 mg/kg or less, or about 10 mg/kg or less and any amount therebetween, which can be, for example, about 2.5 mg/day (0.5 mg/kg×5 kg) to about 5000 mg/day (50 mg/kg×100 kg). For example, dosages of the compounds can be about 0.1 mg/kg/day to about 50 mg/kg/day, or about 0.05 mg/kg/day to about 10 mg/kg/day, or about 0.05 mg/kg/day to about 5 mg/kg/day, or about 0.05 mg/kg/day to about 3 mg/kg/day, or about 0.07 mg/kg/day to about 3 mg/kg/day, or about 0.09 mg/kg/day to about 3 mg/kg/day, or about 0.05 mg/kg/day to about 0.1 mg/kg/day, or about 0.1 mg/kg/day to about 1 mg/kg/day, or about 1 mg/kg/day to about 10 mg/kg/day, or about 1 mg/kg/day to about 5 mg/kg/day, or about 1 mg/kg/day to about 3 mg/kg/day, or about 3 mg/day to about 500 mg/day, or about 5 mg/day to about 250 mg/day, or about 10 mg/day to about 100 mg/day, or about 3 mg/day to about 10 mg/day, or about 100 mg/day to about 250 mg/day. Such doses may be administered in a single dose or may be divided into multiple doses.

Pharmaceutical Compositions

The compounds of Formulae (I)-(VII) and their pharmaceutically acceptable salts can be administered to animals, preferably to mammals, and in particular to humans, as pharmaceuticals by themselves, in mixtures with one another or in the form of pharmaceutical compositions. The term "subject" or "patient" includes animals, preferably mammals and especially humans, who use the instant active agents for the prevention or treatment of a medical condition. Administering of the drug to the subject includes both self-administration and administration to the patient by another person. The subject may be in need of, or desire, treatment for an existing disease or medical condition, or may be in need of or desire prophylactic treatment to prevent or reduce the risk of occurrence of said disease or medical condition. As used herein, a subject "in need" of treatment of an existing condition or of prophylactic treatment encompasses both a determination of need by a medical professional as well as the desire of a patient for such treatment.

The present disclosure therefore also provides the compounds of Formulae (I)-(VII) and their pharmaceutically acceptable salts for use as pharmaceuticals, their use for modulating the activity of mutant and/or WT KRAS proteins and in particular their use in the therapy and prophylaxis of the below-mentioned diseases or disorders as well as their use for preparing medicaments for these purposes. In certain embodiments, the compounds of Formulae (I)-(VII) and their pharmaceutically acceptable salts inhibit the KRAS-G12C, KRAS-G12D, KRAS-G12V, and/or KRAS-G13D proteins.

Furthermore, the present disclosure provides pharmaceutical compositions which comprise as active component an effective dose of at least one compound of Formulae (I)-(VII) and/or a pharmaceutically acceptable salt thereof and a customary pharmaceutically acceptable carrier, i.e., one or more pharmaceutically acceptable carrier substances and/or additives.

Thus, the present disclosure provides, for example, said compound and its pharmaceutically acceptable salts for use as pharmaceutical compositions which comprise as active component an effective dose of at least one compound of Formulae (I)-(VII) and/or a pharmaceutically acceptable salt thereof and a customary pharmaceutically acceptable carrier, and the uses of said compound and/or a pharmaceutically acceptable salt thereof in the therapy or prophylaxis of the below-mentioned diseases or disorders, e.g., cancer, as well as their use for preparing medicaments for these purposes.

The pharmaceutical compositions according to the disclosure can be administered orally, for example, in the form of pills, tablets, lacquered tablets, sugar-coated tablets, granules, hard and soft gelatin capsules, aqueous, alcoholic or oily solutions, syrups, emulsions or suspensions, or rectally, for example, in the form of suppositories. Administration can also be carried out parenterally, for example subcutaneously, intramuscularly or intravenously in the form of solutions for injection or infusion.

Other suitable administration forms are, for example, percutaneous or topical administration, for example, in the form of ointments, tinctures, sprays or transdermal therapeutic systems, or, for example, microcapsules, implants or rods. The preferred administration form depends, for example, on the disease to be treated and on its severity.

The amount of active compound of a compound described herein and/or its pharmaceutically acceptable salts in the pharmaceutical composition normally is from 0.01 to 200 mg, or from 0.1 to 200 mg, or from 1 to 200 mg, per dose, but depending on the type of the pharmaceutical composition, it can also be higher. In some embodiments, the amount of active compound of a compound of Formulae (I)-(VII) and/or its pharmaceutically acceptable salts in the pharmaceutical composition is from 0.01 to 10 mg per dose. The pharmaceutical compositions usually comprise 0.5 to 90 percent by weight of at least one compound of Formulae (I)-(VII) and/or its pharmaceutically acceptable salts. The preparation of the pharmaceutical compositions can be carried out in a manner known per se. For this purpose, one or more compounds of Formulae (I)-(VII) and/or their pharmaceutically acceptable salts, together with one or more solid or liquid pharmaceutical carrier substances and/or additives (or auxiliary substances) and, if desired, in combination with other pharmaceutically active compounds having therapeutic or prophylactic action, are brought into a suitable administration form or dosage form which can then be used as a pharmaceutical in human or veterinary medicine.

For the production of pills, tablets, sugar-coated tablets and hard gelatin capsules, it is possible to use, for example, lactose, starch, for example, maize starch, or starch derivatives, talc, stearic acid or its salts, etc. Carriers for soft gelatin capsules and suppositories are, for example, fats, waxes, semisolid and liquid polyols, natural or hardened oils, etc. Suitable carriers for the preparation of solutions, for example, of solutions for injection, or of emulsions or syrups are, for example, water, physiologically acceptable sodium chloride solution, alcohols such as ethanol, glycerol, polyols, sucrose, invert sugar, glucose, mannitol, vegetable oils, etc. It is also possible to lyophilize the compounds of Formulae (I)-(VII) and their pharmaceutically acceptable salts and to use the resulting lyophilisates, for example, for preparing preparations for injection or infusion. Suitable carriers for microcapsules, implants or rods are, for example, copolymers of glycolic acid and lactic acid.

Besides the active compounds and carriers, the pharmaceutical compositions can also contain customary additives, for example, fillers, disintegrants, binders, lubricants, wetting agents, stabilizers, emulsifiers, dispersants, preservatives, sweeteners, colorants, flavorings, aromatizers, thickeners, diluents, buffer substances, solvents, solubilizers, agents for achieving a depot effect, salts for altering the osmotic pressure, coating agents and/or antioxidants.

Methods of Using the Compounds of Formulae (I)-(VII)

The present application provides a method of inhibiting RAS-mediated cell signaling comprising contacting a cell with a compound of Formulae (I)-(VII) or a pharmaceutically acceptable salt thereof. Inhibition of RAS-mediated signal transduction can be assessed and demonstrated by a wide variety of ways known in the art. Non-limiting examples include (a) a decrease in GTPase activity of RAS; (b) a decrease in GTP binding affinity or an increase in GDP binding affinity; (c) an increase in $K_{off}$ of GTP or a decrease in $K_{off}$ of GDP; (d) a decrease in the levels of signaling transduction molecules downstream in the RAS pathway, such as a decrease in pMEK, pERK, or pAKT levels; and/or (e) a decrease in binding of RAS complex to downstream signaling molecules including but not limited to Raf. Kits and commercially available assays can be utilized for determining one or more of the above.

The present application also provides methods of using the compounds of Formulae (I)-(VII) (or their pharmaceutically acceptable salts) or pharmaceutical compositions containing such compounds to treat disease conditions, including but not limited to, conditions implicated by mutant KRAS proteins and/or amplification or over expression of WT KRAS protein (e.g., cancer), and in some embodiments the KRAS-G12C, KRAS-G12D, KRAS-G12V, and/or KRAS-G13D mutants.

In some embodiments, a method for treatment of cancer is provided, the method comprising administering a therapeutically effective amount a compound of Formulae (I)-(VII) (or a pharmaceutically acceptable salt thereof) or any of the foregoing pharmaceutical compositions comprising such a compound to a subject in need of such treatment. In some embodiments, the cancer is mediated by a KRAS mutation, e.g., the KRAS-G12C, KRAS-G12D, KRAS-G12V, and/or KRAS-G13D mutations. In various embodiments, the cancer is pancreatic cancer, colorectal cancer or lung cancer. In some embodiments, the cancer is gall bladder cancer, thyroid cancer, or bile duct cancer.

In some embodiments the present disclosure provides a method of treating a disorder in a subject in need thereof, wherein said method comprises determining if the subject has a KRAS mutation (e.g., KRAS-G12C, KRAS-G12D, KRAS-G12V, and/or KRAS-G13D mutations) and if the subject is determined to have the KRAS mutation, then administering to the subject a therapeutically effective amount of a compound of Formulae (I)-(VII) or a pharmaceutically acceptable salt thereof.

In some embodiments the present disclosure provides a method of treating a disorder in a subject in need thereof, wherein said method comprises determining if the subject has amplified and/or over expression of WT KRAS protein and if the subject is determined to have such features, then administering to the subject a therapeutically effective amount of a compound of Formulae (I)-(VII) or a pharmaceutically acceptable salt thereof.

The disclosed compounds inhibit anchorage-independent cell growth and therefore have the potential to inhibit tumor metastasis. Accordingly, another embodiment of the present disclosure provides a method for inhibiting tumor metastasis, the method comprising administering an effective amount a compound of Formulae (I)-(VII).

KRAS mutations have also been identified in hematological malignancies (e.g., cancers that affect blood, bone marrow and/or lymph nodes). Accordingly, certain embodiments are directed to administration of the compounds of Formulae (I)-(VII) (e.g., in the form of a pharmaceutical composition) to a subject in need of treatment of a hematological malignancy. Such malignancies include, but are not limited to leukemias and lymphomas. For example, the presently disclosed compounds can be used for treatment of diseases such as acute lymphoblastic leukemia (ALL), acute myelogenous leukemia (AML), chronic lymphocytic leukemia (CLL), small lymphocytic lymphoma (SLL), chronic myelogenous leukemia (CML), acute monocytic leukemia (AMoL) and/or other leukemias. In other embodiments, the compounds are useful for treatment of lymphomas such as Hodgkin's lymphoma or non-Hodgkin's lymphoma. In various embodiments, the compounds are useful for treatment of plasma cell malignancies such as multiple myeloma, mantle cell lymphoma, and Waldenstrom's macroglubunemia.

Determining whether a tumor or cancer comprises a KRAS mutation (e.g., the KRAS-G12C, KRAS-G12D and/or KRAS-G12V mutations) or WT KRAS can be undertaken by assessing the nucleotide sequence encoding the KRAS protein, by assessing the amino acid sequence of the KRAS protein, or by assessing the characteristics of a putative KRAS mutant or WT KRAS protein. The sequence of wild-type human KRAS is known in the art.

Methods for detecting a mutation in a KRAS nucleotide sequence or a WT KRAS nucleotide sequence are also known by those of skill in the art. These methods include, but are not limited to, polymerase chain reaction-restriction fragment length polymorphism (PCR-RFLP) assays, polymerase chain reaction-single strand conformation polymorphism (PCR-SSCP) assays, real-time PCR assays, PCR sequencing, mutant allele-specific PCR amplification (MASA) assays, direct sequencing, primer extension reactions, electrophoresis, oligonucleotide ligation assays, hybridization assays, TaqMan assays, SNP genotyping assays, high resolution melting assays and microarray analyses. In some embodiments, samples are evaluated for KRAS mutations (e.g., the KRAS-G12C, KRAS-G12D, KRAS-G12V, and/or KRAS-G13D mutations) by real-time PCR. In real-time PCR, fluorescent probes specific for the KRAS mutation are used. When a mutation is present, the probe binds and fluorescence is detected. In some embodiments, the KRAS mutation is identified using a direct sequencing method of specific regions (e.g., exon 2 and/or exon 3) in the KRAS gene.

Methods for detecting a mutation in a KRAS protein or a WT KRAS protein (e.g., the KRAS-G12C, KRAS-G12D, KRAS-G12V, KRAS-G13D mutations) are known by those of skill in the art. These methods include, but are not limited to, detection of a KRAS mutant or WT KRAS protein using a binding agent (e.g., an antibody) specific for the mutant or WT protein, protein electrophoresis and Western blotting, and direct peptide sequencing.

A number of tissue samples can be assessed for determining whether a tumor or cancer comprises a KRAS mutation (e.g., the KRAS-G12C, KRAS-G12D, KRAS-G12V, and/or KRAS-G13D mutations) or amplified/overexpressed WT KRAS. In some embodiments, the sample is taken from a subject having a tumor or cancer. In some embodiments, the sample is a fresh tumor/cancer sample. In some embodiments, the sample is a frozen tumor/cancer sample. In some embodiments, the sample is a formalin-fixed paraffin-embedded sample. In some embodiments, the sample is a circulating tumor cell (CTC) sample. In some embodiments, the sample is processed to a cell lysate. In some embodiments, the sample is processed to DNA or RNA.

The present application also provides a method of treating a hyperproliferative disorder comprising administering a therapeutically effective amount of a compound of Formulae (I)-(VII), or a pharmaceutically acceptable salt thereof to a subject in need thereof. In some embodiments, said method relates to the treatment of a subject who suffers from a cancer such as acute myeloid leukemia, cancer in adolescents, adrenocortical carcinoma childhood, AIDS-related cancers (e.g., lymphoma and Kaposi's Sarcoma), anal cancer, appendix cancer, astrocytomas, atypical teratoid, basal cell carcinoma, bile duct cancer, bladder cancer, bone cancer, brain stem glioma, brain tumor, breast cancer, bronchial tumors, Burkitt lymphoma, carcinoid tumor, atypical teratoid, embryonal tumors, germ cell tumor, primary lymphoma, cervical cancer, childhood cancers, chordoma, cardiac tumors, chronic lymphocytic leukemia (CLL), chronic myelogenous leukemia (CML), chronic myleoproliferative disorders, colon cancer, colorectal cancer, craniopharyngioma, cutaneous T-cell lymphoma, extrahepatic ductal carcinoma in situ (DCIS), embryonal tumors, CNS cancer, endometrial cancer, ependymoma, esophageal cancer, esthesioneuroblastoma, Ewing sarcoma, extracranial germ cell tumor, extragonadal germ cell tumor, eye cancer, fibrous histiocytoma of bone, gall bladder cancer, gastric cancer, gastrointestinal carcinoid tumor, gastrointestinal stromal tumors (GIST), germ cell tumor, gestational trophoblastic tumor, hairy cell leukemia, head and neck cancer, heart cancer, liver cancer, Hodgkin's lymphoma, hypopharyngeal cancer, intraocular melanoma, islet cell tumors, pancreatic neuroendocrine tumors, kidney cancer, laryngeal cancer, lip and oral cavity cancer, liver cancer, lobular carcinoma in situ (LCIS), lung cancer, lymphoma, metastatic squamous neck cancer with occult primary, midline tract carcinoma, mouth cancer; multiple endocrine neoplasia syndromes, multiple myeloma/plasma cell neoplasm, mycosis fungoides, myelodysplasia syndromes, myelodysplastic/myeloproliferative neoplasms, multiple myeloma, Merkel cell carcinoma, malignant mesothelioma, malignant fibrous histiocytoma of bone and osteosarcoma, nasal cavity and paranasal sinus cancer, nasopharyngeal cancer, neuroblastoma, non-Hodgkin's lymphoma, non-small cell lung cancer (NSCLC), oral cancer, lip and oral cavity cancer, oropharyngeal cancer, ovarian cancer, pancreatic cancer, papillomatosis, paraganglioma, paranasal sinus and nasal cavity cancer, parathyroid cancer, penile cancer, pharyngeal cancer, pleuropulmonary blastoma, primary central nervous system (CNS) lymphoma, prostate cancer, rectal cancer, transitional cell cancer, retinoblastoma, rhabdomyosarcoma, salivary gland cancer, skin cancer, stomach (gastric) cancer, small cell lung cancer; small intestine cancer, soft tissue sarcoma, T-Cell lymphoma, testicular cancer, throat cancer, thymoma and thymic carcinoma, thyroid cancer, transitional cell cancer of the renal pelvis and ureter, trophoblastic tumor, unusual cancers of childhood, urethral cancer, uterine sarcoma, vaginal cancer, vulvar cancer, or viral-induced cancer. In some embodiments, said method relates to the treatment of a non-cancerous hyperproliferative disorder such as benign hyperplasia of the skin (e.g., psoriasis), restenosis, or prostate (e.g., benign prostatic hypertrophy (BPH)).

In some embodiments, the methods for treatment are directed to treating lung cancers, and the methods comprise administering a therapeutically effective amount of the compounds of Formulae (I)-(VII) (or pharmaceutical composition comprising such compounds) to a subject in need thereof. In certain embodiments, the lung cancer is a non-small cell lung carcinoma (NSCLC), for example, adenocarcinoma, squamous-cell lung carcinoma or large-cell lung carcinoma. In some embodiments, the lung cancer is a small cell lung carcinoma. Other lung cancers which the compounds of Formulae (I)-(VII) may provide therapeutic benefit for include, but are not limited to, glandular tumors, carcinoid tumors and undifferentiated carcinomas.

The present disclosure also provides methods of modulating a mutant KRAS protein activity (e.g., activity resulting from the KRAS-G12C, KRAS-G12D, KRAS-G12V, and/or KRAS-G13D mutations) or a WT KRAS protein activity by contacting the protein with an effective amount of a compound of Formulae (I)-(VII). Modulation can be inhibiting or activating protein activity. In some embodiments, the present disclosure provides methods of inhibiting protein activity by contacting the mutant KRAS protein (e.g., KRAS-G12C, KRAS-G12D, KRAS-G12V, and/or KRAS-G13D mutants) or WT KRAS protein with an effective amount of a compound of Formulae (I)-(VII) in solution. In some embodiments, the present disclosure provides methods of inhibiting the mutant or WT KRAS protein activity by contacting a cell, tissue, or organ that expresses the protein of interest. In some embodiments, the disclosure provides methods of inhibiting protein activity in subjects including, but not limited to, rodents and mammals (e.g., humans) by administering into the subjects an effective amount of a compound of Formulae (I)-(VII).

Combination Therapies

One or more additional pharmacologically active agents may be administered in combination with a compound of Formulae (I)-(VII) (or a pharmaceutically acceptable salt thereof). An additional active agent (or agents) is intended to mean a pharmaceutically active agent (or agents) that is active in the body, including pro-drugs that convert to pharmaceutically active form after administration, which are different from the compound of Formulae (I)-(VII). The additional active agents also include free-acid, free-base and pharmaceutically acceptable salts of said additional active agents. Generally, any suitable additional active agent or agents, including chemotherapeutic agents or therapeutic antibodies, may be used in any combination with the compound of Formulae (I)-(VII) in a single dosage formulation (e.g., a fixed dose drug combination), or in one or more separate dosage formulations which allows for concurrent or sequential administration of the active agents (co-administration of the separate active agents) to subjects. In addition, the compounds of Formulae (I)-(VII) (or pharmaceutically acceptable salts thereof) can be administered in combination with radiation therapy, hormone therapy, surgery or immunotherapy.

The present application also provides methods for combination therapies in which the additional active agent is known to modulate other pathways, or other components of the same pathway, or even overlapping sets of target enzymes which are used in combination with a compound of Formulae (I)-(VII), or a pharmaceutically acceptable salt thereof. In one embodiment, such therapy includes, but is not limited to, the combination of one or more compounds of Formulae (I)-(VII) with chemotherapeutic agents, immunotherapeutic agents, hormonal and anti-hormonal agents, targeted therapy agents, and anti-angiogenesis agents, to provide a synergistic or additive therapeutic effect. In another embodiment, such therapy includes radiation treatment to provide a synergistic or additive therapeutic effect.

Examples of additional active agents (i.e., additional anti-cancer agents) include chemotherapeutic agents (e.g., cytotoxic agents), immunotherapeutic agents, hormonal and anti-hormonal agents, targeted therapy agents, and anti-angiogenesis agents. Many anti-cancer agents can be classified within one or more of these groups. While certain anti-cancer agents have been categorized within a specific group(s) or subgroup(s) herein, many of these agents can also be listed within one or more other group(s) or subgroup(s), as would be presently understood in the art. It is to be understood that the classification herein of a particular agent into a particular group is not intended to be limiting. Many anti-cancer agents are presently known in the art and can be used in combination with the compounds of the present disclosure.

Further, an agent can be an agonist, antagonist, allosteric modulator, toxin or, more generally, may act to inhibit or stimulate its target (e.g., receptor or enzyme activation or inhibition). For example, suitable for use are one or more agents (e.g., antibodies, antigen binding regions, or soluble receptors) that specifically bind and inhibit the activity of growth factors, such as antagonists of hepatocyte growth factor (HGF, also known as Scatter Factor), and antibodies or antigen binding regions that specifically bind its receptor "c-met".

In an embodiment, the additional anti-cancer agent is a chemotherapeutic agent, an immunotherapeutic agent, a hormonal agent, an anti-hormonal agent, a targeted therapy agent, or an anti-angiogenesis agent (or angiogenesis inhibitor). In an embodiment, the additional anti-cancer agent is selected from the group consisting of a chemotherapeutic agent, a mitotic inhibitor, a plant alkaloid, an alkylating agent, an anti-metabolite, a platinum analog, an enzyme, a topoisomerase inhibitor, a retinoid, an aziridine, an antibiotic, a hormonal agent, an anti-hormonal agent, an anti-estrogen, an anti-androgen, an anti-adrenal, an androgen, a targeted therapy agent, an immunotherapeutic agent, a biological response modifier, a cytokine inhibitor, a tumor vaccine, a monoclonal antibody, an immune checkpoint inhibitor, an anti-PD-1 agent, an anti-PD-L1 agent, a colony-stimulating factor, an immunomodulator, an immunomodulatory imide (IMiD), an anti-CTLA4 agent, an anti-LAG1 agent, an anti-LAG3 agent, an anti-ILT4 agent, an anti-OX40 agent, a GITR agonist, a CAR-T cell, a BiTE, a signal transduction inhibitor, a growth factor inhibitor, a tyrosine kinase inhibitor, an EGFR inhibitor, a histone deacetylase (HDAC) inhibitor, a proteasome inhibitor, a cell-cycle inhibitor, an anti-angiogenesis agent, a matrix-metalloproteinase (MMP) inhibitor, a hepatocyte growth factor inhibitor, a TOR inhibitor, a KDR inhibitor, a VEGF inhibitor, a HIF-1α inhibitor, a HIF-2α inhibitor, a fibroblast growth factor (FGF) inhibitor, a RAF inhibitor, a MEK inhibitor, an ERK inhibitor, a PI3K inhibitor, an AKT inhibitor, an MCL-1 inhibitor, a BCL-2 inhibitor, an SHP2 inhibitor, a HER-2 inhibitor, a BRAF-inhibitor, a gene expression modulator, an autophagy inhibitor, an apoptosis inducer, an antiproliferative agent, and a glycolysis inhibitor.

In one embodiment, the additional anti-cancer agent(s) is a chemotherapeutic agent. Non-limiting examples of chemotherapeutic agents include mitotic inhibitors and plant alkaloids, alkylating agents, anti-metabolites, platinum analogs, enzymes, topoisomerase inhibitors, retinoids, aziridines, and antibiotics.

Non-limiting examples of mitotic inhibitors and plant alkaloids include taxanes such as cabazitaxel, docetaxel, larotaxel, ortataxel, paclitaxel, and tesetaxel; demecolcine; epothilone; eribulin; etoposide (VP-16); etoposide phosphate; navelbine; noscapine; teniposide; thaliblastine; vinblastine; vincristine; vindesine; vinflunine; and vinorelbine.

Non-limiting examples of alkylating agents include nitrogen mustards such as chlorambucil, chlornaphazine, cholophosphamide, cytophosphane, estramustine, ifosfamide, mannomustine, mechlorethamine, mechlorethamine oxide hydrochloride, melphalan, novembichin, phenesterine, prednimustine, tris(2-chloroethyl)amine, trofosfamide, and uracil mustard; alkyl sulfonates such as busulfan, improsulfan, and piposulfan; nitrosoureas such as carmustine, chlorozotocin, fotemustine, lomustine, nimustine, ranimustine, streptozotocin, and TA-07; ethylenimines and methylamelamines such as altretamine, thiotepa, triethylenemelamine, triethylenethiophosphaoramide, trietylenephosphoramide, and trimethylolomelamine; ambamustine; bendamustine; dacarbazine; etoglucid; irofulven; mafosfamide; mitobronitol; mitolactol; pipobroman; procarbazine; temozolomide; treosulfan; and triaziquone.

Non-limiting examples of anti-metabolites include folic acid analogues such as aminopterin, denopterin, edatrexate, methotrexate, pteropterin, raltitrexed, and trimetrexate; purine analogs such as 6-mercaptopurine, 6-thioguanine, fludarabine, forodesine, thiamiprine, and thioguanine; pyrimidine analogs such as 5-fluorouracil (5-FU), 6-azauridine, ancitabine, azacytidine, capecitabine, carmofur, cytarabine, decitabine, dideoxyuridine, doxifluridine, doxifluridine, enocitabine, floxuridine, galocitabine, gemcitabine, and sapacitabine; 3-aminopyridine-2-carboxaldehyde thiosemicarbazone; broxuridine; cladribine; cyclophosphamide; cytarabine; emitefur; hydroxyurea; mercaptopurine; nelarabine; pemetrexed; pentostatin; tegafur; and troxacitabine.

Non-limiting examples of platinum analogs include carboplatin, cisplatin, dicycloplatin, heptaplatin, lobaplatin, nedaplatin, oxaliplatin, satraplatin, and triplatin tetranitrate.

Non-limiting examples of enzymes include asparaginase and pegaspargase.

Non-limiting examples of topoisomerase inhibitors include acridine carboxamide, amonafide, amsacrine, belotecan, elliptinium acetate, exatecan, indolocarbazole, irinotecan, lurtotecan, mitoxantrone, razoxane, rubitecan, SN-38, sobuzoxane, and topotecan.

Non-limiting examples of retinoids include alitretinoin, bexarotene, fenretinide, isotretinoin, liarozole, RII retinamide, and tretinoin.

Non-limiting examples of aziridines include benzodopa, carboquone, meturedopa, and uredopa.

Non-limiting examples of antibiotics include intercalating antibiotics; anthracenediones; anthracycline antibiotics such as aclarubicin, amrubicin, daunomycin, daunorubicin, doxorubicin, epirubicin, idarubicin, menogaril, nogalamycin, pirarubicin, and valrubicin; 6-diazo-5-oxo-L-norleucine; aclacinomysins; actinomycin; authramycin; azaserine; bleomycins; cactinomycin; calicheamicin; carabicin; carminomycin; carzinophilin; chromomycins; dactinomycin; detorubicin; esorubicin; esperamicins; geldanamycin; marcellomycin; mitomycins; mitomycin C; mycophenolic acid; olivomycins; novantrone; peplomycin; porfiromycin; potfiromycin; puromycin; quelamycin; rebeccamycin; rodorubicin; streptonigrin; streptozocin; tanespimycin; tubercidin; ubenimex; zinostatin; zinostatin stimalamer; and zorubicin.

In one embodiment, the additional anti-cancer agent(s) is a hormonal and/or anti-hormonal agent (i.e., hormone therapy). Non-limiting examples of hormonal and anti-hormonal agents include anti-androgens such as abiraterone, apalutamide, bicalutamide, darolutamide, enzalutamide, flutamide, goserelin, leuprolide, and nilutamide; anti-estrogens such as 4-hydroxy tamoxifen, aromatase inhibiting 4(5)-imidazoles, EM-800, fosfestrol, fulvestrant, keoxifene, LY 117018, onapristone, raloxifene, tamoxifen, toremifene, and trioxifene; anti-adrenals such as aminoglutethimide, dexaminoglutethimide, mitotane, and trilostane; androgens such as calusterone, dromostanolone propionate, epitiostanol, mepitiostane, and testolactone; abarelix; anastrozole; cetrorelix; deslorelin; exemestane; fadrozole; finasteride; formestane; histrelin (RL 0903); human chorionic gonadotropin; lanreotide; LDI 200 (Milkhaus); letrozole; leuprorelin; mifepristone; nafarelin; nafoxidine; osaterone; prednisone; thyrotropin alfa; and triptorelin.

In one embodiment, the additional anti-cancer agent(s) is an immunotherapeutic agent (i.e., immunotherapy). Non-limiting examples of immunotherapeutic agents include biological response modifiers, cytokine inhibitors, tumor vaccines, monoclonal antibodies, immune checkpoint inhibitors, colony-stimulating factors, and immunomodulators.

Non-limiting examples of biological response modifiers, including cytokine inhibitors (cytokines) such as interferons and interleukins, include interferon alfa/interferon alpha such as interferon alfa-2, interferon alfa-2a, interferon alfa-2b, interferon alfa-n1, interferon alfa-n3, interferon alfacon-1, peginterferon alfa-2a, peginterferon alfa-2b, and leukocyte alpha interferon; interferon beta such as interferon beta-1a, and interferon beta-1b; interferon gamma such as natural interferon gamma-1a, and interferon gamma-1b; aldesleukin; interleukin-1 beta; interleukin-2; oprelvekin; sonermin; tasonermin; and virulizin.

Non-limiting examples of tumor vaccines include APC 8015, AVICINE, bladder cancer vaccine, cancer vaccine (Biomira), gastrin 17 immunogen, Maruyama vaccine, melanoma lysate vaccine, melanoma oncolysate vaccine (New York Medical College), melanoma vaccine (New York University), melanoma vaccine (Sloan Kettering Institute), TICE® BCG (Bacillus Calmette-Guerin), and viral melanoma cell lysates vaccine (Royal Newcastle Hospital).

Non-limiting examples of monoclonal antibodies include abagovomab, adecatumumab, aflibercept, alemtuzumab, blinatumomab, brentuximab vedotin, CA 125 MAb (Biomira), cancer MAb (Japan Pharmaceutical Development), daclizumab, daratumumab, denosumab, edrecolomab, gemtuzumab zogamicin, HER-2 and Fc MAb (Medarex), ibritumomab tiuxetan, idiotypic 105AD7 MAb (CRC Technology), idiotypic CEA MAb (Trilex), ipilimumab, quavonlimab, vibostolimab, favezelimab, lintuzumab, LYM-1-iodine 131 MAb (Techni clone), mitumomab, moxetumomab, ofatumumab, polymorphic epithelial mucin-yttrium 90 MAb (Antisoma), ranibizumab, rituximab, and trastuzumab.

Non-limiting examples of immune checkpoint inhibitors include anti-PD-1 agents or antibodies such as cemiplimab, nivolumab, and pembrolizumab; anti-PD-L1 agents or antibodies such as atezolizumab, avelumab, and durvalumab; anti-CTLA-4 agents or antibodies such as ipilumumab and quavonlimab; anti-LAG1 agents; anti-LAG3 agents such as favezelimab, and anti-OX40 agents.

Non-limiting examples of colony-stimulating factors include darbepoetin alfa, epoetin alfa, epoetin beta, filgrastim, granulocyte macrophage colony stimulating factor, lenograstim, leridistim, mirimostim, molgramostim, nartograstim, pegfilgrastim, and sargramostim.

Non-limiting examples of additional immunotherapeutic agents include BiTEs, CAR-T cells, GITR agonists, imiquimod, immunomodulatory imides (IMiDs), mismatched double stranded RNA (Ampligen), resiquimod, SRL 172, and thymalfasin.

In one embodiment, the additional anti-cancer agent(s) is a targeted therapy agent (i.e., targeted therapy). Targeted therapy agents include, for example, monoclonal antibodies and small molecule drugs. Non-limiting examples of targeted therapy agents include signal transduction inhibitors, growth factor inhibitors, tyrosine kinase inhibitors, EGFR inhibitors, histone deacetylase (HDAC) inhibitors, proteasome inhibitors, cell-cycle inhibitors, angiogenesis inhibitors, matrix-metalloproteinase (MMP) inhibitors, hepatocyte growth factor inhibitors, TOR inhibitors, KDR inhibitors, VEGF inhibitors, fibroblast growth factors (FGF) inhibitors, MEK inhibitors, ERK inhibitors, PI3K inhibitors, AKT inhibitors, MCL-1 inhibitors, BCL-2 inhibitors, SHP2 inhibitors, HER-2 inhibitors, BRAF-inhibitors, BTK inhibitors (e.g., nemtabrutinib), gene expression modulators, autophagy inhibitors, apoptosis inducers, antiproliferative agents, and glycolysis inhibitors.

Non-limiting examples of signal transduction inhibitors include tyrosine kinase inhibitors, multiple-kinase inhibitors, anlotinib, avapritinib, axitinib, dasatinib, dovitinib, imatinib, lenvatinib, lonidamine, nilotinib, nintedanib, pazopanib, pegvisomant, ponatinib, vandetanib, and EGFR inhibitory agents.

Non-limiting examples of EGFR inhibitory agents include small molecule antagonists of EGFR such as afatinib, brigatinib, erlotinib, gefitinib, lapatinib, and osimertinib; and antibody-based EGFR inhibitors, including any anti-EGFR antibody or antibody fragment that can partially or completely block EGFR activation by its natural ligand. Antibody-based EGFR inhibitory agents may include, for example, those described in Modjtahedi, H., et al., 1993, Br. J. Cancer 67:247-253; Teramoto, T., et al., 1996, Cancer 77:639-645; Goldstein et al, 1995, Clin. Cancer Res. 1: 1311-1318; Huang, S. M., et al., 1999, Cancer Res. 15:59(8): 1935-40; and Yang, X., et al., 1999, Cancer Res. 59: 1236-1243; monoclonal antibody Mab E7.6.3 (Yang, 1999 supra); Mab C225 (ATCC Accession No. HB-8508), or an antibody or antibody fragment having the binding specificity thereof; specific antisense nucleotide or siRNA; afatinib, cetuximab; matuzumab; necitumumab; nimotuzumab; panitumumab; and zalutumumab.

Non-limiting examples of histone deacetylase (HDAC) inhibitors include belinostat, panobinostat, romidepsin, and vorinostat.

Non-limiting examples of proteasome inhibitors include bortezomib, carfilzomib, ixazomib, marizomib (salinosporamide a), and oprozomib.

Non-limiting examples of cell-cycle inhibitors, including CDK inhibitors, include abemaciclib, alvocidib, palbociclib, and ribociclib.

In one embodiment, the additional anti-cancer agent(s) is an anti-angiogenic agent (or angiogenesis inhibitor) including, but not limited to, matrix-metalloproteinase (MMP) inhibitors; VEGF inhibitors; EGFR inhibitors; TOR inhibitors such as everolimus and temsirolimus; PDGFR kinase inhibitory agents such as crenolanib; HIF-1α inhibitors such as PX 478; HIF-2α inhibitors such as belzutifan and the HIF-2α inhibitors described in WO 2015/035223; fibroblast growth factor (FGF) or FGFR inhibitory agents such as B-FGF and RG 13577; hepatocyte growth factor inhibitors; KDR inhibitors; anti-Ang1 and anti-Ang2 agents; anti-Tie2 kinase inhibitory agents; Tek antagonists (US 2003/0162712; U.S. Pat. No. 6,413,932); anti-TWEAK agents (U.S. Pat. No. 6,727,225); ADAM distintegrin domain to antagonize the binding of integrin to its ligands (US 2002/0042368); anti-eph receptor and/or anti-ephrin antibodies or antigen binding regions (U.S. Pat. Nos. 5,981,245; 5,728, 813; 5,969,110; 6,596,852; 6,232,447; and 6,057,124); and anti-PDGF-BB antagonists as well as antibodies or antigen binding regions specifically binding to PDGF-BB ligands.

Non-limiting examples of matrix-metalloproteinase (MMP) inhibitors include MMP-2 (matrix-metalloproteinase 2) inhibitors, MMP-9 (matrix-metalloproteinase 9) inhibitors, prinomastat, RO 32-3555, and RS 13-0830. Examples of useful matrix metalloproteinase inhibitors are described, for example, in WO 96/33172, WO 96/27583, EP 1004578, WO 98/07697, WO 98/03516, WO 98/34918, WO 98/34915, WO 98/33768, WO 98/30566, EP 0606046, EP 0931788, WO 90/05719, WO 99/52910, WO 99/52889, WO 99/29667, WO 1999/007675, EP 1786785, EP 1181017, US 2009/0012085, U.S. Pat. Nos. 5,863,949, 5,861,510, and EP 0780386. Preferred MMP-2 and MMP-9 inhibitors are those that have little or no activity inhibiting MMP-1. More preferred, are those that selectively inhibit MMP-2 and/or MMP-9 relative to the other matrix-metalloproteinases (i.e., MAP-1, MMP-3, MMP-4, MMP-5, MMP-6, MMP-7, MMP-8, MMP-10, MMP-11, MMP-12, and MMP-13).

Non-limiting examples of VEGF and VEGFR inhibitory agents include bevacizumab, cediranib, CEP 7055, CP 547632, KRN 633, orantinib, pazopanib, pegaptanib, pegaptanib octasodium, semaxanib, sorafenib, sunitinib, VEGF antagonist (Borean, Denmark), and VEGF-TRAP™.

The additional anti-cancer agent(s) may also be another anti-angiogenic agent including, but not limited to, 2-methoxyestradiol, AE 941, alemtuzumab, alpha-D148 Mab (Amgen, US), alphastatin, anecortave acetate, angiocidin, angiogenesis inhibitors, (SUGEN, US), angiostatin, anti-Vn Mab (Crucell, Netherlands), atiprimod, axitinib, AZD 9935, BAY RES 2690 (Bayer, Germany, BC 1 (Genoa Institute of Cancer Research, Italy), beloranib, benefin (Lane Labs, US), cabozantinib, CDP 791 (Celltech Group, UK), chondroitinase AC, cilengitide, combretastatin A4 prodrug, CP 564959 (OSI, US), CV247, CYC 381 (Harvard University, US), E 7820, EHT 0101, endostatin, enzastaurin hydrochloride, ER-68203-00 (IVAX, US), fibrinogen-E fragment, Flk-1 (ImClone Systems, US), forms of FLT 1 (VEGFR 1), FR-111142, GCS-100, GW 2286 (GlaxoSmithKline, UK), IL-8, ilomastat, IM-862, irsogladine, KM-2550 (Kyowa Hakko, Japan), lenalidomide, lenvatinib, MAb alpha5beta3 integrin, second generation (Applied Molecular Evolution, USA and MedImmune, US), MAb VEGF (Xenova, UK), marimastat, maspin (Sosei, Japan), metastatin, motuporamine C, M-PGA, ombrabulin, OXI4503, PI 88, platelet factor 4, PPI 2458, ramucirumab, rBPI 21 and BPI-derived antiangiogenic (XOMA, US), regorafenib, SC-236, SD-7784 (Pfizer, US), SDX 103 (University of California at San Diego, US), SG 292 (Telios, US), SU-0879 (Pfizer, US), TAN-1120, TBC-1635, tesevatinib, tetrathiomolybdate, thalidomide, thrombospondin 1 inhibitor, Tie-2 ligands (Regeneron, US), tissue factor pathway inhibitors (EntreMed, US), tumor necrosis factor-alpha inhibitors, tumstatin, TZ 93, urokinase plasminogen activator inhibitors, vadimezan, vandetanib, vasostatin, vatalanib, VE-cadherin-2 antagonists, xanthorrhizol, XL 784 (Exelixis, US), ziv-aflibercept, and ZD 6126.

In embodiments, the additional anti-cancer agent(s) is an additional active agent that disrupts or inhibits RAS-RAF-ERK or PI3K-AKT-TOR signaling pathways or is a PD-1 and/or PD-L1 antagonist. In embodiments, the additional anti-cancer agent(s) is a RAF inhibitor, EGFR inhibitor, MEK inhibitor, ERK inhibitor, PI3K inhibitor, AKT inhibitor, TOR inhibitor, MCL-1 inhibitor, BCL-2 inhibitor, SHP2 inhibitor, proteasome inhibitor, or immune therapy, including monoclonal antibodies, immunomodulatory imides (IMiDs), anti-PD-1, anti-PDL-1, anti-CTLA4, anti-LAG1, anti-LAG3, and anti-OX40 agents, GITR agonists, CAR-T cells, and BiTEs.

Non-limiting examples of RAF inhibitors include dabrafenib, encorafenib, regorafenib, sorafenib, and vemurafenib.

Non-limiting examples of MEK inhibitors include binimetinib, CI-1040, cobimetinib, PD318088, PD325901, PD334581, PD98059, refametinib, selumetinib, and trametinib.

Non-limiting examples of ERK inhibitors include LY3214996, LTT462, MK-8353, SCH772984, ravoxertinib, ulixertinib, and an ERKi as described in WO 2017/068412.

Non-limiting examples of PI3K inhibitors include 17-hydroxywortmannin analogs (e.g., WO 06/044453); AEZS-136; alpelisib; AS-252424; buparlisib; CAL263; copanlisib; CUDC-907; dactolisib (WO 06/122806); demethoxyviridin; duvelisib; GNE-477; GSK1059615; IC87114; idelalisib; INK1117; LY294002; Palomid 529; paxalisib; perifosine; PI-103; PI-103 hydrochloride; pictilisib (e.g., WO 09/036, 082; WO 09/055,730); PIK 90; PWT33597; SF1126; sonolisib; TGI 00-115; TGX-221; XL147; XL-765; wortmannin; and ZSTK474.

Non-limiting examples of AKT inhibitors include Akt-1-1 (inhibits Akt1) (Barnett et al. (2005) *Biochem. J.*, 385 (Pt. 2), 399-408); Akt-1-1,2 (Barnett et al. (2005) *Biochem. J.* 385 (Pt. 2), 399-408); API-59CJ-Ome (e.g., Jin et al. (2004) *Br. J. Cancer* 91, 1808-12); 1-H-imidazo[4,5-c]pyridinyl compounds (e.g., WO05011700); indole-3-carbinol and derivatives thereof (e.g., U.S. Pat. No. 6,656,963; Sarkar and Li (2004) *J Nutr.* 134(12 Suppl), 34935-3498S); perifosine, Dasmahapatra et al. (2004) *Clin. Cancer Res.* 10(15), 5242-52, 2004); phosphatidylinositol ether lipid analogues (e.g., Gills and Dennis (2004) *Expert. Opin. Investig. Drugs* 13, 787-97); triciribine (Yang et al. (2004) *Cancer Res.* 64, 4394-9); imidazooxazone compounds including trans-3-amino-1-methyl-3-[4-(3-phenyl-5H-imidazo[1,2-c]pyrido [3,4-e][1,3]oxazin-2-yl)phenyl]-cyclobutanol hydrochloride (WO 2012/137870); afuresertib; capivasertib; MK2206; patasertib, and those disclosed in WO 2011/082270 and WO 2012/177844.

Non-limiting examples of TOR inhibitors include deforolimus; ATP-competitive TORC1/TORC2 inhibitors, including PI-103, PP242, PP30, and Torin 1; TOR inhibitors in FKBP12 enhancer, rapamycins and derivatives thereof, including temsirolimus, everolimus, WO 9409010; rapalogs, e.g. as disclosed in WO 98/02441 and WO 01/14387, e.g. AP23573, AP23464, or AP23841; 40-(2-hydroxyethyl) rapamycin, 40-[3-hydroxy(hydroxymethyl)methylpropanoate]-rapamycin; 40-epi-(tetrazolyl)-rapamycin (also called ABT578); 32-deoxorapamycin; 16-pentynyloxy-32(S)-dihydrorapanycin, and other derivatives disclosed in WO 05/005434; derivatives disclosed in U.S. Pat. No. 5,258,389, WO 94/090101, WO 92/05179, U.S. Pat. Nos. 5,118,677, 5,118,678, 5,100,883, 5,151,413, 5,120,842, WO 93/111130, WO 94/02136, WO 94/02485, WO 95/14023, WO 94/02136, WO 95/16691, WO 96/41807, WO 96/41807 and U.S. Pat. No. 5,256,790; and phosphorus-containing rapamycin derivatives (e.g., WO 05/016252).

Non-limiting examples of MCL-1 inhibitors include AMG-176, MIK665, and S63845.

Non-limiting examples of SHP2 inhibitors include SHP2 inhibitors described in WO 2019/167000 and WO 2020/022323.

Additional non-limiting examples of anti-cancer agents that are suitable for use include 2-ethylhydrazide, 2,2',2"-trichlorotriethylamine, ABVD, aceglatone, acemannan, aldophosphamide glycoside, alpharadin, amifostine, aminolevulinic acid, anagrelide, ANCER, ancestim, anti-CD22 immunotoxins, antitumorigenic herbs, apaziquone, arglabin, arsenic trioxide, azathioprine, BAM 002 (Novelos), bcl-2 (Genta), bestrabucil, biricodar, bisantrene, bromocriptine, brostallicin, bryostatin, buthionine sulfoximine, calyculin, cell-cycle nonspecific antineoplastic agents, celmoleukin, clodronate, clotrimazole, cytarabine ocfosfate, DA 3030 (Dong-A), defofamine, denileukin diftitox, dexrazoxane, diaziquone, dichloroacetic acid, dilazep, discodermolide, docosanol, doxercalciferol, edelfosine, eflornithine, EL532 (Elan), elfomithine, elsamitrucin, eniluracil, etanidazole, exisulind, ferruginol, folic acid replenisher such as frolinic acid, gacytosine, gallium nitrate, gimeracil/oteracil/tegafur combination (S-1), glycopine, histamine dihydrochloride, HIT diclofenac, HLA-B7 gene therapy (Vical), human fetal alpha fetoprotein, ibandronate, ibandronic acid, ICE chemotherapy regimen, imexon, iobenguane, IT-101 (CRLX101), laniquidar, LC 9018 (Yakult), leflunomide, lentinan, levamisole+fluorouracil, lovastatin, lucanthone, masoprocol, melarsoprol, metoclopramide, miltefosine, miproxifene, mitoguazone, mitozolomide, mopidamol, motexafin gadolinium, MX6 (Galderma), naloxone+pentazocine, nitracrine, nolatrexed, NSC 631570 octreotide (Ukrain), olaparib, P-30 protein, PAC-1, palifermin, pamidronate, pamidronic acid, pentosan polysulfate sodium, phenamet, picibanil, pixantrone, platinum, podophyllinic acid, porfimer sodium, PSK (Polysaccharide-K), rabbit antithymocyte polyclonal antibody, rasburiembodiment, retinoic acid, rhenium Re 186 etidronate, romurtide, samarium (153 Sm) lexidronam, sizofiran, sodium phenylacetate, sparfosic acid, spirogermanium, strontium-89 chloride, suramin, swainsonine, talaporfin, tariquidar, tazarotene, tegafur-uracil, temoporfin, tenuazonic acid, tetrachlorodecaoxide, thrombopoietin, tin ethyl etiopurpurin, tirapazamine, TLC ELL-12, tositumomab-iodine 131, trifluridine and tipiracil combination, troponin I (Harvard University, US), urethan, valspodar, verteporfin, zoledronic acid, and zosuquidar.

The present disclosure further provides a method for using the compounds of Formulae (I)-(VII) or pharmaceutical compositions provided herein, in combination with radiation therapy to treat cancer. Techniques for administering radiation therapy are known in the art, and these techniques can be used in the combination therapy described herein. The administration of the compound of Formulae (I)-(VII) in this combination therapy can be determined as described herein. Radiation therapy can be administered through one of several methods, or a combination of methods, including, without limitation, external-beam therapy, internal radiation therapy, implant radiation, stereotactic radiosurgery, systemic radiation therapy, radiotherapy and permanent or temporary interstitial brachy therapy. The term "brachytherapy," as used herein, refers to radiation therapy delivered by a spatially confined radioactive material inserted into the body at or near a tumor or other proliferative tissue disease site. The term is intended, without limitation, to include exposure to radioactive isotopes (e.g., At-211, I-131, I-125, Y-90, Re-186, Re-188, Sm-153, Bi-212, P-32, and radioactive isotopes of Lu). Suitable radiation sources for use as a cell conditioner of the present disclosure include both solids and liquids. By way of non-limiting example, the radiation source can be a radionuclide, such as I-125, I-131, Yb-169, Ir-192 as a solid source, I-125 as a solid source, or other radionuclides that emit photons, beta particles, gamma radiation, or other therapeutic rays. The radioactive material can also be a fluid made from any solution of radionuclide(s), e.g., a solution of I-125 or I-131, or a radioactive fluid can be produced using a slurry of a suitable fluid containing small particles of solid radionuclides, such as Au-198, Y-90. Moreover, the radionuclide(s) can be embodied in a gel or radioactive microspheres.

The present disclosure also provides methods for combination therapies in which the additional active agent is known to modulate other pathways, or other components of the same pathway, or even overlapping sets of target enzymes which are used in combination with a compound of Formulae (I)-(VII), or a pharmaceutically acceptable salt thereof. In one embodiment, such therapy includes, but is not limited to, the combination of one or more compounds of Formulae (I)-(VII) with chemotherapeutic agents, immunotherapeutic agents, hormonal therapy agents, therapeutic antibodies, targeted therapy agents, and radiation treatment, to provide a synergistic or additive therapeutic effect.

The compounds of the disclosure can be used in combination with the agents disclosed herein or other suitable agents, depending on the condition being treated. Hence, in some embodiments the one or more compounds of the disclosure will be co-administered with other agents as described above. When used in combination therapy, the compounds described herein are administered with the second agent simultaneously or separately. This administration in combination can include simultaneous administration of the two agents in the same dosage form, simultaneous administration in separate dosage forms, and separate administration. That is, a compound of Formulae (I)-(VII) and any of the agents described above can be formulated together in the same dosage form and administered simultaneously. Alternatively, a compound of Formulae (I)-(VII) and any of the agents described above can be simultaneously administered, wherein both the agents are present in separate formulations. In another alternative, a compound of Formulae (I)-(VII) can be administered just followed by and any of the agents described above, or vice versa. In some embodiments of the separate administration protocol, a compound of Formulae (I)-(VII) and any of the agents described above are administered a few minutes apart, or a few hours apart, or a few days apart.

As one aspect of the present disclosure contemplates the treatment of the disease/conditions with a combination of pharmaceutically active compounds that may be administered separately, the disclosure further relates to combining separate pharmaceutical compositions in kit form. The kit comprises two separate pharmaceutical compositions: a compound of Formulae (I)-(VII), and a second pharmaceutical compound. The kit comprises a container for containing the separate compositions such as a divided bottle or a divided foil packet. Additional examples of containers include syringes, boxes, and bags. In some embodiments, the kit comprises directions for the use of the separate components. The kit form is particularly advantageous when the separate components are preferably administered in different dosage forms (e.g., oral and parenteral), are administered at different dosage intervals, or when titration of the individual components of the combination is desired by the prescribing health care professional.

The present disclosure also provides for the compound of Formulae (I)-(VII), or the pharmaceutically acceptable salt thereof, for use in therapy, or use of the compound of Formulae (I)-(VII), or the pharmaceutically acceptable salt thereof, in therapy. The present disclosure also provides for the compound of Formulae (I)-(VII), or the pharmaceutically acceptable salt thereof, for use in treating cancer, or use of a compound of Formulae (I)-(VII), or the pharmaceutically acceptable salt thereof, for treating cancer. The present disclosure also provides for the compound of Formulae (I)-(VII), or the pharmaceutically acceptable salt thereof, for the preparation of a medicament for the treatment of cancer, or use of the compound of Formulae (I)-(VII), or the pharmaceutically acceptable salt thereof, for the preparation of a medicament for the treatment of cancer. The present disclosure also provides for the compound of Formulae (I)-(VII), or the pharmaceutically acceptable salt thereof, and an additional anti-cancer agent, for use in the treatment of cancer, or use of the compound of Formulae (I)-(VII), or the pharmaceutically acceptable salt thereof, and the additional anti-cancer agent for treating cancer. The disclosure also provides the compound of Formulae (I)-(VII), or the pharmaceutically acceptable salt thereof, and an additional anti-cancer agent, for the preparation of a medicament for the treatment of cancer, or use of the compound of Formulae (I)-(VII), or the pharmaceutically acceptable salt thereof, and the additional anti-cancer agent, for the preparation of a medicament for the treatment of cancer. The present disclosure also provides for a pharmaceutical composition comprising the compound of Formulae (I)-(VII), or the pharmaceutically acceptable salt thereof, for use in the treatment of cancer, or use of the pharmaceutical composition comprising the compound of Formulae (I)-(VII), or the pharmaceutically acceptable salt thereof, for treating cancer. The present disclosure also provides for a pharmaceutical composition comprising the compound of Formulae (I)-(VII), or the pharmaceutically acceptable salt thereof, and an additional anti-cancer agent, for use in the treatment of cancer, or use of the pharmaceutical composition comprising the compound of Formulae (I)-(VII), or the pharmaceutically acceptable salt thereof, and the additional anti-cancer agent, for treating cancer.

Methods of Preparing the Compounds of the Disclosure

The compounds described herein can be prepared according to the procedures of the following schemes and examples, using appropriate materials and are further exemplified by the following specific examples. The compounds illustrated in the examples are not, however, to be construed as forming the only genus that is considered as the disclosure. The examples further illustrate details for the preparation of the compounds of the present disclosure. Those skilled in the art will readily understand that known variations of the conditions and processes of the following preparative procedures can be used to prepare these compounds. For instance, in some cases, the order of carrying out the steps of reaction schemes may be varied to facilitate the reaction or to avoid unwanted reaction products. These examples are provided for the purpose of further illustration only and are not intended to be limitations on the disclosure. Any intermediates described below may be referred to herein by their number preceded by "Int-."

Throughout the synthetic schemes and examples, abbreviations and acronyms may be used with the following meanings unless otherwise indicated: aq.=aqueous; atm=atmosphere; Bodipy-GDP=mixture of ((2R,3S,4R,5R)-5-(2-amino-6-oxo-1,6-dihydro-9H-purin-9-yl)-3-(((2-(3-(5,5-difluoro-7,9-dimethyl-5H-414,514-dipyrrolo[1,2-c:2',1'-f][1,3,2]diazaborinin-3-yl)propanamido)ethyl)carbamoyl)oxy)-4-hydroxytetrahydrofuran-2-yl)methyl hydrogen diphosphate and ((2R,3R,4R,5R)-5-(2-amino-6-oxo-1,6-dihydro-9H-purin-9-yl)-4-(((2-(3-(5,5-difluoro-7,9-dimethyl-5H-414,514-dipyrrolo[1,2-c:2',1'-f][1,3,2]diazaborinin-3-yl)propanamido)ethyl)carbamoyl)oxy)-3-hydroxytetrahydrofuran-2-yl)methyl hydrogen diphosphate (Invitrogen™, catalog number G22360); cataCXium A Pd G2=chloro[(di(1-adamantyl)-N-butylphosphine)-2-(2-aminobiphenyl)]palladium(II); cataCXium A Pd G3=mesylate [(di(1-adamantyl)-n-butylphosphine)-2-(2'-amino-1,1'-biphenyl)]palladium(II); conc.=concentration; D=deuterium; DAST=(diethylamino)sulfur trifluoride; dba=dibenzyl- ideneacetone; DCM=dichloromethane; DHP=3,4-dihydro-2H-pyran; DIBAL-H=diisobutylaluminum hydride; DIPEA= DIEA=N,N-diisopropylethylamine; DMF=N,N-dimethylformamide; DMSO=dimethylsulfoxide; dppf=1,1'-bis(diphenylphosphino)ferrocene; EDTA=ethylenediaminetetraacetic acid; equiv, eq.=equivalent(s); ESI=electrospray; Et=ethyl; EtOAc=ethyl acetate; EtOH=ethanol; GDP=guanosine diphosphate; GTP=guanosine triphosphate; h=hour; HEPES=4-(2-hydroxyethyl)-1-piperazineethanesulfonic acid; HMPA=hexamethylphosp- horamide; HPLC=high pressure liquid chromatography; Int=intermediate; iPr=isopropyl; IPA=i-PrOH=isopropyl alcohol; KHMDS=potassium bis(trimethylsilyl)amide; LCMS=liquid chromatography-mass spectrometry; min=minute; LDA=lithium diisopropylamide; LiHMDS=Lithium bis(trimethylsilyl)amide; M=Molar; m-CPBA=3-chlorobenzoperoxoic acid=m-chloroperoxybenzoic acid; Me=methyl; MeCN, ACN=acetonitrile; MeOH=methanol; MS=mass spectrometry; NBS=N-bromosuccinimide; ND=not determined; NMR=nuclear magnetic resonance; PG=propylene glycol; Pet. ether=petroleum ether; $POCl_3$=phosphorus(V) oxide chloride; RP-HPLC=reverse phase HPLC; r.t.=room temperature; sat.=saturated; SEM=(2-methoxyethyl)trimethylsilane; SEMCl=(2-chloromethoxyethyl)trimethylsilane; SFC= supercritical fluid chromatography; SOS=Son of Sevenless; SPhos Pd G3=(2-dicyclohexylphosphino-2',6'-dimethoxybiphenyl)[2-(2'-amino-1,1'-biphenyl)]palladium(II) methanesulfonate; TBAF=tetra-n-butylammonium fluoride; TBS=tert-butyldimethylsilyl; TBSCl=tert-butyldimethylchlorosilane; TEA=$Et_3$N=triethylamine; Tf=trifluoromethylsulfonyl; $Tf_2O$=trifluoromethanesulfonic anhydride; TFA=trifluoroacetic acid; THF=tetrahydrofuran; THP=tetrahydropyran; TIPS=triisopropypsilyl; TIPSCCBr= (bromoethynyl)triisopropylsilane; TLC=thin layer chromatographyTR-FRET=time-resolved fluorescence resonance energy transfer; TsOH=p-toluenesulfonic acid=4-methylbenzenesulfonic acid; Tween=polyoxyethylene (20) sorbitan monolaurate; VCD=vibrational circular dichroism; v, v/v=volume, volume to volume; w, w/w=weight, weight to weight, μm=micrometer.

EXAMPLES

Concentration refers to the removal of the volatile components at reduced pressure (e.g., by rotary evaporation) unless otherwise noted. All temperatures are in degrees Celsius unless otherwise noted. Mass spectra (MS) were measured by electrospray ion-mass spectroscopy (ESI) in positive ion detection mode and m/z refers to the [M+H]$^+$ ion unless otherwise noted. $^1$H NMR spectra were recorded at 400-600 MHz at ambient temperature unless otherwise noted. Protons reported as 0.5 H are due to rotameric signals. RP-HPLC refers to reverse-phase HPLC on C18-functionalized preparative or semi-preparative columns with gradient elution using acetonitrile and water modified with trifluoroacetic acid or ammonium hydroxide as eluents and fractions were lyophilized or concentrated by rotary evaporation unless otherwise noted. Purification by column chromatography on silica gel was accomplished using a flash chromatography system (e.g., ISCO® or Biotage®) and commercial pre-packed silica gel columns with elution using the stated solvent systems. Compounds described herein were synthesized as the racemates unless otherwise noted in the experimental procedures and compound tables. Certain products/intermediates in the examples include indication of "Peak 1" and/or "Peak 2", which refer to the order of elution of the indicated product/intermediate from the chromatography column (e.g., an SFC column) used to isolate the compound under the specified conditions. Thus, for example, Peak 1 refers to the first eluting compound, e.g., first eluting stereoisomer, under the specified conditions.

SFC and HPLC Columns used in the resolution of stereoisomers are summarized in the following table:

Intermediate Syntheses

Intermediate 1: (S)-3-(((tert-butyldimethylsilyl)oxy)methyl)-1,4-oxazepane (Int-1)

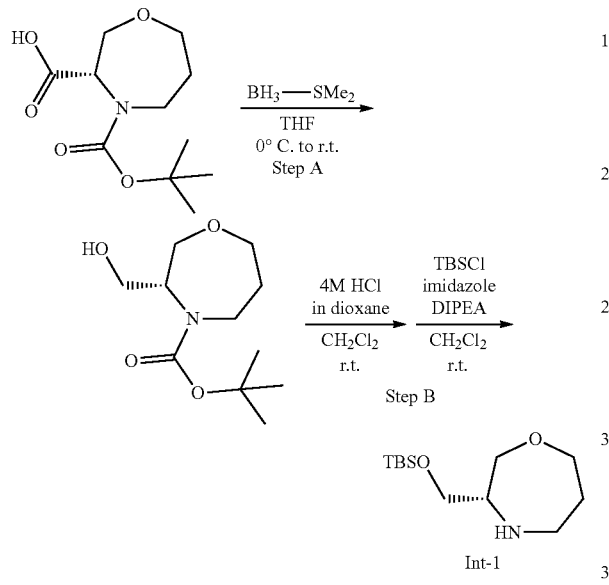

Step A: Tert-butyl (R)-3-(hydroxymethyl)-1,4-oxazepane-4-carboxylate

To a solution of (S)-4-(tert-butoxycarbonyl)-1,4-oxazepane-3-carboxylic acid (980 mg, 4.00 mmol) in THF (9.8 mL) was added borane dimethyl sulfide complex (0.799 mL, 7.99 mmol, 10 M) at 0° C. After stirring the mixture at room temperature for 19 h, the reaction was quenched by the addition of $H_2O$. The reaction mixture was extracted with EtOAc, washed with brine, dried over $Na_2SO_4$, filtered and concentrated in vacuo. The residue was purified by flash silica gel chromatography (10-100%, EtOAc gradient in hexane) to afford tert-butyl (R)-3-(hydroxymethyl)-1,4-oxazepane-4-carboxylate. MS (ESI): m/z $(M+H)^+$ 232.

Step B: (S)-3-(((tert-butyldimethylsilyl)oxy)methyl)-1,4-oxazepane (Int-1)

To a solution of tert-butyl (R)-3-(hydroxymethyl)-1,4-oxazepane-4-carboxylate (767 mg, 3.32 mmol) in $CH_2Cl_2$ (7.7 mL) was added HCl (4.97 mL, 19.9 mmol, 4.0 M in dioxane). After stirring the mixture at room temperature for 1 h, the reaction mixture was concentrated in vacuo. The crude mixture was used directly in the next step without further purification.

To the crude mixture amine hydrochloride in $CH_2Cl_2$ (7.7 mL) were added DIPEA (2.84 mL, 16.6 mmol), imidazole (226 mg, 3.32 mmol) and tert-butyldimethylchlorosilane (650 mg, 4.31 mmol) at 0° C. After stirring the mixture at room temperature for 15 h, the reaction was quenched by the addition of $H_2O$. The reaction mixture was extracted with $CHCl_3$, washed with brine, dried over $Na_2SO_4$, filtered and concentrated in vacuo to afford (S)-3-(((tert-butyldimethylsilyl)oxy)methyl)-1,4-oxazepane (Int-1). This compound was used directly in the next step without further purification. $^1$H NMR (400 MHz, CDCl$_3$) δ 3.89-3.84 (m, 1H), 3.84-3.81 (m, 1H), 3.80-3.70 (m, 1H), 3.53 (dd, J=9.6, 5.2 Hz, 1H), 3.45 (dd, J=9.6, 7.2 Hz, 1H), 3.36 (dd, J=12.4, 8.9 Hz, 1H), 3.15 (dt, J=13.5, 4.9 Hz, 1H), 3.10-3.00 (m, 1H), 2.99-2.92 (m, 1H), 2.90-2.81 (m, 1H), 2.54-2.41 (m, 1H), 1.90-1.84 (m, 1H), 0.89 (s, 9H), 0.05 (s, 6H).

Intermediate 2s: (S)-5-chloro-4-fluoro-2-(methylthio)-8a,9,12,13-tetrahydro-8H,11H-7,10-dioxa-1,3,6,13a-tetraazanaphtho[1,8-ab]heptalene (Int-2)

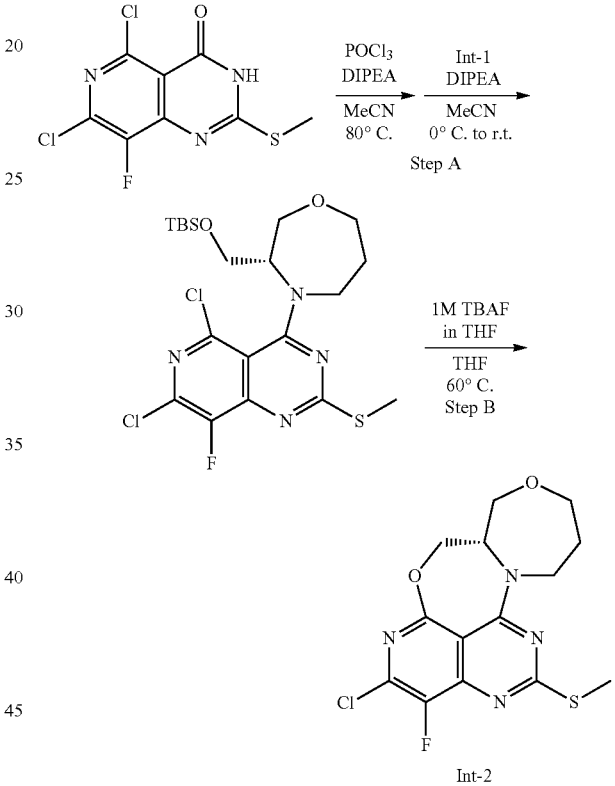

Step A: (S)-3-(((tert-butyldimethylsilyl)oxy)methyl)-4-(5,7-dichloro-8-fluoro-2-(methylthio)pyrido[4,3-d]pyrimidin-4-yl)-1,4-oxazepane To a suspension of 5,7-dichloro-8-fluoro-2-(methylthio)pyrido[4,3-d]pyrimidin-4(3H)-one (900 mg, 3.21 mmol) in MeCN (16 mL) were added POCl$_3$ (0.360 mL, 3.86 mmol) and DIPEA (1.10 mL, 6.43 mmol). After stirring the mixture at 80° C. for 1 h, the reaction mixture was cooled to 0° C. To the reaction mixture were added DIPEA (1.10 mL, 6.43 mmol) and (S)-3-(((tert-butyldimethylsilyl)oxy)methyl)-1,4-oxazepane (Int-1) at 0° C. After stirring the mixture at room temperature for 2 h, the reaction was quenched by the addition of $H_2O$. The reaction mixture was extracted with EtOAc, washed with brine, dried over $Na_2SO_4$, filtered and concentrated in vacuo. The residue was purified by flash silica gel chromatography (10-50%, EtOAc gradient in hexane) to afford (S)-3-(((tert-butyldimethylsilyl)oxy)methyl)-4-(5,7-dichloro-8-fluoro-2-(methylthio)pyrido[4,3-d]pyrimidin-4-yl)-1,4-oxazepane. MS (ESI): m/z (M+H)$^+$ 507.

Step B: (S)-5-chloro-4-fluoro-2-(methylthio)-8a,9,12,13-tetrahydro-8H,11H-7,10-dioxa-1,3,6,13a-tetraazanaphtho[1,8-ab]heptalene (Int-2)

To a solution of (S)-3-(((tert-butyldimethylsilyl)oxy)methyl)-4-(5,7-dichloro-8-fluoro-2-(methylthio)pyrido[4,3-d]pyrimidin-4-yl)-1,4-oxazepane (1.53 g, 3.02 mmol) in THF (15 mL) was added TBAF (9.05 mL, 9.05 mmol, 1.0 M in THF). After stirring the mixture at 60° C. for 12 h, the reaction was cooled to room temperature. The reaction mixture was extracted with EtOAc, washed with phosphate buffer, brine, dried over Na$_2$SO$_4$, filtered and concentrated in vacuo. The residue was suspended with CHCl$_3$/isopropyl ether, filtered, and washed by isopropyl ether. The filtrate was concentrated in vacuo and purified by flash silica gel chromatography (10-80%, EtOAc gradient in hexane) to afford (S)-5-chloro-4-fluoro-2-(methylthio)-8a,9,12,13-tetrahydro-8H,11H-7,10-dioxa-1,3,6,13a-tetraazanaphtho[1,8-ab]heptalene (Int-2). MS (ESI): m/z (M+H)$^+$ 357. $^1$H NMR (400 MHz, DMSO-d$_6$) δ 5.03-4.94 (m, 1H), 4.70-4.63 (dd, J=13.5, 4.5 Hz, 1H), 4.49 (d, J=13.5 Hz, 1H), 4.32-4.25 (m, 1H), 4.07 (dd, J=12.3, 3.8 Hz, 1H), 3.89-3.81 (m, 1H), 3.61-3.52 (m, 1H), 3.44-3.33 (m, 2H), 2.53 (s, 3H), 2.02-1.80 (m, 2H).

Intermediate 3: (S,Z)-(2-(fluoromethylene)tetrahydro-1H-pyrrolizin-7a(5H)-yl)methanol (Int-3)

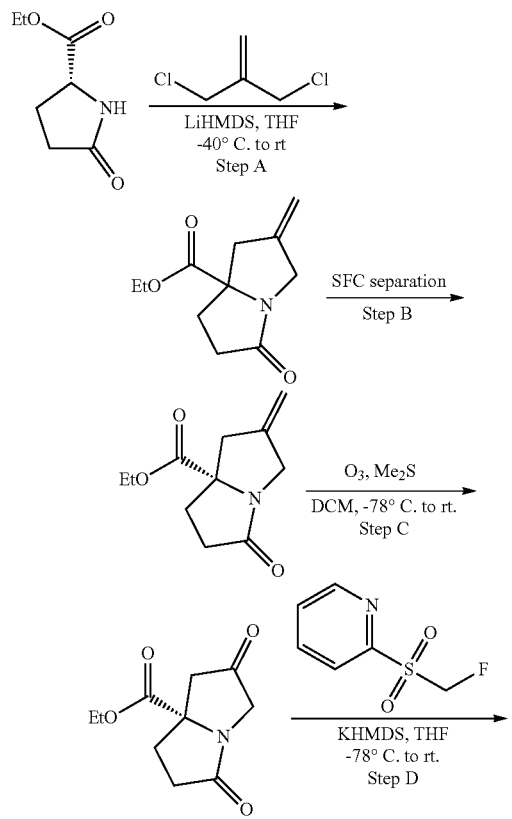

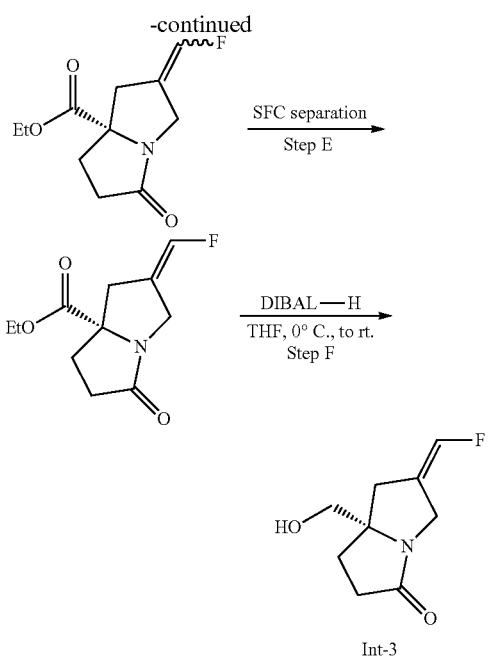

Step A: Ethyl 2-methylene-5-oxotetrahydro-1H-pyrrolizine-7a(5H)-carboxylate

To a mixture of ethyl (R)-5-oxopyrrolidine-2-carboxylate (50 g, 318 mmol) and 3-chloro-2-(chloromethyl)prop-1-ene (63.6 g, 509 mmol) in THF (300 mL) was added dropwise LiHMDS (636 mL, 636 mmol, 1 M in THF) at −40° C. under nitrogen atmosphere. Then, the mixture was allowed to warm to room temperature and stirred for 20 h. TLC (petroleum ether/ethyl acetate=1/1) showed the starting material was consumed and three new major spots were formed. The reaction mixture was quenched with saturated NH$_4$Cl solution (200 mL) and extracted with EtOAc (200 mL×3). The combined organic layer was washed with brine, dried over Na$_2$SO$_4$, filtered and concentrated under reduced pressure to give a crude product, which was purified by column chromatography (ISCO®; 120 g SepaFlash® Silica Flash Column, Eluent of 0-50% ethyl acetate in petroleum ether gradient at 80 mL/min) to give racemic ethyl 2-methylene-5-oxotetrahydro-1H-pyrrolizine-7a(5H)-carboxylate as colorless oil. MS (ESI): m/z (M+H)$^+$ 210.

Step B: Ethyl (S)-2-methylene-5-oxotetrahydro-1H-pyrrolizine-7a(5H)-carboxylate

The racemic ethyl 2-methylene-5-oxotetrahydro-1H-pyrrolizine-7a(5H)-carboxylate (50 g, 239 mmol) was separated by preparative SFC (Instrument SFC-17 Column DAICEL CHIRALPAK AS (250 mm×50 mm, 10 μm) Condition Neu-EtOH, Begin B 25, End B 25, Gradient Time (min) 200, 100% B Hold Time (min) 10 FlowRate (mL/min) 200 Injections 200) to afford ethyl (R)-2-methylene-5-oxotetrahydro-1H-pyrrolizine-7a(5H)-carboxylate (the first eluting isomer from SFC) and ethyl (S)-2-methylene-5-oxotetrahydro-1H-pyrrolizine-7a(5H)-carboxylate (the second eluting isomer from SFC). MS (ESI): m/z (M+H)$^+$ 210. $^1$H NMR (400 MHz, CDCl$_3$) δ 5.07-4.88 (m, 2H), 4.22 (d, J=15.6 Hz, 1H), 4.13 (q, J=7.2 Hz, 2H), 3.70-3.58 (m, 1H), 2.98 (d, J=15.6 Hz, 1H), 2.78-2.65 (m, 1H), 2.54 (ddd, J=13.1, 9.1, 1.6, 1H), 2.46-2.33 (m, 2H), 2.12-2.00 (m, 1H), 1.20 (t, J=7.1 Hz, 3H).

Step C: Ethyl (S)-2,5-dioxotetrahydro-1H-pyrrolizine-7a(5H)-carboxylate

To a solution of ethyl (S)-2-methylene-5-oxotetrahydro-1H-pyrrolizine-7a(5H)-carboxylate (790 mg, 3.78 mmol) in DCM (15 mL) was bubbled with $O_3$ at −78° C. until the mixture was turned to blue. After the reaction completion, dimethyl sulfide (469 mg, 7.55 mmol) was added to the mixture and the mixture was stirred at 20° C. for 16 h. LCMS showed the starting material was consumed and desired MS was found. The combined organic layers were washed with brine (20 mL), dried over $Na_2SO_4$, flitered, and concentrated under reduced pressure to give the crude product, which was purified by flash silica gel chromatography (ISCO®; 4 g SepaFlash® Silica Flash Column, Eluent of 0-50% ethyl acetate in petroleum ether gradient at 40 mL/min) to give ethyl (S)-2,5-dioxotetrahydro-1H-pyrrolizine-7a(5H)-carboxylate. MS (ESI): m/z $(M+H)^+$ 212.

Step D: Ethyl (S)-2-(fluoromethylene)-5-oxotetrahydro-1H-pyrrolizine-7a(5H)-carboxylate To a solution of 2-((fluoromethyl)sulfonyl)pyridine (804 mg, 4.59 mmol) in THF (10.0 mL) was added KHMDS (5.42 mL, 5.42 mmol, 1 M in THF) at −78° C. under nitrogen atmosphere. After 30 min, ethyl (S)-2,5-dioxotetrahydro-1H-pyrrolizine-7a(5H)-carboxylate (881 mg, 4.17 mmol) in THF (3 mL) was added slowly at −78° C., and the mixture was stirred for 3 h. Then, the reaction system was warmed to room temperature for 1 h. The reaction was quenched with aqueous saturated ammonium chloride solution (1 mL), followed by HCl (2 mL, 3 M in water). The mixture was extracted with EtOAc (20 mL×3). The organic layer was dried over sodium sulfate, filtered and the solvent was evaporated under reduced pressure to give the crude product. The crude product was purified by flash chromatography on silica gel (gradient:0-30% ethyl acetate/petroleum ether) to give ethyl (S)-2-(fluoromethylene)-5-oxotetrahydro-1H-pyrrolizine-7a(5H)-carboxylate. MS (ESI): m/z $(M+H)^+$ 228.

Step E: Ethyl (S,Z)-2-(fluoromethylene)-5-oxotetrahydro-1H-pyrrolizine-7a(5H)-carboxylate Ethyl (S)-2-(fluoromethylene)-5-oxotetrahydro-1H-pyrrolizine-7a(5H)-carboxylate (210 mg, 0.924 mmol) was separated by preparative SFC (Column DAICEL CHIRALPAK AY-H (250 mm×30 mm, 5 µm) Condition 0.1% $NH_3H_2O$ EtOH Begin B 10 End B 10 Gradient Time (min) 60 100% B Hold Time 60 Flow Rate (mL/min) 90 Injections 60) to afford ethyl (S,Z)-2-(fluoromethylene)-5-oxotetrahydro-1H-pyrrolizine-7a(5H)-carboxylate (the first eluting isomer from SFC) and ethyl (S,E)-2-(fluoromethylene)-5-oxotetrahydro-1H-pyrrolizine-7a(5H)-carboxylate (the second eluting isomer from SFC). MS (ESI): m/z $(M+H)^+$ 228.

Step F: (S,Z)-(2-(fluoromethylene)tetrahydro-1H-pyrrolizin-7a(5H)-yl)methanol (Int-3)

To a solution of ethyl (S,Z)-2-(fluoromethylene)-5-oxotetrahydro-1H-pyrrolizine-7a(5H)-carboxylate (84.6 g, 372 mmol) in THF (508 mL) was added DIBAL-H (1.12 L, 1 M in toluene) dropwise at 0° C. The resulting solution was warmed to room temperature and stirred for 1 h. The reaction mixture was quenched with $Na_2SO_4 \cdot 10H_2O$. The solid was filtered, and the filtrate was concentrated under reduced pressure. HCl (400 mL, 4 M in ethyl acetate) was added and then the resulting mixture was stirred for 30 min at rt. The mixture was then concentrated under reduced pressure to give (S,Z)-(2-(fluoromethylene)tetrahydro-1H-pyrrolizin-7a(5H)-yl)methanol (Int-3, HCl salt) which was used directly in the next step without further purification. MS (ESI): m/z $(M+H)^+$ 172.

Intermediate 4: (6-chloro-5-cyclopropyl-1-(tetrahydro-2H-pyran-2-yl)-1H-indazol-4-yl)boronic acid (Int-4)

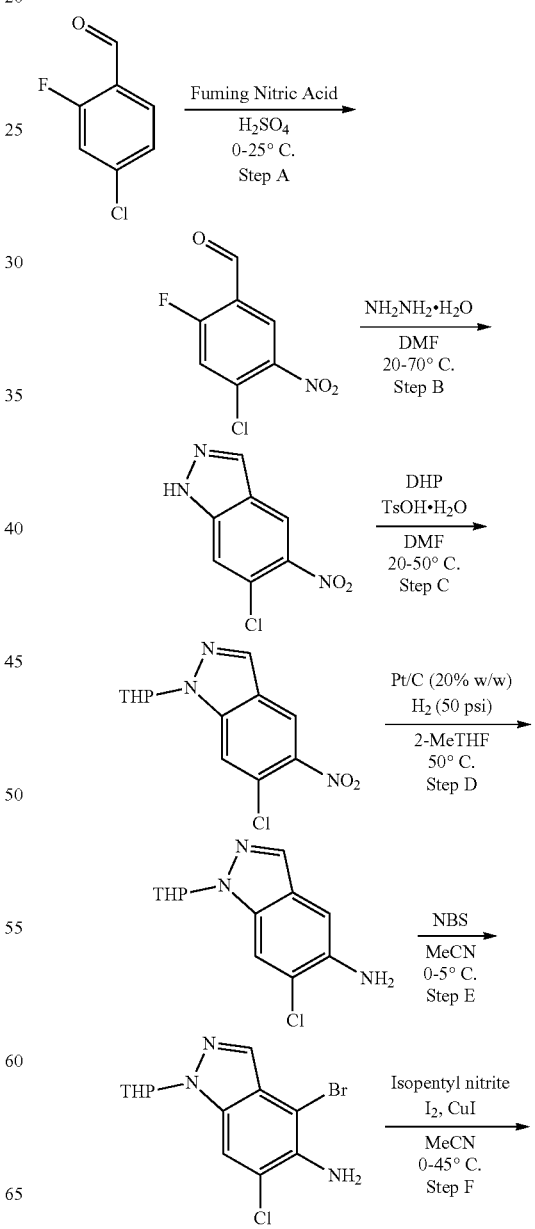

-continued

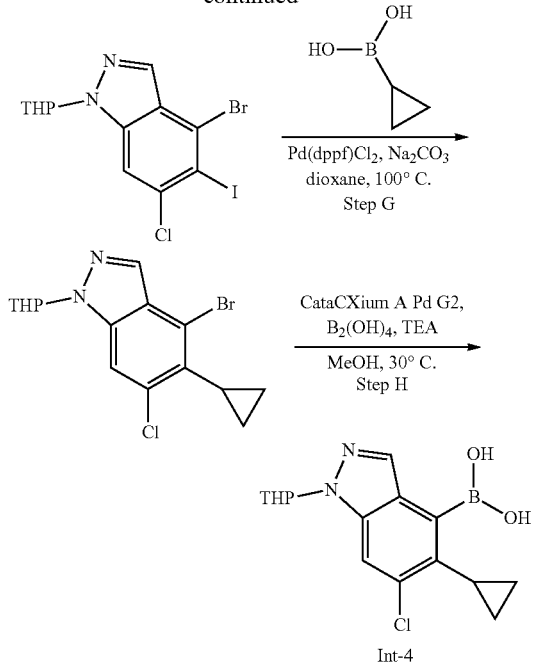

Step A: 4-chloro-2-fluoro-5-nitrobenzaldehyde 4-chloro-2-fluorobenzaldehyde (1.00 kg, 6.31 mol, 1.00 eq) was dissolved in $H_2SO_4$ (5.00 L) and denoted as system R1. Fuming nitric acid (517 g, 8.20 mol, 1.30 eq) was dissolved in $H_2SO_4$ (2.00 L) and denoted as system R2. The systems R1 and R2 were passed through a fluid chemistry instrument and reacted for 3 h at 0-25° C. The reaction was monitored with TLC. The mixture was poured into ice-water (36.0 L) and solid was separated out. The mixture was then filtered, and the cake was washed with water (5.00 L×2). The product was dried under air to yield 4-chloro-2-fluoro-5-nitrobenzaldehyde. The product was used directly in the next step without further purification. $^1$H NMR (400 MHz, $CDCl_3$) δ 10.31 (s, 1H), 8.46 (d, J=6.8 Hz, 1H), 7.48 (d, J=9.2 Hz, 1H).

Step B: 6-chloro-5-nitro-1H-indazole

To a solution of 4-chloro-2-fluoro-5-nitrobenzaldehyde (1.80 kg, 982 mmol, 1.00 eq) in DMF (12.6 L) was added $NH_2NH_2 \cdot H_2O$ (1.94 kg, 30.9 mol, 1.88 L, 80% purity, 3.50 eq) dropwise at 20-30° C. The reaction mixture was stirred at 60-70° C. for 3 h. The reaction mixture was then cooled to 20-30° C., and water (21.6 L) was added. Solid was precipitated and the resulting mixture was filtered, and the cake was washed with water (9.00 L). The product was dried under air to yield 6-chloro-5-nitro-1H-indazole. The product was used directly in the next step without further purification. $^1$H NMR (400 MHz, DMSO-$d_6$) δ 13.76 (s, 1H), 8.67 (s, 1H), 8.37 (s, 1H), 7.92 (s, 1H).

Step C: 6-chloro-5-nitro-1-(tetrahydro-2H-pyran-2-yl)-1H-indazole

To a solution of 6-chloro-5-nitro-1H-indazole (1.50 kg, 7.59 mol, 1.00 eq) in THF (10.5 L) at 20-30° C. were added TsOH·$H_2O$ (144 g, 759 mmol, 0.10 eq) and DHP (1.28 kg, 15.1 mol, 1.39 L, 2.00 eq) at 20-30° C. The reaction mixture was stirred at 40-50° C. for 5 h. The reaction mixture was concentrated under vacuum at 40-50° C. and then diluted with EtOAc (7.50 L) and water (10.5 L). The organic layer was washed with aq. $NaHCO_3$ (7.50 L) and brine (7.50 L), dried over $Na_2SO_4$. The organic solution was concentrated under reduced pressure to 1/3 at 40-45° C., and n-heptane (7.50 L) was added and concentrate to 1/3 for 3 times. The mixture was then filtered, and the resulting cake was washed with n-heptane (6.00 L) to yield 6-chloro-5-nitro-1-(tetrahydro-2H-pyran-2-yl)-1H-indazole. $^1$H NMR (400 MHz, $CDCl_3$) δ 8.38 (s, 1H), 8.15 (s, 1H), 7.81 (s, 1H), 5.72 (dd, J=9.2, 8.8 Hz, 1H), 4.03-3.99 (m, 1H), 3.81-3.77 (m, 1H), 2.49-2.45 (m, 1H), 2.16-2.12 (m, 2H), 1.78-1.71 (m, 3H).

Step D: 6-chloro-1-(tetrahydro-2H-pyran-2-yl)-1H-indazol-5-amine

To a solution of 6-chloro-5-nitro-1-(tetrahydro-2H-pyran-2-yl)-1H-indazole (500 g, 479 mmol, 1.00 eq) in 2-MeTHF (3.50 L) was added Pt/C (100 g, 23.7 mmol) to the reactor under Ar at 20° C. The resulting mixture was degassed under vacuum and then purged with $H_2$ three times. The reaction mixture was stirred at 50° C. under $H_2$ (50 psi) for 12 h. The mixture was filtered, and the cake was washed with 2-MeTHF (2.50 L×2). The filtrate was concentrated under vacuum at 40-50° C. to yield 6-chloro-1-(tetrahydro-2H-pyran-2-yl)-1H-indazol-5-amine. The product was used directly in the next step without further purification. $^1$H NMR (400 MHz, $CDCl_3$) δ 7.81 (s, 1H), 7.59 (s, 1H), 7.02 (s, 1H), 5.61-5.58 (dd, J=9.2, 9.2 Hz, 1H), 4.03-4.00 (m, 3H), 3.76-3.71 (m, 1H), 2.52-2.49 (m, 1H), 2.14-2.05 (m, 2H), 1.77-1.65 (m, 3H).

Step E: 4-bromo-6-chloro-1-(tetrahydro-2H-pyran-2-yl)-1H-indazol-5-amine

To a solution of 6-chloro-1-(tetrahydro-2H-pyran-2-yl)-1H-indazol-5-amine (450 g, 1.79 mol, 1.00 eq) in MeCN (3.15 L) was added NBS (381 g, 2.15 mol, 1.20 eq) in four batches under $N_2$ at 0-5° C. The resulting mixture was stirred at 0-5° C. for 3 h. The reaction mixture was then poured into aq. $NaHCO_3$ (3.15 L) and then extracted with EtOAc (4.50 L). The organic layer was then washed with brine (4.50 L), and then dried over $Na_2SO_4$. The organic solution was concentrated under reduced pressure and the residue was purified by column chromatography ($SiO_2$, petroleum ether/ethyl acetate=100/1 to 1/1) to yield 4-bromo-6-chloro-1-(tetrahydro-2H-pyran-2-yl)-1H-indazol-5-amine. $^1$H NMR (400 MHz, $CDCl_3$) δ 7.83 (s, 1H), 7.58 (s, 1H), 5.60 (dd, J=9.2, 8.4 Hz, 1H), 4.35 (s, 2H) 3.98-3.97 (m, 1H), 3.80-3.69 (m, 1H), 2.52-2.45 (m, 1H), 2.15-2.05 (m, 2H), 1.80-1.65 (m, 3H).

Step F: 4-bromo-6-chloro-5-iodo-1-(tetrahydro-2H-pyran-2-yl)-1H-indazole

To a solution of 4-bromo-6-chloro-1-(tetrahydro-2H-pyran-2-yl)-1H-indazol-5-amine in MeCN (2.10.L) were added $I_2$ (268 g, 1.06 mol, 213 mL, 1.00 eq) and CuI (20.1 g, 105 mmol, 0.10 eq) at 0° C. Isopentyl nitrite (148 g, 1.27 mol, 171 mL, 1.20 eq) was then added dropwise to the mixture at 0° C. The resulting mixture was warmed to 45° C. and stirred for 3 h. The reaction was quenched by adding $Na_2SO_3$ (2.50 L) at 25° C. The mixture as then extracted with EtOAc (2.50 L×2) and the combined organic layers were washed with brine (2.50 L), dried over $Na_2SO_4$, filtered and concentrated under reduced pressure. The residue was purified by silica gel column chromatography (petroleum ether/ethyl acetate=100/1 to 0/1) to yield 4-bromo-6-chloro-5-iodo-1-(tetrahydro-2H-pyran-2-yl)-1H-indazole. $^1$H NMR (400 MHz, CDCl$_3$) δ 7.93 (s, 1H), 7.78 (d, J=1.6 Hz, 1H), 5.66-5.63 (m, 1H), 3.98 (d, J=11.6 Hz 1H), 3.77-3.72 (m, 1H), 2.49-2.45 (m, 1H), 2.13-2.10 (m, 2H), 1.76-1.68 (m, 3H).

Step G: 4-bromo-6-chloro-5-cyclopropyl-1-(tetrahydro-2H-pyran-2-yl)-1H-indazole

To a solution of 4-bromo-6-chloro-5-iodo-1-(tetrahydro-2H-pyran-2-yl)-1H-indazole (50.0 g, 90.6 mmol, 1.00 eq) in dioxane (350 mL) were added Na$_2$CO$_3$ (1 M, 453 mL, 5.00 eq), cyclopropylboronic acid (9.34 g, 108.mmol, 1.20 eq), and Pd(dppf)Cl$_2$ (13.2 g, 18.1 mmol, 0.20 eq) under N$_2$. The reaction mixture was stirred at 100° C. for 12 h. The reaction was quenched by adding H$_2$O (350 mL) at 25° C., and the resulting mixture was extracted with EtOAc (350 mL×2). The combined organic layers were washed with brine (350 mL) and dried over Na$_2$SO$_4$. The organic solution was concentrated under reduced pressure and the residue was purified by column chromatography (SiO$_2$, Petroleum ether/Ethyl acetate=50/1 to 1/1) followed by prep-HPLC (column: Welch Xtimate C18 250×100 mm #10 μm; mobile phase: [H$_2$O (10 mM NH$_4$HCO$_3$)-ACN]; gradient: 70%-100% over 18.0 min) to yield 4-bromo-6-chloro-5-cyclopropyl-1-(tetrahydro-2H-pyran-2-yl)-1H-indazole. $^1$H NMR (400 MHz, CDCl$_3$) δ 7.98 (s, 1H), 7.62 (s, 1H), 5.64-5.61 (m, 1H), 4.01-3.97 (m, 1H), 3.75-3.71 (m, 1H), 2.50-2.47 (m, 1H), 2.13-2.08 (m, 2H), 1.84-1.67 (m, 4H), 1.22-1.19 (m, 2H), 0.80-0.77 (m, 2H).

Step H: (6-chloro-5-cyclopropyl-1-(tetrahydro-2H-pyran-2-yl)-1H-indazol-4-yl)boronic acid (Int-4)

To a solution of 4-bromo-6-chloro-5-cyclopropyl-1-(tetrahydro-2H-pyran-2-yl)-1H-indazole (8 g, 22.49 mmol) in MeOH (60 mL) were added TEA (12.54 mL, 90 mmol), tetrahydroxydiboron (3.02 g, 33.7 mmol) and mesylate[(di(1-adamantyl)-n-butylphosphine)-2-(2'-amino-1,1'-biphenyl)]palladium(II) (1.504 g, 2.249 mmol) at 20° C. under N$_2$ atmosphere. The reaction was stirred at 30° C. for 2 h under N$_2$ atmosphere. The reaction mixture was concentrated in vacuo and the residue was purified by flash silica gel chromatography (ISCO®; 80 g Agela® Silica Flash Column, 0-10% gradient of EtOAc/EtOH=3:1 in petroleum ether at 40 mL/min, dry loaded) to give (6-chloro-5-cyclopropyl-1-(tetrahydro-2H-pyran-2-yl)-1H-indazol-4-yl)boronic acid (Int-4). MS (ESI): m/z (M+H)$^+$ 321.

Intermediate 5: N-methoxy-N-methyl-1-((2-(trimethylsilyl)ethoxy)methyl)-1H-pyrazole-4-carboxamide (Int-5)

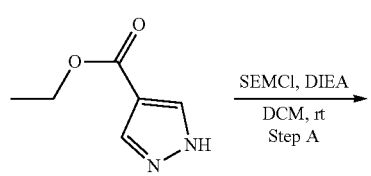

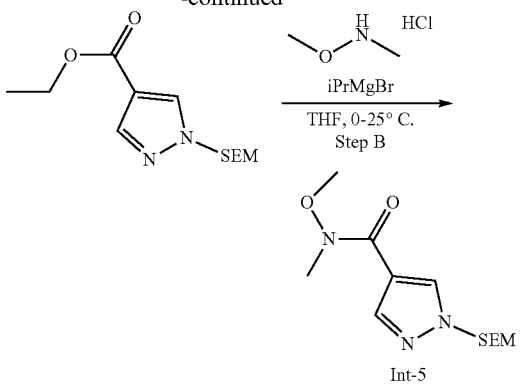

Step A: Ethyl 1-((2-(trimethylsilyl)ethoxy)methyl)-1H-pyrazole-4-carboxylate

To a solution of ethyl 1H-pyrazole-4-carboxylate (13.8 g, 98 mmol) in DCM (100 mL) was added DIEA (25.4 g, 196 mmol) and the mixture was stirred for 15 min at 0° C. (2-chloromethoxyethyl)trimethylsilane (24.5 g, 147 mmol) was added slowly and the mixture was stirred at 25° C. for 16 h. The reaction was quenched with water (50 mL), and the resulting mixture was extracted with DCM (200 mL×3). The combined organic layer was dried over anhydrous Na$_2$SO$_4$, filtered, and the filtrate was evaporated under reduced pressure. The crude product was purified by flash silica gel chromatography (ISCO®; 220 g SepaFlash® Silica Flash Column, Eluent of 0-35% EtOAc/Pet. ether gradient at 80 mL/min) to give ethyl 1-((2-(trimethylsilyl)ethoxy)methyl)-1H-pyrazole-4-carboxylate. MS (ESI): m/z (M+H)$^+$ 271.

Step B: N-methoxy-N-methyl-1-((2-(trimethylsilyl)ethoxy)methyl)-1H-pyrazole-4-carboxamide (Int-5)

To a solution of ethyl 1-((2-(trimethylsilyl)ethoxy)methyl)-1H-pyrazole-4-carboxylate (20 g, 74.0 mmol) and N,O-dimethylhydroxylamine hydrochloride (10.8 g, 111 mmol) in dry THF (350 mL) was added iPrMgBr (77 mL, 222 mmol, 2.9 M in 2-methyltetrahydrofuran) at 0° C. The mixture was stirred at 25° C. for 16 h. The reaction was quenched with aqueous NH$_4$Cl (100 mL), and the resulting mixture was extracted with EtOAc (300 mL×3). The organic layer was dried over Na$_2$SO$_4$, filtered and the filtrate was evaporated under reduced pressure. The crude product was purified by flash silica gel chromatography (ISCO®; 220 g SepaFlash® Silica Flash Column, Eluent of 0-50% EtOAc/Pet. ether gradient at 70 mL/min) to give N-methoxy-N-methyl-1-((2-(trimethylsilyl)ethoxy)methyl)-1H-pyrazole-4-carboxamide (Int-5). MS (ESI): m/z (M+H)$^+$ 286.

Intermediate 6: (6-fluoro-1-((trifluoromethyl)sulfonyl)-5-((triisopropylsilyl)ethynyl)-1H-benzo[f]indazol-4-yl)boronic acid (Int-6)

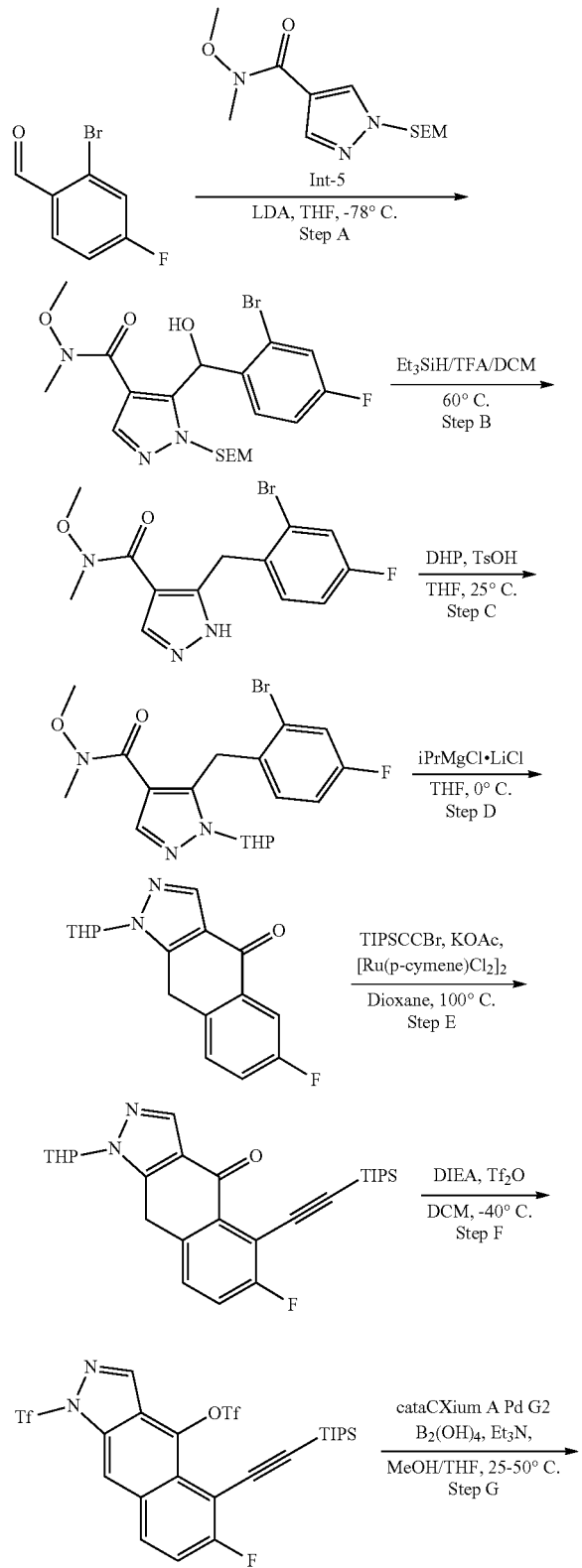

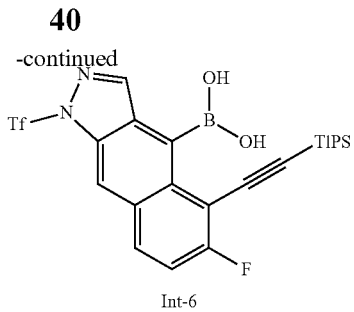

Int-6

Step A: 5-((2-bromo-4-fluorophenyl)(hydroxy)methyl)-N-methoxy-N-methyl-1-((2-(trimethylsilyl)ethoxy)methyl)-1H-pyrazole-4-carboxamide To a stirred solution of N-methoxy-N-methyl-1-((2-(trimethylsilyl)ethoxy)methyl)-1H-pyrazole-4-carboxamide (Int-5, 24.74 g, 87 mmol) in THF (50 mL) was added lithium diisopropylamide (95 mL, 95 mmol, 1M in THF) at −78° C. under $N_2$, and the reaction mixture was stirred at −78° C. for 1 h under $N_2$. 2-bromo-4-fluorobenzaldehyde (16 g, 79 mmol) was added at −78° C., and the mixture was stirred at −78° C. for 1 h. The reaction was quenched with water (50 mL) and extracted with EtOAc (500 mL×3). The organic layers were washed with sat. brine (50 mL) and dried over $Na_2SO_4$. The organic solution was concentrated under reduced pressure. The residue was purified by flash silica gel chromatography (ISCO®; Agela® Flash Column Silica-CS (330 g), Eluent of 0-25% ethyl acetate/petroleum ether gradient at 30 mL/min) to give 5-((2-bromo-4-fluorophenyl)(hydroxy)methyl)-N-methoxy-N-methyl-1-((2-(trimethylsilyl)ethoxy)methyl)-1H-pyrazole-4-carboxamide. MS (ESI): m/z (M+H)$^+$ 488, 490.

Step B: 5-(2-bromo-4-fluorobenzyl)-N-methoxy-N-methyl-1H-pyrazole-4-carboxamide To a solution of 5-((2-bromo-4-fluorophenyl)(hydroxy)methyl)-N-methoxy-N-methyl-1-((2-(trimethylsilyl)ethoxy)methyl)-1H-pyrazole-4-carboxamide (20 g, 40.9 mmol) in DCM (56 mL) were added triethylsilane (118 mL, 737 mmol) and TFA (56.8 mL, 737 mmol), and the mixture was stirred at 60° C. for 3 h. The reaction mixture was concentrated in vacuo and the residue was diluted with EtOAc (400 mL). The organic solution was washed with aq. $NaHCO_3$ and brine (30 mL×2), and the organic layer was dried over $Na_2SO_4$. The organic solution was concentrated under reduced pressure. The residue was purified by flash silica gel chromatography (ISCO®; Agela® Flash Column Silica-CS (220 g), Eluent of 0-15% ethyl acetate/petroleum ether gradient at 50 mL/min) to give 5-(2-bromo-4-fluorobenzyl)-N-methoxy-N-methyl-1H-pyrazole-4-carboxamide. MS (ESI): m/z (M+H)$^+$ 342, 344.

Step C: 5-(2-bromo-4-fluorobenzyl)-N-methoxy-N-methyl-1-(tetrahydro-2H-pyran-2-yl)-1H-pyrazole-4-carboxamide To a solution of 5-(2-bromo-4-fluorobenzyl)-N-methoxy-N-methyl-1H-pyrazole-4-carboxamide (7.5 g, 21.92 mmol) in THF (80 mL) was added 4-methylbenzenesulfonic acid (0.377 g, 2.19 mmol) and DHP (4.01 mL, 43.8 mmol) at 25° C., and the mixture was stirred at 25° C. for 2 h. The reaction mixture was concentrated in vacuo, and the residue was purified by flash silica gel chromatography (ISCO®, 80 g Agela Flash Column, petroleum ether/EtOAc=2/1) to give 5-(2-bromo-4-fluorobenzyl)-N-methoxy-N-methyl-1-(tetrahydro-2H-pyran-2-yl)-1H-pyrazole-4-carboxamide. MS (ESI): m/z (M+H)+ 426, 428.

Step D: 6-fluoro-1-(tetrahydro-2H-pyran-2-yl)-1,9-dihydro-4H-benzo[f]indazol-4-one To a stirred solution of 5-(2-bromo-4-fluorobenzyl)-N-methoxy-N-methyl-1-(tetrahydro-2H-pyran-2-yl)-1H-pyrazole-4-carboxamide (7.5 g, 17.59 mmol) in THF (225 mL) was added dropwise isopropylmagnesium chloride·lithium chloride (67.7 mL, 88 mmol, 1.3 M in THF) over 5 min at −5° C. After the addition was finished, the reaction was stirred at 0° C. for 3 h under $N_2$. The reaction mixture was poured into saturated $NH_4Cl$ aqueous solution (50 mL), and the mixture was extracted with EtOAc (300 mL×2). The combined organic layer was washed with brine, dried over anhydrous $Na_2SO_4$, filtered and concentrated in vacuo. The residue was purified by flash silica gel chromatography (ISCO®, 120 g Agela Flash Column, petroleum ether/EtOAc=2/1) to give 6-fluoro-1-(tetrahydro-2H-pyran-2-yl)-1,9-dihydro-4H-benzo[f]indazol-4-one. MS (ESI): m/z (M+H)+ 287.

Step E: 6-fluoro-1-(tetrahydro-2H-pyran-2-yl)-5-((triisopropylsilyl)ethynyl)-1,9-dihydro-4H-benzo[f]indazol-4-one To a solution of 6-fluoro-1-(tetrahydro-2H-pyran-2-yl)-1,9-dihydro-4H-benzo[f]indazol-4-one (3.5 g, 10.4 mmol) in dioxane (50 mL) were added (bromoethynyl)triisopropylsilane (5.43 g, 20.8 mmol), potassium acetate (2.35 g, 23.9 mmol) and dichloro(p-cymene)ruthenium(II) dimer (3.18 g, 5.20 mmol) at 25° C. under $N_2$ atmosphere. The mixture was stirred at 100° C. for 2 h. The mixture was cooled, diluted with EtOAc (50 mL), and the resulting mixture was washed with brine (5 mL×2). The organic layer was dried over anhydrous $Na_2SO_4$, filtered and concentrated in vacuo. The residue was purified by flash silica gel chromatography (ISCO®; 40 g SepaFlash® Silica Flash Column, Eluent of 20% ethyl acetate in petroleum ether gradient at 25 mL/min) to give 6-fluoro-1-(tetrahydro-2H-pyran-2-yl)-5-((triisopropylsilyl)ethynyl)-1,9-dihydro-4H-benzo[f]indazol-4-one. MS (ESI): m/z (M+H)+ 467.

Step F: 6-fluoro-1-(((trifluoromethyl)sulfonyl)-5-((triisopropylsilyl)ethynyl)-1H-benzo[f]indazol-4-yl trifluoromethanesulfonate A solution of 6-fluoro-1-(tetrahydro-2H-pyran-2-yl)-5-((triisopropylsilyl)ethynyl)-1,9-dihydro-4H-benzo[f]indazol-4-one (2.7 g, 4.05 mmol) and DIEA (4.24 mL, 24.3 mmol) in DCM (20 mL) was added $Tf_2O$ (2.05 mL, 12.2 mmol) at −40° C., and the reaction mixture was stirred at −40° C. for 15 min. The reaction mixture was concentrated in vacuo at 30° C., and the residue was purified by flash silica gel chromatography (ISCO®, 40 g Agela Flash Column, petroleum ether/EtOAc=20/1) to give 6-fluoro-1-((trifluoromethyl)sulfonyl)-5-((triisopropylsilyl)ethynyl)-1H-benzo[f]indazol-4-yl trifluoromethanesulfonate. $^1H$ NMR (400 MHz, $CDCl_3$) δ 8.63 (s, 1H), 8.42 (s, 1H), 7.96 (dd, J=9.3, 5.4 Hz, 1H), 7.51-7.41 (m, 1H), 1.17-1.06 (m, 21H).

Step G: (6-fluoro-1-((trifluoromethyl)sulfonyl)-5-((triisopropylsilyl)ethynyl)-1H-benzo[f]indazol-4-yl) boronic acid (Int-6)

To a solution of 6-fluoro-1-((trifluoromethyl)sulfonyl)-5-((triisopropylsilyl)ethynyl)-1H-benzo[f]indazol-4-yl trifluoromethanesulfonate (220 mg, 0.340 mmol) in MeOH (2.5 mL) and THF (2.5 mL) were added tetrahydroxydiboron (213 mg, 2.38 mmol), chloro[(di(1-adamantyl)-N-butylphosphine)-2-(2-aminobiphenyl)]palladium(II) (22.8 mg, 0.034 mmol) and triethylamine (103 mg, 1.02 mmol) at 25° C., and the mixture was stirred at 50° C. for 2 h under $N_2$ atmosphere. The reaction mixture was purified by preparative TLC plate ($SiO_2$, petroleum ether/EtOAc=10/1) to give (6-fluoro-1-(((trifluoromethyl)sulfonyl)-5-((triisopropylsilyl)ethynyl)-1H-benzo[f]indazol-4-yl)boronic acid (Int-6). MS (ESI): m/z (M+H)+ 543.

Intermediate 7: ((2R,7aS)-2-fluorotetrahydro-1H-pyrrolizin-7a(5H)-yl)methanol (Int-7)

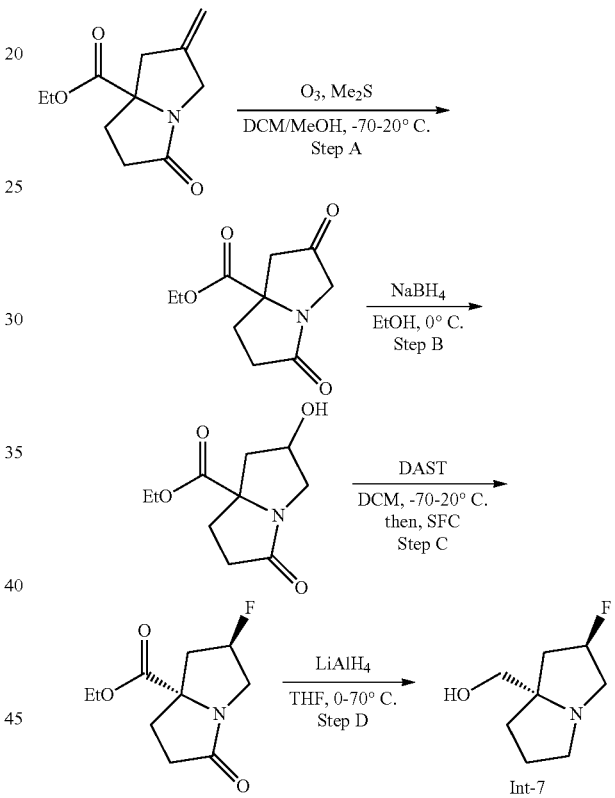

Step A: Ethyl 2,5-dioxotetrahydro-1H-pyrrolizine-7a(5H)-carboxylate

Ozone (239 mmol) (0.5~1 m³/h) was bubbled into a solution of ethyl 2-methylene-5-oxotetrahydro-1H-pyrrolizine-7a(5H)-carboxylate (Step A of Int-3) (160 g, 765 mmol in DCM (1.60 L) and MeOH (160 mL) at −70° C. for 9 h. Nitrogen was bubbled through the reaction mixture to purge excess ozone. Then, dimethyl sulfide (76.0 g, 1.22 mol) was added to the mixture at −70° C. The reaction mixture was stirred at 20° C. for 14 h. The reaction mixture was concentrated under reduced pressure to give a residue. The crude residue was purified by silica gel column chromatography (eluent: Petroleum ether:Ethyl acetate=50:1 to 1:1) to give ethyl 2,5-dioxotetrahydro-1H-pyrrolizine-7a(5H)-carboxylate. MS (ESI): m/z (M+H)+ 212.

Step B: Ethyl 2-hydroxy-5-oxotetrahydro-1H-pyrrolizine-7a(5H)-carboxylate

To a solution of ethyl 2,5-dioxotetrahydro-1H-pyrrolizine-7a(5H)-carboxylate (200 g, 947 mmol) in EtOH (2.00 L) at 0° C. under $N_2$ was added $NaBH_4$ (10.8 g, 284 mmol). The reaction mixture was stirred at 0° C. for 10 min. The reaction mixture was quenched by addition of sat. $NH_4Cl$ (50.0 mL) at 5° C., and the mixture was stirred at 5° C. for 0.5 h. The reaction mixture was concentrated under reduced pressure. The crude residue was purified by silica gel column chromatography (eluent: Petroleum ether:Ethyl acetate=50:1 to 1:1) to give ethyl 2-hydroxy-5-oxotetrahydro-1H-pyrrolizine-7a(5H)-carboxylate. $^1$H NMR (400 MHz, $CDCl_3$) δ 4.70-4.54 (m, 1H), 4.31-4.16 (m, 2H), 3.93 (dd, J=13, 6 Hz, 1H), 3.09 (d, J=13 Hz, 1H), 2.90-2.75 (m, 1H), 2.63-2.39 (m, 4H), 2.13-2.01 (m, 1H), 1.83 (dd, J=14, 6 Hz, 1H), 1.29 (t, J=7 Hz, 3H).

Step C: Ethyl (2R,7aS)-2-fluoro-5-oxotetrahydro-1H-pyrrolizine-7a(5H)-carboxylate To a solution of ethyl 2-hydroxy-5-oxotetrahydro-1H-pyrrolizine-7a(5H)-carboxylate (100 g, 468 mmol) in DCM (1 L) was added DAST (113 g, 703 mmol, 93 mL) dropwise at −70° C. under $N_2$. The reaction mixture was warmed to 20° C. and stirred for 16 h. The reaction was quenched by the addition of EtOH (50.0 mL) at 10° C., and then diluted with water (300 mL) and extracted with DCM (200 mL×2). The combined organic layers were washed with brine (200 mL), dried over anhydrous $Na_2SO_4$, filtered, and concentrated under reduced pressure. The crude product was combined from six identical reactions and purified by silica gel column chromatography (Petroleum ether:Ethyl Acetate=50:1 to 1:1). This material was further purified by prep-HPLC (C18, 0-100% MeCN/water with 0.05% HCl). The racemic mixture was resolved using chiral SFC (Daicel Chiralpak AS (50 mm×250 mm, 10 um), EtOH with 0.1% $NH_4OH$) to give ethyl (2R,7aS)-2-fluoro-5-oxotetrahydro-1H-pyrrolizine-7a(5H)-carboxylate (Peak 2). $^1$H NMR (400 MHz, $CDCl_3$): δ 5.43-5.16 (m, 1H), 4.27-4.14 (m, 3H), 3.26-3.06 (m, 1H), 2.85-2.57 (m, 3H), 2.50-2.38 (m, 1H), 2.30-2.07 (m, 2H), 1.28 (t, J=7 Hz, 3H).

Step D: ((2R,7aS)-2-fluorotetrahydro-1H-pyrrolizin-7a(5H)-yl)methanol (Int-7)

A solution of ethyl (2R,7aS)-2-fluoro-5-oxotetrahydro-1H-pyrrolizine-7a(5H)-carboxylate (82.0 g, 381 mmol) in THF (300 mL) was added to the mixture of $LiAlH_4$ (21.7 g, 571 mmol) in THF (520 mL) at 0° C. under nitrogen. The reaction mixture was warmed to 70° C. and stirred for 3 h. The reaction mixture was cooled to 0° C. and quenched by the addition of $Na_2SO_4·10H_2O$ at 0° C. under nitrogen. The reaction mixture was stirred at 20° C. for 0.5 h and then filtered. The filter cake was washed with EtOAc (600 mL×5), and the filtrate was dried over anhydrous $Mg_2SO_4$. The mixture was filtered and the filtrate was concentrated under reduced pressure to give a residue. The crude residue was purified by silica gel column chromatography ($SiO_2$, DCM:Methanol=100:1 to 10:1) to give ((2R,7aS)-2-fluorotetrahydro-1H-pyrrolizin-7a(5H)-yl)methanol (Int-7). $^1$H NMR (400 MHz, $CDCl_3$): δ 5.34-5.06 (m, 1H), 3.25 (s, 2H), 3.23-3.08 (m, 3H), 3.08-2.85 (m, 2H), 2.12-2.00 (m, 2H), 1.93-1.74 (m, 4H).

Intermediate 8: (6-chloro-5-(1-fluorocyclopropyl)-1-(tetrahydro-2H-pyran-2-yl)-1H-indazol-4-yl)boronic acid (Int-8)

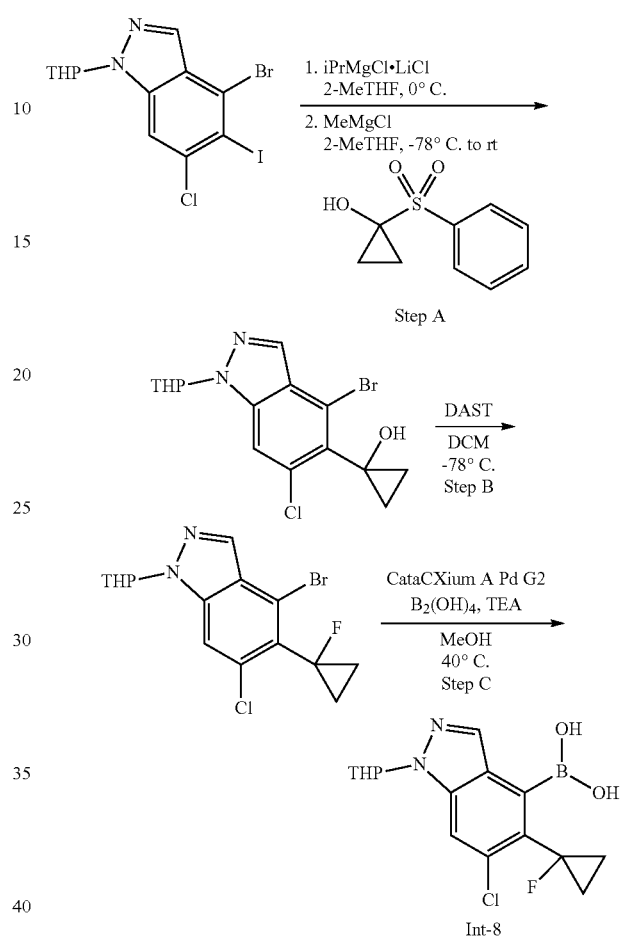

Step A: 1-(4-bromo-6-chloro-1-(tetrahydro-2H-pyran-2-yl)-1H-indazol-5-yl)cyclopropan-1-ol To a solution of 4-bromo-6-chloro-5-iodo-1-(tetrahydro-2H-pyran-2-yl)-1H-indazole (Step F of Int-4) (0.202 g, 0.457 mmol) in 2-methyl-THF (880 µL) was added isopropylmagnesium chloride·lithium chloride (0.100 g, 0.686 mmol) at 0° C. under nitrogen. The reaction mixture was stirred at 0° C. for 80 min (Solution A).

To a solution of 1-(phenylsulfonyl)cyclopropan-1-ol (80 mg, 0.387 mmol) in 2-methyl-THF (880 mL) was added methylmagnesium chloride (123 µL, 0.368 mmol) at −78° C. under nitrogen. To the resulting mixture was added Solution A and the resulting mixture was stirred at −78° C. After 4 h, the reaction mixture was warmed to rt and stirred overnight. The reaction was quenched with water and then diluted with ethyl acetate. The resulting mixture was washed with sat. $NH_4Cl$ and the organic layer was dried over $Na_2SO_4$. The organic solvent was removed under reduced pressure and the residue was purified by flash column chromatography (ethyl acetate/hexanes=20/80) to give 1-(4-bromo-6-chloro-1-(tetrahydro-2H-pyran-2-yl)-1H-indazol-5-yl)cyclopropan-1-ol. MS (ESI): m/z $(M+H)^+$ 371.

Step B: 4-bromo-6-chloro-5-(1-fluorocyclopropyl)-1-(tetrahydro-2H-pyran-2-yl)-1H-indazole To a solution of 1-(4-bromo-6-chloro-1-(tetrahydro-2H-pyran-2-yl)-1H-indazol-5-yl)cyclopropan-1-ol (112 mg, 0.300 mmol) in DCM (2.5 ml) was added DAST (90 µL, 0.681 mmol) at −78° C. The reaction mixture was stirred at −78° C. for 50 min and then quenched with sat. NaHCO₃ and the resulting mixture was extracted with DCM three times. The combined organic layer was washed with brine, dried over MgSO₄. The organic solvent was removed under reduced pressure and the residue was purified by flash column chromatography (ethyl acetate in hexanes, 0-40%) to give 4-bromo-6-chloro-5-(1-fluorocyclopropyl)-1-(tetrahydro-2H-pyran-2-yl)-1H-indazole. MS (ESI): m/z (M+H)⁺ 373.

Step C: (6-chloro-5-(1-fluorocyclopropyl)-1-(tetrahydro-2H-pyran-2-yl)-1H-indazol-4-yl)boronic acid (Int-8)

To a solution of 4-bromo-6-chloro-5-(1-fluorocyclopropyl)-1-(tetrahydro-2H-pyran-2-yl)-1H-indazole (25.1 g, 67.3 mmol) in methanol (220 ml) were added tetrahydroxydiboron (9.04 g), cataCXium A Pd G2 (2.25 g), and triethylamine (37.2 ml) at rt under nitrogen. The resulting mixture was heated to 40° C. and stirred for 3 h. The reaction mixture was cooled to r.t., then solids were filtered and the cake was washed with methanol. The filtrate was concentrated under reduced pressure and the residue was diluted with ethyl acetate and washed with sat. NH₄Cl, water and brine. The organic layer was dried over Na₂SO₄ and the organic solvent was removed under reduced pressure. The residue was crystallized from ethyl acetate in hexanes (10%) to yield (6-chloro-5-(1-fluorocyclopropyl)-1-(tetrahydro-2H-pyran-2-yl)-1H-indazol-4-yl)boronic acid (Int-8). MS (ESI): m/z (M+H)⁺ 339.

Intermediate 9: (5-ethyl-6-fluoro-1-((trifluoromethyl)sulfonyl)-1H-benzo[f]indazol-4-yl)boronic acid (Int-9)

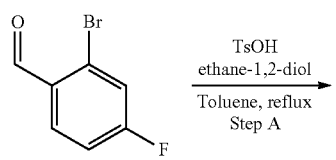

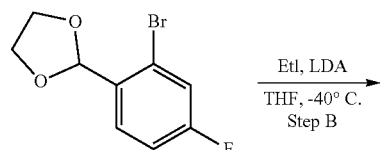

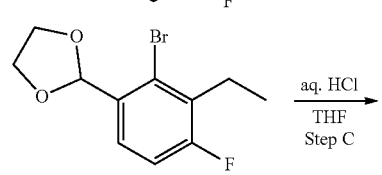

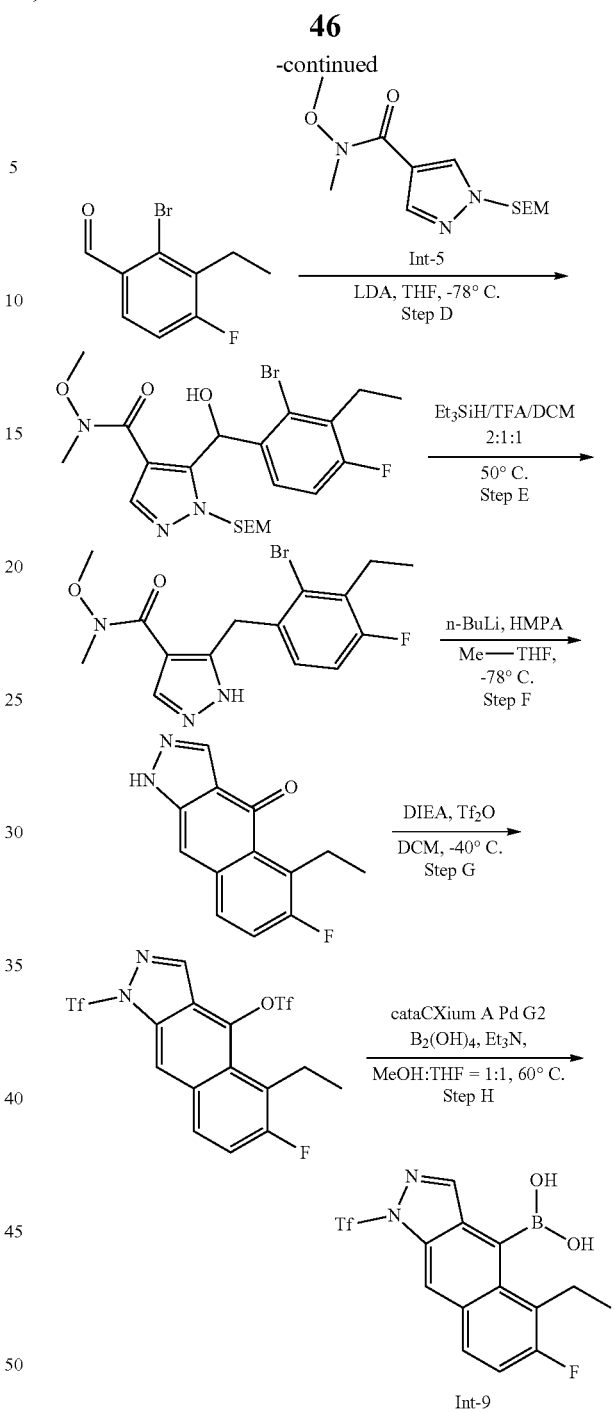

Step A: 2-(2-bromo-4-fluorophenyl)-1,3-dioxolane

To a solution of 2-bromo-4-fluorobenzaldehyde (38.9 g, 192 mmol) in toluene (400 mL) were added ethane-1,2-diol (47.6 g, 767 mmol) and 4-methylbenzenesulfonic acid (1.65 g, 9.59 mmol), and the reaction mixture was refluxed for 16 h with a Dean-Stark trap removing water. The mixture was basified with solid Na₂CO₃ (2 eq.), stirred for 5 min, filtered and the solvent was evaporated under reduced pressure to give the crude product, which was purified by flash silica gel chromatography (ISCO®; 220 g SepaFlash® Silica Flash Column, Eluent of 3% ethyl acetate in petroleum ether gradient at 80 mL/min) to give 2-(2-bromo-4-fluorophenyl)-1,3-dioxolane. MS (ESI): m/z (M+H)+ 247, 249.

Step B:
2-(2-bromo-3-ethyl-4-fluorophenyl)-1,3-dioxolane

To a solution of 2-(2-bromo-4-fluorophenyl)-1,3-dioxolane (22 g, 89 mmol) and iodoethane (139 g, 890 mmol) in THF (200 mL) was added lithium diisopropylamide (89 mL, 178 mmol, 2 M in THF) at −40° C. under $N_2$ atmosphere dropwise. Then the mixture was stirred at −40° C. for 20 min. The mixture was poured into sat. $NH_4Cl$ (100 mL) and extracted with EtOAc (100 mL×2). The combined organic layer was washed with brine (100 mL), dried over anhydrous $Na_2SO_4$, filtered and concentrated under reduced pressure to give 2-(2-bromo-3-ethyl-4-fluorophenyl)-1,3-dioxolane. The product was used for the next step without further purification. MS (ESI): m/z (M+H)+ 275, 277.

Step C: 2-bromo-3-ethyl-4-fluorobenzaldehyde

To a solution of 2-(2-bromo-3-ethyl-4-fluorophenyl)-1,3-dioxolane (24.5 g, 89 mmol) in THF (200 mL) was added aq. HCl (2 M, 100 mL), and the reaction mixture was stirred at 25° C. for 2 h. The reaction mixture was concentrated under reduced pressure. The residue was diluted with EtOAc (200 mL), washed with sat. $NaHCO_3$ (60 mL) and brine (60 mL), and the the organic layer was dried over anhydrous $Na_2SO_4$, filtered and concentrated under reduced pressure. The crude was purified by flash silica gel chromatography (ISCO®; 120 g SepaFlash® Silica Flash Column, Eluent of 5% EtOAc/Pet. ether gradient at 80 mL/min) to afford 2-bromo-3-ethyl-4-fluorobenzaldehyde. MS (ESI): m/z (M+H)+ 231, 233.

Step D: 5-((2-bromo-3-ethyl-4-fluorophenyl)(hydroxy)methyl)-N-methoxy-N-methyl-1-((2-(trimethylsilyl)ethoxy)methyl)-1H-pyrazole-4-carboxamide To a stirred solution of N-methoxy-N-methyl-1-((2-(trimethylsilyl)ethoxy)methyl)-1H-pyrazole-4-carboxamide (Int-5) (3.00 g, 10.5 mmol) in THF (30 mL) was added lithium diisopropylamide (15.8 mL, 31.5 mmol, 2 M in THF) at −78° C. under $N_2$, and the reaction mixture was stirred at −78° C. for 30 min under $N_2$. Then a solution of 2-bromo-3-ethyl-4-fluorobenzaldehyde (2.43 g, 10.5 mmol) in THF (10 mL) was added at −78° C., and the reaction was stirred at −78° C. for 30 min under $N_2$. The resulting mixture was poured into sat. aq. $NH_4Cl$ (40 mL) and extracted with EtOAc (50 mL×2). The combined organic layer was washed with brine (20 mL), dried over $Na_2SO_4$, filtered and concentrated under reduced pressure. The residue was purified by flash silica gel chromatography (ISCO®; Agela® Flash Column Silica-CS (40 g), Eluent of 0-36% Ethyl acetate/Petroleum ether gradient at 40 mL/min) to give 5-((2-bromo-3-ethyl-4-fluorophenyl)(hydroxy)methyl)-N-methoxy-N-methyl-1-((2-(trimethylsilyl)ethoxy)methyl)-1H-pyrazole-4-carboxamide. MS (ESI): m/z (M+Na)+ 538, 540.

Step E: 5-(2-bromo-3-ethyl-4-fluorobenzyl)-N-methoxy-N-methyl-1H-pyrazole-4-carboxamide To a stirred solution of 5-((2-bromo-3-ethyl-4-fluorophenyl)(hydroxy)methyl)-N-methoxy-N-methyl-1-((2-(trimethylsilyl)ethoxy)methyl)-1H-pyrazole-4-carboxamide (6.30 g, 12.2 mmol) in DCM (15 mL) were added triethylsilane (30 mL, 188 mmol) and TFA (15 mL), and the reaction was stirred at 50° C. for 16 h. The reaction was concentrated under reduced pressure, and the residue was diluted with EtOAc (30 mL), then poured into sat. aq. $NaHCO_3$ (40 mL). The mixture was separated, and the aqueous layer was extracted with EtOAc (50 mL×2). The combined organic layer was washed with brine (20 mL), dried over $Na_2SO_4$, filtered and the filtrate was concentrated under reduced pressure. The residue was purified by flash silica gel chromatography (ISCO®; Agela® Flash Column Silica-CS (40 g), Eluent of 0-100% Ethyl acetate/Petroleum ether gradient at 40 mL/min) to give 5-(2-bromo-3-ethyl-4-fluorobenzyl)-N-methoxy-N-methyl-1H-pyrazole-4-carboxamide. MS (ESI): m/z (M+H)+ 370, 372.

Step F: 5-ethyl-6-fluoro-1,9-dihydro-4H-benzo[f]indazol-4-one

To a solution of 5-(2-bromo-3-ethyl-4-fluorobenzyl)-N-methoxy-N-methyl-1H-pyrazole-4-carboxamide (1.40 g, 3.78 mmol) and HMPA (0.724 mL, 4.16 mmol) in Me-THF (40 mL) was added dropwise n-butyllithium (3.48 mL, 8.70 mmol, 2.5 M in hexane) at −78° C. under $N_2$ atmosphere dropwise. The reaction mixture was stirred at −78° C. for 30 min. The reaction mixture was poured into a mixture of sat. $NH_4Cl$ and L-ascorbic acid (aq., 20 mL). The organic layer was dried over $Na_2SO_4$, filtered and the filtrate was concentrated under reduced pressure. The residue was diluted with DCM (5 mL) and the precipitate was formed. The solid was collected by filtration to afford 5-ethyl-6-fluoro-1,9-dihydro-4H-benzo[f]indazol-4-one. MS (ESI): m/z (M+H)+ 231.

Step G: 5-ethyl-6-fluoro-1-((trifluoromethyl)sulfonyl)-1H-benzo[f]indazol-4-yl trifluoromethanesulfonate To a solution of 5-ethyl-6-fluoro-1,9-dihydro-4H-benzo[f]indazol-4-one (600 mg, 2.61 mmol) and L-ascorbic acid (92 mg, 0.521 mmol) in DCM (10 mL) was added DIEA (4.55 mL, 26.1 mmol) at −40° C. and the mixture was stirred at −40° C. for 10 min. $Tf_2O$ (4.40 mL, 26.1 mmol) was added to the mixture, and the reaction mixture was stirred at −40° C. under $N_2$ atmosphere for 1 h. The reaction mixture was diluted with DCM (20 mL), washed with water (10 mL) and brine (10 mL). The organic layer was dried over $Na_2SO_4$, filtered, and the filtrate was concentrated under reduced pressure. The residue was purified by flash silica gel chromatography (ISCO®; 12 g SepaFlash® Silica Flash Column, Eluent of 2% EtOAc/Pet. ether gradient at 20 mL/min) to afford 5-ethyl-6-fluoro-1-((trifluoromethyl)sulfonyl)-1H-benzo[f]indazol-4-yl trifluoromethanesulfonate. $^1H$ NMR (400 MHz, $CDCl_3$) δ 8.61 (s, 1H), 8.44 (s, 1H), 7.89 (dd, J=9.2, 5.6 Hz, 1H), 7.44 (dd, J=9.2, 9.2 Hz, 1H), 3.35-3.29 (m, 2H), 1.14 (t, J=7.6 Hz, 3H).

Step H: (5-ethyl-6-fluoro-1-((trifluoromethyl)sulfonyl)-1H-benzo[f]indazol-4-yl)boronic acid (Int-9)

To a solution of 5-ethyl-6-fluoro-1-((trifluoromethyl)sulfonyl)-1H-benzo[f]indazol-4-yl trifluoromethanesulfonate (50 mg, 0.101 mmol), tetrahydroxydiboron (63.5 mg, 0.708 mmol) and cataCXium A Pd G2 (6.76 mg, 10.1 μmol) in MeOH (1.5 mL) and THF (1.5 mL) was added TEA (0.042 mL, 0.303 mmol) at 25° C., and the mixture was stirred at 60° C. for 1 h under $N_2$ atmosphere. The reaction mixture was purified by preparative TLC plate ($SiO_2$, Pet.

ether/EtOAc=3/1) to give (5-ethyl-6-fluoro-1-((trifluoromethyl)sulfonyl)-1H-benzo[f]indazol-4-yl)boronic acid (Int-9). $^1$H NMR (400 MHz, CDCl$_3$) δ 8.59 (s, 1H), 8.41 (s, 1H), 7.92 (dd, J=9.2, 5.6 Hz, 1H), 7.45 (dd, J=9.2, 9.2 Hz, 1H), 3.28-3.22 (m, 2H), 1.33 (t, J=7.6 Hz, 3H).

Example Syntheses

Example 1: (8aS)-5-(6-chloro-5-cyclopropyl-1H-indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-1)

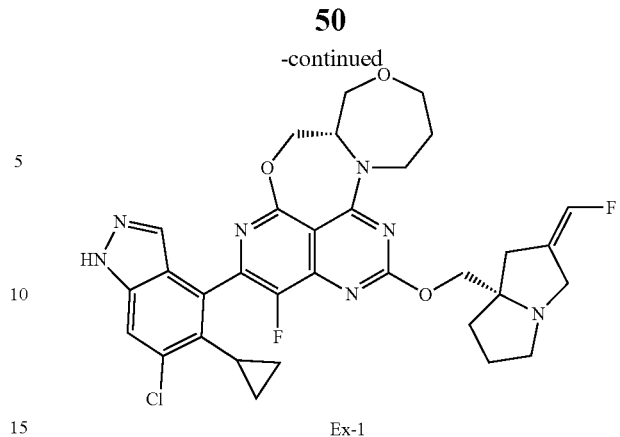

Ex-1

Step A: (8aS)-5-(6-chloro-5-cyclopropyl-1-(tetrahydro-2H-pyran-2-yl)-1H-indazol-4-yl)-4-fluoro-2-(methylthio)-8a,9,12,13-tetrahydro-8H,11H-7,10-dioxa-1,3,6,13a-tetraazanaphtho[1,8-ab]heptalene To a solution of (S)-5-chloro-4-fluoro-2-(methylthio)-8a,9,12,13-tetrahydro-8H,11H-7,10-dioxa-1,3,6,13a-tetraazanaphtho[1,8-ab]heptalene (Int-2, 200 mg, 0.561 mmol) in toluene (5 mL) were added (6-chloro-5-cyclopropyl-1-(tetrahydro-2H-pyran-2-yl)-1H-indazol-4-yl)boronic acid (Int-4, 270 mg, 0.841 mmol), K$_2$CO$_3$ (1.40 mL, 2.80 mmol, 2 M in water) and (2-dicyclohexylphosphino-2',6'-dimethoxybiphenyl)[2-(2'-amino-1,1'-biphenyl)]palladium(II) methanesulfonate (219 mg, 0.280 mmol) at 25° C. under N$_2$ atmosphere, and the reaction mixture was stirred at 40° C. for 16 h. The resulting mixture was cooled, diluted with EtOAc (50 mL), washed with H$_2$O (10 mL). The organic layer was dried over Na$_2$SO$_4$, filtered and the solvent was evaporated under reduced pressure to give the crude product. The crude product was purified by flash silica gel chromatography (ISCO®; 12 g SepaFlash® Silica Flash Column, Eluent of 30% ethyl acetate in petroleum ether gradient at 30 mL/min) to give (8aS)-5-(6-chloro-5-cyclopropyl-1-(tetrahydro-2H-pyran-2-yl)-1H-indazol-4-yl)-4-fluoro-2-(methylthio)-8a,9,12,13-tetrahydro-8H,11H-7,10-dioxa-1,3,6,13a-tetraazanaphtho[1,8-ab]heptalene. MS (ESI): m/z (M+H)$^+$ 597.

Step B: (8aS)-5-(6-chloro-5-cyclopropyl-1-(tetrahydro-2H-pyran-2-yl)-1H-indazol-4-yl)-4-fluoro-2-(methylsulfonyl)-8a,9,12,13-tetrahydro-8H,11H-7,10-dioxa-1,3,6,13a-tetraazanaphtho[1,8-ab]heptalene To a solution of (8aS)-5-(6-chloro-5-cyclopropyl-1-(tetrahydro-2H-pyran-2-yl)-1H-indazol-4-yl)-4-fluoro-2-(methylthio)-8a,9,12,13-tetrahydro-8H,11H-7,10-dioxa-1,3,6,13a-tetraazanaphtho[1,8-ab]heptalene (660 mg, 1.11 mmol) in DCM (7 mL) was added m-CPBA (494 mg, 2.43 mmol, 85%) at 25° C. The mixture was stirred at 25° C. for 1 h. The mixture was diluted with DCM (120 mL), washed with saturated NaHCO$_3$ solution (30 mL), dried over Na$_2$SO$_4$, filtered and the solvent was evaporated under reduced pressure to give the crude product. The crude product was purified by flash silica gel chromatography (ISCO®; 12 g SepaFlash® Silica Flash Column, Eluent of 70% ethyl acetate in petroleum ether gradient at 30 mL/min) to give (8aS)-5-(6-chloro-5-cyclopropyl-1-(tetrahydro-2H-pyran-2-yl)-1H-indazol-4-yl)-4-fluoro-2-(methylsulfonyl)-8a,9,12,13-tetrahydro-8H,11H-7,10-dioxa-1,3,6,13a-tetraazanaphtho[1,8-ab]heptalene. MS (ESI): m/z (M+H)$^+$ 629.

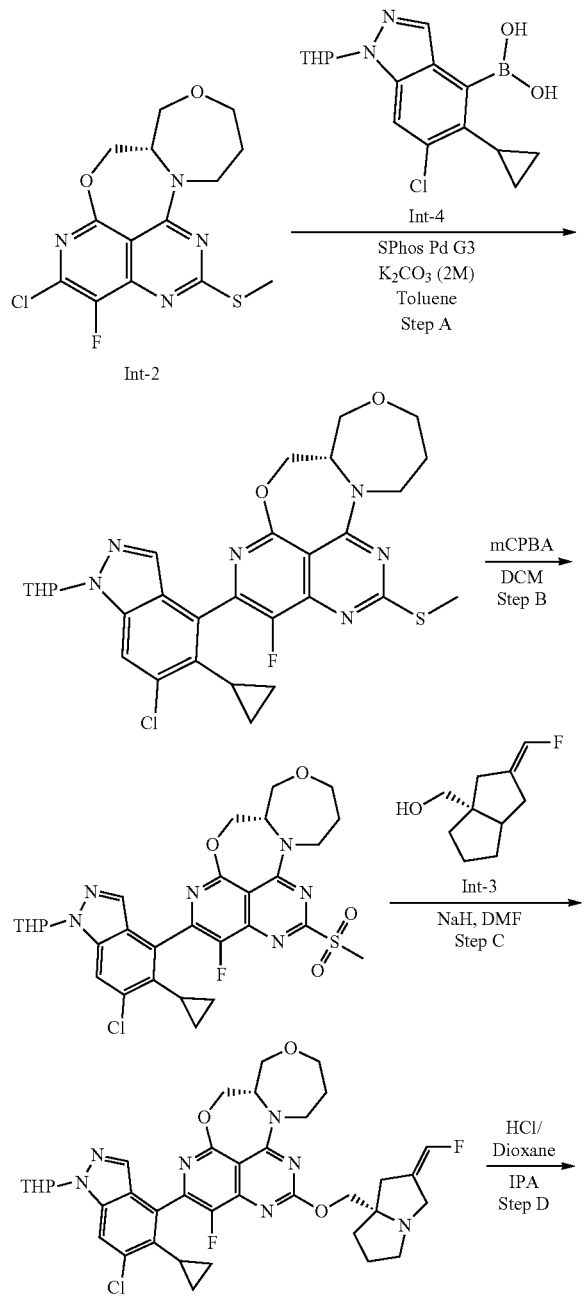

Step C: (8aS)-5-(6-chloro-5-cyclopropyl-1-(tetrahydro-2H-pyran-2-yl)-1H-indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (8aS)-5-(6-chloro-5-cyclopropyl-1-(tetrahydro-2H-pyran-2-yl)-1H-indazol-4-yl)-4-fluoro-2-(methylsulfonyl)-8a,9,12,13-tetrahydro-8H,11H-7,10-dioxa-1,3,6,13a-tetraazanaphtho[1,8-ab]heptalene (80 mg, 0.127 mmol) and (S,Z)-(2-(fluoromethylene)tetrahydro-1H-pyrrolizin-7a(5H)-yl)methanol (Int-3, HCl salt) (31.7 mg, 0.153 mmol) in DMF (1 mL) was added sodium hydride (30.5 mg, 0.763 mmol, 60% wt) at 25° C. The mixture was stirred at 25° C. for 1 h. The reaction was quenched with saturated NH₄Cl solution (4 mL) and then the resulting mixture diluted with EtOAc (20 mL). The organic phase was washed with water (3×4 mL), dried over Na₂SO₄, filtered and the solvent was evaporated under reduced pressure to give the residue. The residue was purified by preparative TLC (SiO₂, DCM:MeOH=10:1) to give (8aS)-5-(6-chloro-5-cyclopropyl-1-(tetrahydro-2H-pyran-2-yl)-1H-indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI): m/z (M+H)⁺ 720.

Step D: (8aS)-5-(6-chloro-5-cyclopropyl-1H-indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-1)

To a solution of (8aS)-5-(6-chloro-5-cyclopropyl-1-(tetrahydro-2H-pyran-2-yl)-1H-indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (67 mg, 0.093 mmol) in IPA (0.5 mL) was added HCl (2 mL, 4.00 mmol, 2 M in dioxane) at 25° C. The mixture was stirred at 25° C. for 15 h. The solvent was evaporated under reduced pressure. The residue was dissolved in MeCN (1 mL) and basified with diluted NH₃·H₂O (1 M in MeCN) to pH 7. The resulting mixture was purified by reversed-phase preparative HPLC (Column: Boston Prime C18 150×30 mm×5 μm; Condition: Water (0.05% NH₃·H₂O+10 mM NH₄HCO₃)-ACN; Begin B-End B: 44-74; Gradient Time (min): 10; 100% B Hold Time (min): 2; Flow Rate (mL/min): 25) to give (8aS)-5-(6-chloro-5-cyclopropyl-1H-indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI): m/z (M+H)⁺ 636. ¹H NMR (400 MHz, MeOD) δ 7.96-7.79 (m, 1H), 7.75 (s, 1H), 6.85-6.38 (m, 1H), 5.30-5.16 (m, 1H), 4.76 (d, J=10.3 Hz, 1H), 4.66-4.57 (m, 1H), 4.45-4.26 (m, 3H), 4.26-4.15 (m, 1H), 4.06-3.94 (m, 1H), 3.93-3.73 (m, 2H), 3.65-3.55 (m, 1H), 3.48 (d, J=14.7 Hz, 2H), 3.23-3.05 (m, 1H), 2.85-2.58 (m, 2H), 2.46 (d, J=15.1 Hz, 1H), 2.29-1.82 (m, 7H), 0.91 (dd, J=14.6, 4.7 Hz, 1H), 0.70 (s, 1H), 0.35-0.09 (m, 2H).

Example 2: (8aS)-5-(5-ethyl-6-fluoro-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-2)

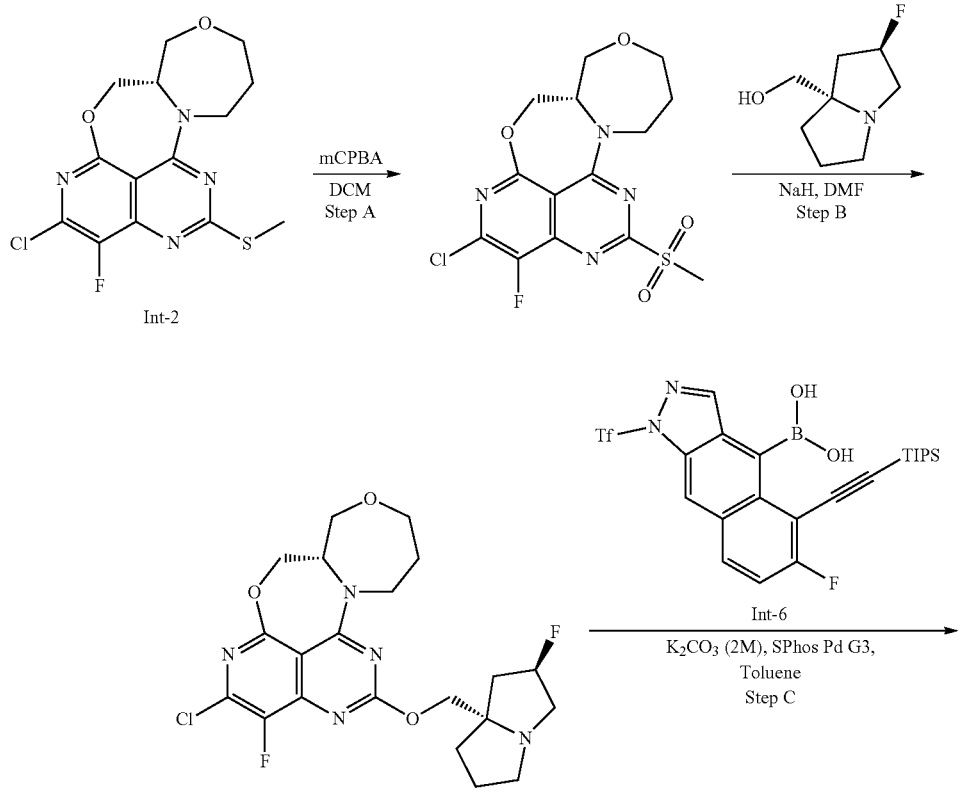

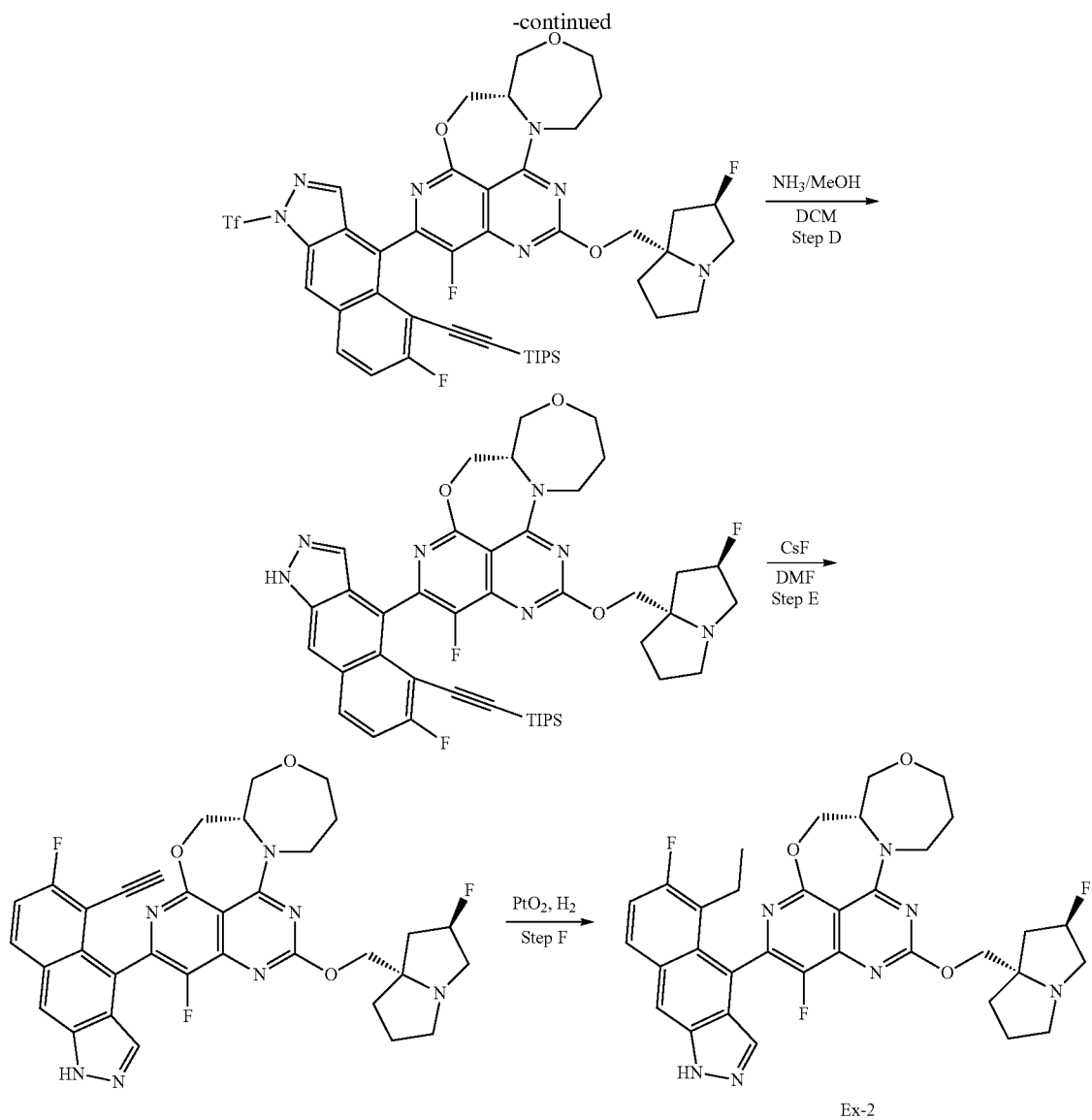

Ex-2

Step A: (S)-5-chloro-4-fluoro-2-(methylsulfonyl)-8a,9,12,13-tetrahydro-8H,11H-7,10-dioxa-1,3,6,13a-tetraazanaphtho[1,8-ab]heptalene To a solution of (S)-5-chloro-4-fluoro-2-(methylthio)-8a,9,12,13-tetrahydro-8H,11H-7,10-dioxa-1,3,6,13a-tetraazanaphtho[1,8-ab]heptalene (Int-2, 400 mg, 1.12 mmol) in CH$_2$Cl$_2$ (5 mL) was added m-CPBA (501 mg, 2.47 mmol, 85% wt) at 25° C. The mixture was stirred at 25° C. for 1 h. The mixture was diluted with DCM (80 mL), washed with saturated NaHCO$_3$ solution (20 mL), dried over Na$_2$SO$_4$, filtered and the solvent was evaporated under reduced pressure to give the crude product. The crude product was purified by flash silica gel chromatography (ISCO®; 4 g SepaFlash® Silica Flash Column, Eluent of 15% ethyl acetate in petroleum ether gradient at 30 mL/min) to give (S)-5-chloro-4-fluoro-2-(methylsulfonyl)-8a,9,12,13-tetrahydro-8H,11H-7,10-dioxa-1,3,6,13a-tetraazanaphtho[1,8-ab]heptalene. MS (ESI): m/z (M+H)$^+$ 389.

Step B: (S)-5-chloro-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (S)-5-chloro-4-fluoro-2-(methylsulfonyl)-8a,9,12,13-tetrahydro-8H,11H-7,10-dioxa-1,3,6,13a-tetraazanaphtho[1,8-ab]heptalene (290 mg, 0.746 mmol) and ((2R,7aS)-2-fluorotetrahydro-1H-pyrrolizin-7a(5H)-yl) methanol (Int-7) (594 mg, 3.73 mmol) in THF (3 mL) was added NaH (149 mg, 3.73 mmol, 60% wt) at 25° C. The mixture was stirred at 25° C. for 1 h. The reaction was quenched with saturated NH$_4$Cl solution (8 mL), extracted with EtOAc (2×15 mL), dried over Na$_2$SO$_4$, filtered and the solvent was evaporated under reduced pressure to give the crude product. The crude product was purified by flash silica gel chromatography (ISCO®; 4 g SepaFlash® Silica Flash Column, Eluent of 5% MeOH in DCM gradient at 30 mL/min) to give (S)-5-chloro-4-fluoro-2-(((2R,7aS)-2-fluorotetrahydro-1H-pyrrolizin-7a(5H)-yl)methoxy)-8a,9,12, 13-tetrahydro-8H,11H-7,10-dioxa-1,3,6,13a-tetraazanaphtho[1,8-ab]heptalene. MS (ESI): m/z (M+H)⁺ 468.

Step C: (8aS)-4-fluoro-5-(6-fluoro-1-((trifluoromethyl)sulfonyl)-5-((triisopropylsilyl)ethynyl)-1H-benzo[f]indazol-4-yl)-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (S)-5-chloro-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (115 mg, 0.246 mmol) in toluene (1.5 mL) were added (6-fluoro-1-((trifluoromethyl)sulfonyl)-5-((triisopropylsilyl)ethynyl)-1H-benzo[f]indazol-4-yl)boronic acid (Int-6, 160 mg, 0.295 mmol), $K_2CO_3$ (0.614 mL, 1.23 mmol, 2 M in water) and (2-dicyclohexylphosphino-2',6'-dimethoxybiphenyl)[2-(2'-amino-1,1'-biphenyl)]palladium(II) methanesulfonate (96 mg, 0.123 mmol) at 25° C. under $N_2$ atmosphere. The mixture was stirred at 40° C. for 16 h. The mixture was cooled, diluted with EtOAc (20 mL), washed with $H_2O$ (5 mL), dried over $Na_2SO_4$, filtered and the solvent was evaporated under reduced pressure. The residue was purified by preparative TLC ($SiO_2$, DCM:MeOH=10:1) to give (8aS)-4-fluoro-5-(6-fluoro-1-((trifluoromethyl)sulfonyl)-5-((triisopropylsilyl)ethynyl)-1H-benzo[f]indazol-4-yl)-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI): m/z (M+H)⁺ 930.

Step D: (8aS)-4-fluoro-5-(6-fluoro-5-((triisopropylsilyl)ethynyl)-1H-benzo[f]indazol-4-yl)-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (8aS)-4-fluoro-5-(6-fluoro-1-((trifluoromethyl)sulfonyl)-5-((triisopropylsilyl)ethynyl)-1H-benzo[f]indazol-4-yl)-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (110 mg, 0.118 mmol) in DCM (2 mL) was added ammonia (4 mL, 28.0 mmol, 7 M in MeOH) at 25° C. The mixture was stirred at 25° C. for 15 h. The reaction mixture was purified directly by preparative TLC ($SiO_2$, DCM:MeOH=10:1) to give (8aS)-4-fluoro-5-(6-fluoro-5-((triisopropylsilyl)ethynyl)-1H-benzo[f]indazol-4-yl)-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI): m/z (M+H)⁺ 798.

Step E: (8aS)-5-(5-ethynyl-6-fluoro-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (8aS)-4-fluoro-5-(6-fluoro-5-((triisopropylsilyl)ethynyl)-1H-benzo[f]indazol-4-yl)-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (70 mg, 0.088 mmol) in DMF (1 mL) was added CsF (67 mg, 0.441 mmol) at 25° C. The mixture was stirred at 25° C. for 2 h. The mixture was filtered and the solvent was purified directly by reversed phase preparative HPLC (Column: Phenomenex Gemini-NX 150×30 mm×5 μm; Condition: water (10 mM-$NH_4HCO_3$)-ACN; Begin B-End B: 37-67; Gradient Time (min): 11; 100% B Hold Time (min): 2.5; FlowRate (mL/min): 25) to give (8aS)-5-(5-ethynyl-6-fluoro-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI): m/z (M+H)⁺ 642. ¹H NMR (400 MHz, MeOD) δ 8.24 (s, 1H), 8.14 (dd, J=9.3, 5.8 Hz, 1H), 8.08-7.93 (m, 1H), 7.38-7.33 (m, 1H), 5.39-5.16 (m, 2H), 4.71 (dd, J=12.5, 3.8 Hz, 1H), 4.62-4.58 (m, 1H), 4.42-4.28 (m, 2H), 4.27-4.12 (m, 2H), 4.03-3.92 (m, 1H), 3.89-3.83 (m, 1H), 3.70-3.51 (m, 2H), 3.50-3.34 (m, 1H), 3.30-3.12 (m, 3H), 3.04-2.98 (m, 1H), 2.39-2.09 (m, 4H), 2.04-1.81 (m, 4H).

Step F: (8aS)-5-(5-ethyl-6-fluoro-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-2)

To a solution of (8aS)-5-(5-ethynyl-6-fluoro-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (20 mg, 0.031 mmol) in MeOH (10 mL) was added platinum(IV) oxide (5 mg, 0.022 mmol) at 25° C. The mixture was stirred at 25° C. for 2 h under $H_2$ atmosphere (15 psi). The mixture was diluted with MeOH (30 mL), filtered and the solvent was evaporated under reduced pressure. The residue was purified by reversed phase preparative HPLC (Column: Boston Prime C18 150×30 mm×5 μm; Condition: Water (0.05% $NH_3H_2O$+10 mM $NH_4HCO_3$)-ACN; Begin B-End B: 42-72; Gradient Time (min): 10; 100% B Hold Time (min): 2; FlowRate (mL/min): 25) to give (8aS)-5-(5-ethyl-6-fluoro-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-2). MS (ESI): m/z (M+H)⁺ 646. ¹H NMR (400 MHz, MeOD) δ 8.21 (s, 1H), 7.99 (dd, J=9.3, 6.0 Hz, 1H), 7.90-7.76 (m, 1H), 7.34-7.29 (m, 1H), 5.41-5.06 (m, 2H), 4.77-4.73 (m, 1H), 4.63 (dd, J=13.3, 6.0 Hz, 2H), 4.38 (dd, J=9.5, 5.2 Hz, 1H), 4.33-4.25 (m, 2H), 4.20 (dd, J=12.4, 4.2 Hz, 1H), 4.04-4.00 (m, 1H), 3.93-3.75 (m, 1H), 3.67-3.58 (m, 1H), 3.49 (dd, J=16.9, 10.5 Hz, 1H), 3.25-3.19 (m, 2H), 3.06-2.98 (m, 1H), 2.65-2.45 (m, 2H), 2.29-2.11 (m, 4H), 2.04-1.96 (m, 3H), 1.90 (s, 1H), 0.97-0.90 (m, 3H).

The examples in the table below were synthesized using a similar procedure as described in the syntheses of Ex-1 and Ex-2 by making the appropriate substitutions for starting material, intermediates, and/or reagents. Such starting materials, intermediates, and/or reagents are available commercially, synthesized as described in the literature, synthesized using methods available to those skilled in the art, or synthesized as described herein.

| Ex. | Structure | Name | NMR | MS (ESI) [M + H]+ |
|---|---|---|---|---|
| Ex-3 | | (8aS)-5-(6-chloro-5-cyclopropyl-1H-indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene | $^1$H NMR (400 MHz, DMSO-$d_6$) δ 13.25-13.19 (m, 1H), 7.84-7.74 (m, 2H), 5.37-5.18 (m, 1H), 5.04-4.95 (m, 1H), 4.71-4.62 (m, 1H), 4.54 (dd, J = 12.9, 7.1 Hz, 1H), 4.38-4.27 (m, 1H), 4.18-4.00 (m, 3H), 3.93-3.85 (m, 1H), 3.78-3.56 (m, 1H), 3.52-3.34 (m, 2H), 3.13-2.98 (m, 3H), 2.87-2.78 (m, 1H), 2.19-1.71 (m, 9H), 0.84-0.76 (m, 1H), 0.67-0.57 (m, 1H), 0.23-0.00 (m, 2H). | 624 |
| Ex-4 | | (8aS)-5-(5-ethyl-6-fluoro-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene | $^1$H NMR (400 MHz, MeOD) δ 8.20 (s, 1H), 7.98 (dd, J = 9.3, 6.1 Hz, 1H), 7.83 (d, J = 27.6 Hz, 1H), 7.33-7.28 (m, 1H), 6.65 (d, J = 84.4 Hz, 1H), 5.29-5.19 (m, 1H), 4.77-4.72 (m, 1H), 4.63-4.60 (m, 2H), 4.41-4.26 (m, 3H), 4.19 (dd, J = 12.3, 4.2 Hz, 1H), 4.07-3.93 (m, 1H), 3.92-3.73 (m, 2H), 3.67-3.54 (m, 1H), 3.53-3.39 (m, 2H), 3.24-3.12 (m, 1H), 2.79-2.70 (m, 2H), 2.65-2.54 (m, 1H), 2.46 (br d, J = 15.6 Hz, 1H), 2.26-2.07 (m, 2H), 2.05-1.82 (m, 4H), 1.01-0.85 (m, 3H). | 658 |
| Ex-5 | | (8aS)-5-(6-chloro-5-(1-fluorocyclopropyl)-1H-indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene | $^1$H NMR (400 MHz, DMSO-$d_6$) δ 13.48-13.42 (m, 1H), 7.89-7.83 (m, 2H), 6.86-6.64 (m, 1H), 5.02-4.95 (m, 1H), 4.70-4.63 (m, 1H), 4.57-4.51 (m, 1H), 4.38-4.27 (m, 1H), 4.15-4.03 (m, 3H), 3.93-3.85 (m, 1H), 3.76-3.56 (m, 2H), 3.52-3.35 (m, 2H), 3.30-3.24 (m, 1H), 3.03-2.95 (m, 1H), 2.60-2.52 (m, 2H), 2.35-2.28 (m, 1H), 2.06-1.66 (m, 6H), 1.51-1.34 (m, 1H), 1.14-1.03 (m, 1H), 0.75-0.52 (m, 2H). | 654 |

Example 6: (8aS)-5-(5-ethyl-6-fluoro-3-methyl-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-6)

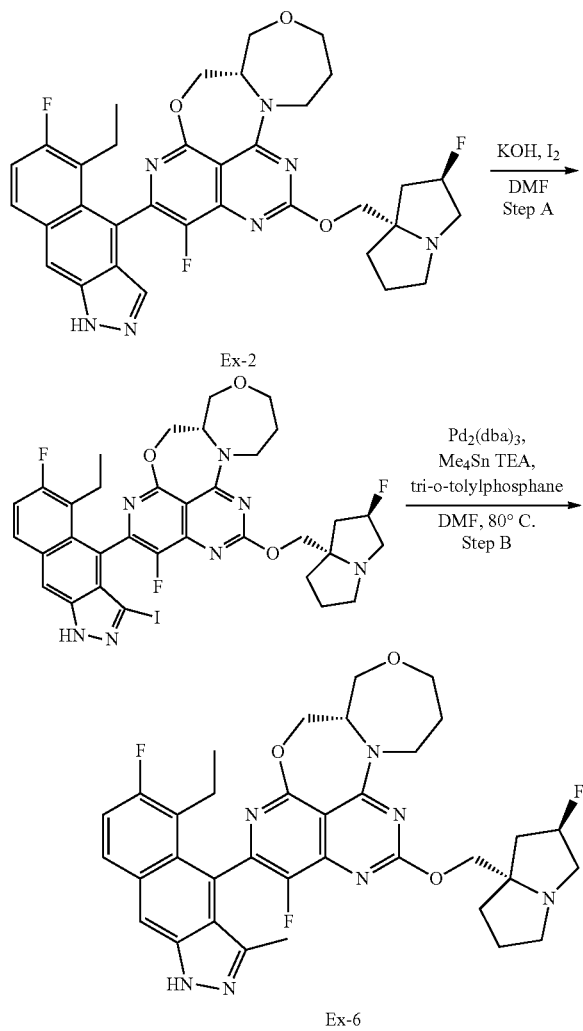

Step A: (8aS)-5-(5-ethyl-6-fluoro-3-iodo-1H-benzo[f]indazol-4-yl)-4-fluoro-2-(((2R,7aS)-2-fluorotetrahydro-1H-pyrrolizin-7a(5TH-yl)methoxy)-8a,9,12,13-tetrahydro-8H,11H-7,10-dioxa-1,3,6,13a-tetraazanaphtho[1,8-ab]heptalene To a solution of (8aS)-5-(5-ethyl-6-fluoro-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (350 mg, 0.542 mmol) in DMF (5 mL) were added KOH (122 mg, 2.168 mmol) and I$_2$ (413 mg, 1.626 mmol) at 20° C. under N$_2$ atmosphere. The mixture was stirred at 20° C. for 1 h. The mixture was diluted with water (5 mL), extracted with EtOAc (3×5 mL), dried over Na$_2$SO$_4$, filtered and the solvent was evaporated under reduced pressure to give the crude product. The crude product was purified by flash silica gel chromatography (ISCO®; 4 g SepaFlash® Silica Flash Column, Eluent of 0-10% MeOH/CH$_2$Cl$_2$ gradient at 40 mL/min) to give (8aS)-5-(5-ethyl-6-fluoro-3-iodo-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI) [M+H]$^+$: m/z 772.

Step B: (8aS)-5-(5-ethyl-6-fluoro-3-methyl-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-6)

To a solution of (8aS)-5-(5-ethyl-6-fluoro-3-iodo-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (200 mg, 0.259 mmol) in DMF (2 mL) were added triethylamine (157 mg, 1.56 mmol), Pd$_2$(dba)$_3$ (47.5 mg, 0.052 mmol), tri-o-tolylphosphane (31.6 mg, 0.104 mmol), and tetramethylstannane (130 mg, 0.727 mmol) at 20° C. under N$_2$ atmosphere. The mixture was stirred at 80° C. for 12 h. The mixture was diluted with water (2 mL), extracted with EtOAc (3×2 mL), dried over Na$_2$SO$_4$, filtered and the solvent was evaporated under reduced pressure to give the crude product. The residue was purified by Prep-HPLC (Cloumn: Boston Green ODS 150×30 mm, 5 μm; Condition: water (0.2% FA)-ACN; Begin B 25%; End B 55%; Flow Rate 25 mL/min) to get the crude product. The crude product was separated by preparative SFC (Column: DAICEL CHIRALCEL OJ (250 mm×30 mm, 10 μm); Condition: CO$_2$-EtOH (0.1% NH$_3$H$_2$O), Begin B: 40%; End B: 40%; Gradient Time (min): 10; 100% B Hold Time: 1; Flow Rate (ml/min: 80; Injections: 30) to give (8aS)-5-(5-ethyl-6-fluoro-3-methyl-1H-benzo[f]indazol-4-yl)-4-fluoro-2-(((2R,7aS)-2-fluorotetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-6). MS (ESI) [M+H]$^+$: m/z 660. $^1$H NMR (400 MHz, CD$_3$OD) δ 8.15 (s, 1H), 7.97 (dd, J=9.1, 5.8 Hz, 1H), 7.32 (dt, J=9.2, 3.5 Hz, 1H), 5.40-5.24 (m, 2H), 4.84-4.77 (m, 1H), 4.72-4.64 (m, 1H), 4.47-4.39 (m, 1H), 4.37-4.28 (m, 2H), 4.25-4.19 (m, 1H), 4.07-3.99 (m, 1H), 3.87-3.78 (m, 1H), 3.62 (dt, J=8.4, 3.7 Hz, 1H), 3.56-3.42 (m, 2H), 3.29-3.22 (m, 2H), 3.11-3.00 (m, 1H), 2.79-2.44 (m, 2H), 2.30-2.13 (m, 4H), 2.06-1.98 (m, 5H), 1.91 (s, 2H), 0.99-0.91 (m, 3H).

Example 7: (8aS)-5-(5-ethyl-6-fluoro-3-methyl-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-7)

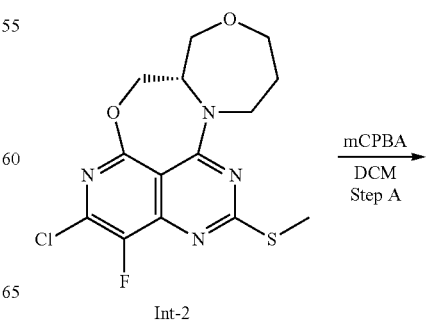

Int-2

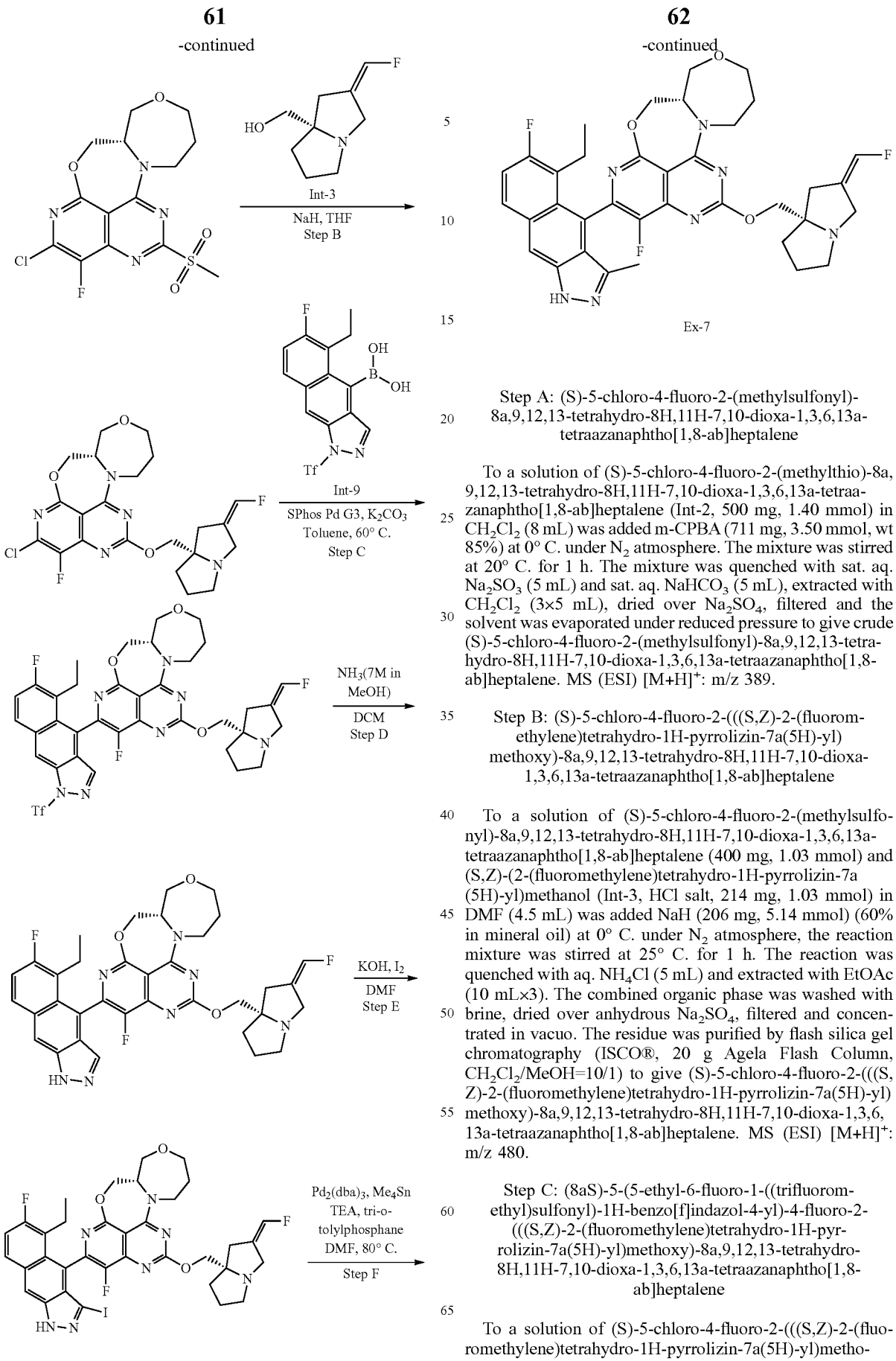

Step A: (S)-5-chloro-4-fluoro-2-(methylsulfonyl)-8a,9,12,13-tetrahydro-8H,11H-7,10-dioxa-1,3,6,13a-tetraazanaphtho[1,8-ab]heptalene To a solution of (S)-5-chloro-4-fluoro-2-(methylthio)-8a,9,12,13-tetrahydro-8H,11H-7,10-dioxa-1,3,6,13a-tetraazanaphtho[1,8-ab]heptalene (Int-2, 500 mg, 1.40 mmol) in $CH_2Cl_2$ (8 mL) was added m-CPBA (711 mg, 3.50 mmol, wt 85%) at 0° C. under $N_2$ atmosphere. The mixture was stirred at 20° C. for 1 h. The mixture was quenched with sat. aq. $Na_2SO_3$ (5 mL) and sat. aq. $NaHCO_3$ (5 mL), extracted with $CH_2Cl_2$ (3×5 mL), dried over $Na_2SO_4$, filtered and the solvent was evaporated under reduced pressure to give crude (S)-5-chloro-4-fluoro-2-(methylsulfonyl)-8a,9,12,13-tetrahydro-8H,11H-7,10-dioxa-1,3,6,13a-tetraazanaphtho[1,8-ab]heptalene. MS (ESI) $[M+H]^+$: m/z 389.

Step B: (S)-5-chloro-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (S)-5-chloro-4-fluoro-2-(methylsulfonyl)-8a,9,12,13-tetrahydro-8H,11H-7,10-dioxa-1,3,6,13a-tetraazanaphtho[1,8-ab]heptalene (400 mg, 1.03 mmol) and (S,Z)-(2-(fluoromethylene)tetrahydro-1H-pyrrolizin-7a(5H)-yl)methanol (Int-3, HCl salt, 214 mg, 1.03 mmol) in DMF (4.5 mL) was added NaH (206 mg, 5.14 mmol) (60% in mineral oil) at 0° C. under $N_2$ atmosphere, the reaction mixture was stirred at 25° C. for 1 h. The reaction was quenched with aq. $NH_4Cl$ (5 mL) and extracted with EtOAc (10 mL×3). The combined organic phase was washed with brine, dried over anhydrous $Na_2SO_4$, filtered and concentrated in vacuo. The residue was purified by flash silica gel chromatography (ISCO®, 20 g Agela Flash Column, $CH_2Cl_2$/MeOH=10/1) to give (S)-5-chloro-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI) $[M+H]^+$: m/z 480.

Step C: (8aS)-5-(5-ethyl-6-fluoro-1-((trifluoromethyl)sulfonyl)-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (S)-5-chloro-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (250 mg, 0.521 mmol) and (5-ethyl-6-fluoro-1-((trifluoromethyl)sulfonyl)-1H-benzo[f]indazol-4-yl)boronic acid (Int-9, 264 mg, 0.677 mmol) in toluene (6 mL) were added aq. $K_2CO_3$ (2 M, 1.30 mL, 2.60 mmol) and SPhos Pd G3 (122 mg, 0.156 mmol) at 20° C. under $N_2$ atmosphere. The mixture was stirred at 60° C. for 2 h. The mixture was cooled, diluted with water (6 mL), extracted with EtOAc (3×6 mL), dried over $Na_2SO_4$, filtered and the solvent was evaporated under reduced pressure to give the crude product. The crude product was purified by flash silica gel chromatography (ISCO®; 80 g SepaFlash® Silica Flash Column, Eluent of 0-80% THF/Pet. ether gradient at 40 mL/min) to give (8aS)-5-(5-ethyl-6-fluoro-1-((trifluoromethyl)sulfonyl)-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI) $[M+H]^+$: m/z 790.

Step D: (8aS)-5-(5-ethyl-6-fluoro-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (8aS)-5-(5-ethyl-6-fluoro-1-((trifluoromethyl)sulfonyl)-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (200 mg, 0.253 mmol) in DCM (0.1 mL) was added $NH_3$/MeOH (7 M, 2 mL, 14.0 mmol) at 25° C. The mixture was stirred at 25° C. for 12 h. The mixture was evaporated under reduced pressure to give the crude (8aS)-5-(5-ethyl-6-fluoro-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI) $[M+H]^+$: m/z 658.

Step E: (8aS)-5-(5-ethyl-6-fluoro-3-iodo-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene To a solution of (8aS)-5-(5-ethyl-6-fluoro-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (167 mg, 0.254 mmol) in DMF (2 mL) was added KOH (57.0 mg, 1.02 mmol) and $I_2$ (193 mg, 0.762 mmol) at 25° C. The mixture was stirred at 25° C. for 30 min. The mixture was quenched with sat. aq. $Na_2SO_3$ (3 mL), extracted with EtOAc (3×3 mL), dried over $Na_2SO_4$, filtered and the solvent was evaporated under reduced pressure to give the crude product. The crude product was purified by flash silica gel chromatography (ISCO®; 4 g SepaFlash® Silica Flash Column, Eluent of 0-30% $CH_2Cl_2$/MeOH gradient at 20 mL/min) to give (8aS)-5-(5-ethyl-6-fluoro-3-iodo-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI) $[M+H]^+$: m/z 784.

Step F: (8aS)-5-(5-ethyl-6-fluoro-3-methyl-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (Ex-7)

To a solution of (8aS)-5-(5-ethyl-6-fluoro-3-iodo-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene (130 mg, 0.166 mmol) in DMF (2 mL) were added triethylamine (101 mg, 0.995 mmol), $Pd_2(dba)_3$ (30.4 mg, 0.033 mmol) and tri-o-tolylphosphane (20.2 mg, 0.066 mmol) and tetramethylstannane (89 mg, 0.498 mmol) at 20° C. under $N_2$ atmosphere. The mixture was stirred at 80° C. for 12 h. The mixture was diluted with water (2 mL), extracted with EtOAc (3×2 mL), dried over $Na_2SO_4$, filtered and the solvent was evaporated under reduced pressure. The residue was purified by preparative TLC ($SiO_2$, $CH_2Cl_2$:MeOH=10:1) to give a crude product. The crude product was separated by preparative SFC (Column: DAICEL CHIRALCEL OD (250 mm×30 mm, 10 μm), Condition: $CO_2$-EtOH (0.1% $NH_3H_2O$), Begin B: 60%; End B: 60%; Gradient Time (min): 10; 100% B Hold Time: 10; Flow Rate (mL/min): 80; Injections: 35) to give the separated product. Then the separated product was repurified by reverse preparative HPLC (Column: Boston Prime C18 150×30 mm×5 μm; Condition: Water (0.05% $NH_3H_2O$+10 mM $NH_4HCO_3$)-ACN; Begin B-End B: 50-80; Gradient Time (min): 11; 100% B Hold Time (min): 2.5; FlowRate (mL/min): 25) to give (8aS)-5-(5-ethyl-6-fluoro-3-methyl-1H-benzo[f]indazol-4-yl)-4-fluoro-2-(((S,Z)-2-(fluoromethylene)tetrahydro-1H-pyrrolizin-7a(5H)-yl)methoxy)-8a,9,12,13-tetrahydro-8H,11H-7,10-dioxa-1,3,6,13a-tetraazanaphtho[1,8-ab]heptalene. MS (ESI) $[M+H]^+$: m/z 672. $^1$H NMR (400 MHz, $CD_3OD$) δ 8.27-8.08 (m, 1H), 7.96 (dd, J=9.2, 6.1 Hz, 1H), 7.31 (m, 1H), 6.88-6.49 (m, 1H), 5.27 (m, 1H), 4.82-4.74 (m, 1H), 4.66 (d, J=13.2 Hz, 1H), 4.46-4.29 (m, 3H), 4.25-4.18 (m, 1H), 4.09-3.95 (m, 1H), 3.92-3.76 (m, 2H), 3.68-3.56 (m, 1H), 3.53-3.37 (m, 2H), 3.23-3.11 (m, 1H), 2.81-2.71 (m, 2H), 2.70-2.30 (m, 3H), 2.29-2.13 (m, 2H), 2.13-1.80 (m, 7H), 0.95 (td, J=18.7, 7.4 Hz, 3H).

Assays

Procedure for SOS-Catalyzed Nucleotide Exchange Assay for KRAS-WT, G12C/D/V/A/R/S, G13D, Q61H, HRAS-WT, and NRAS-WT Recombinant KRAS-G12C protein used in this assay has an additional triple mutation (C51S/C80L/C118S). Whereas KRAS-WT, G12D/V/A/S/R, G13D, Q61H, HRAS and NRAS are in context of their WT protein sequence background. Specifically, the SOS-catalyzed nucleotide exchange assay utilizes a preformed TR-FRET complex containing a specific biotinylated RAS protein (KRAS-WT, G12C/V/D/A/S/R, G13D, Q61H, HRAS-WT, NRAS-WT; described above) with Bodipy-GDP, and Terbium-streptavidin. Compounds are preincubated with this complex for 60 minutes. Subsequently, recombinant human SOS protein and unlabeled GTP are added to initiate the exchange reaction. Small molecule inhibitors stabilize the Bodipy-GDP complex whereas the untreated protein rapidly exchanges Bodipy-GDP for unlabeled GTP resulting in reduced TR-FRET signal.

To assemble the preformed TR-FRET complexes, each biotinylated RAS protein is diluted to 2 μM in an EDTA Buffer (20 mM HEPES pH 7.5, 50 mM sodium chloride, 10 mM EDTA, and 0.01% Tween) and incubated at room temperature for one hour. This mixture is then further diluted to 90 nM in an Assay Buffer (20 mM HEPES pH 7.5, 150 mM sodium chloride, 10 mM magnesium chloride, and 0.005% Tween) containing 15 nM of Terbium-Streptavidin (Invitrogen, catalog #PV3577) and 900 nM of Bodipy-GDP (Invitrogen, catalog #G22360) and incubated at room temperature for six hours. It should be noted that this preformed TR-FRET complex for each of the RAS protein were made ahead of time, aliquoted and stored at −80° C. until the day of the experiment.

Each test compound (10 mM stock in DMSO) is diluted in DMSO to make a final-10-point, 3-fold dilution and is acoustically dispensed into a 384-well assay plate (Corning, catalog #3820) using an Echo 550 (Labcyte). Each well of the assay plate receives 3 μL of a specific 3×RAS preformed TR-FRET complex and 3 μL of Assay Buffer and is incubated at room temperature for 60 minutes (preincubation time). Each well then receives 3 μL of 3× recombinant human SOS protein and GTP (Sigma, G8877) in Assay Buffer and is incubated at room temperature for 30 minutes (G13D), 60 minutes (KRAS WT/G12C/D, H/NRAS) or 90 minutes for G12A/R/S/V and Q61H. The final reaction in each well of 9 μL consists of 3 mM GTP, specific Ras and SOS proteins in the following concentrations: KRAS-G12C/SOS=3 nM/40 nM, KRAS-WT and G12D/SOS=1 nM/40 nM, KRAS-G12V/SOS=1.25 nM/160 nM, KRAS-G12A/S/SOS=1 nM/160 nM, KRAS-G12R/SOS=1 nM/320 nM, KRAS-Q61H/SOS=1 nM/320 nM, KRAS-G13D/SOS=1.25 nM/0 nM, HRAS-WT and NRAS-WT=1.25 nM/40 nM.

The time-resolved fluorescence resonance energy transfer (TR-FRET) signal is measured on an Envision (PerkinElmer) plate reader: Excitation filter=340 nm; emission1=495 nm; emission2=520 nm; dichroic mirror=D400/D505; delay time=100 ms. The signal of each well is determined as the ratio of the emission at 520 nm to that at 495 nm. Percent effect of each well is determined after normalization to control wells containing DMSO (no effect) or a saturating concentration of inhibitor (max effect). The apparent effect as a function of compound concentration is fit to a four-parameter logistic equation.

CRL-227™) containing homozygous KRAS-G12V activating mutation, were cultured in growth medium that contains RPMI 1640-GlutaMAX™-I (ThermoFisher Scientific 61870) containing 10% heat inactivated fetal bovine serum (ThermoFisher Scientific 10091148).

Cells for the assay were harvested in growth medium after TrypLE (ThermoFisher scientific 12604021) digestion and were seeded in a 384-well collagen coated cell culture plate (Corning 356702) at a density of 10,000-15,000 cells/20 L/well, and incubated at 37° C., 5% $CO_2$ overnight. The compound (with 10 mM stock concentration) dose-response titrations were prepared [30 μM final ERK detection assay concentration and 1:3 dilutions, 10-point dose response] and appropriate amounts (270 nL) of test compounds were dispensed in a 384-well intermediate plate using an Echo 550 liquid handler. 30 μL/well of RPMI medium 1640-GlutaMAX™-I was added to the intermediate plate and the contents of the intermediate plate (10 μL/well) were then transferred to the 384-well collagen coated cell culture plate, which was incubated at 37° C., 5% $CO_2$ for 2 h. After removal of medium from the collagen coated cell culture plate, cells were lysed in lysis buffer from Alpha SureFire® Ultra™ Multiplex p-ERK and total ERK assay kit (PerkinElmer MPSU-PTERK) containing Halt™ Protease and Phosphatase inhibitor cocktail (ThermoFisher Scientific 78446) at room temperature with constant shaking at 300 rpm for 30 minutes. The cell lysates were then transferred to an OptiPlate-384 plate (PerkinElmer 6005620), and the phosphorylation of ERK (p-ERK) and total ERK levels were detected by Alpha SureFire® Ultra™ Multiplex p-EEK kit and total ERK assay kit (PerkinElmer MPSU-PTERK) following the manufacturer's protocol. Assay plates were read on a EnVision Multimode Plate Reader (PerkinElmer), and the ratio of p-ERK vs. total ERK in each well was used as the final readout. Dose response curves were analyzed using a 4-parameter logistic model to calculate $IC_{50}$ values using Spotfire software.

The results of these assays are presented in the tables below.

| Ex # | KRAS G12D GNE IC50 (nM) | KRAS G12V GNE IC50 (nM) | KRAS WT GNE IC50 (nM) | KRAS G12C GNE IC50 (nM) | KRAS G13D GNE IC50 (nM) | HRAS GNE IC50 (nM) | NRAS GNE IC50 (nM) | KRAS G12A GNE IC50 (nM) | KRAS G12S GNE IC50 (nM) | KRAS G12R GNE IC50 (nM) | KRAS Q61H GNE IC50 (nM) |
|---|---|---|---|---|---|---|---|---|---|---|---|
| Ex-1 | 0.67 | 1.3 | 0.87 | 6.9 | 3.7 | >11060 | >11060 | <0.69 | <0.69 | <0.69 | 1.4 |
| Ex-2 | 0.65 | 1.3 | 1.1 | 3.2 | 1.0 | 2743 | 7022 | <0.69 | <0.69 | <0.69 | 1.2 |
| Ex-3 | 1.3 | 3.0 | 2.5 | ND | ND | ND | ND | ND | ND | ND | ND |
| Ex-4 | <0.69 | 0.83 | <0.69 | 2.9 | 0.89 | 1275 | 2818 | <0.69 | <0.69 | <0.69 | 1.0 |
| Ex-5 | <0.69 | 0.98 | <0.69 | 3.3 | 1.2 | 4684 | >11060 | 0.83 | 0.77 | 1.3 | 0.97 |
| Ex-6 | 1.3 | 1.5 | 1.6 | 6.5 | 1.9 | 5516 | 10050 | 1.0 | 1.2 | 1.2 | 1.8 |
| Ex-7 | 1.4 | 2.8 | 1.4 | 11 | 2.4 | 2180 | 8979 | 1.3 | 1.3 | 1.3 | 2.8 |

Procedure for Cellular Phospho-ERK Assay in KRAS Wild Type and Mutant (G12D, G12V) Cell Lines MKN-1 cells (JCRB JCRB0252) containing amplified wild-type KRAS, were cultured in growth medium that contains RPMI 1640-GlutaMAX™-I (ThermoFisher Scientific 61870) containing 10% heat inactivated fetal bovine serum (ThermoFisher Scientific 10091148), 1 mM sodium pyruvate and 10 mM HEPES. AsPC-1 cells (ATCC® CRL-1682™), containing homozygous KRAS-G12D activating mutation, were cultured in T150 flask in growth medium (RPMI medium 1640-GlutaMAX™-I (ThermoFisher Scientific 61870) containing 10% fetal bovine serum (ThermoFisher Scientific 10091148)). SW620 cells (ATCC®

| Ex # | AsPC1 pERK IC50 (nM) | SW620 pERK IC50 (nM) | MKN1 pERK IC50 (nM) |
|---|---|---|---|
| Ex-1 | 5.1 | 2.6 | 9.1 |
| Ex-2 | 7.4 | 2.4 | 7.9 |
| Ex-3 | 15 | 3.9 | 9.7 |
| Ex-4 | 2.2 | <1.5 | 6.6 |
| Ex-5 | 3.2 | 1.3 | 4.3 |
| Ex-6 | 9.5 | 3.4 | 14 |
| Ex-7 | 7.1 | 2.5 | 12 |

Procedure for Rat IV/PO Pharmacokinetic Studies

Plasma pharmacokinetic parameters for clearance, volume of distribution, half-life and oral bioavailability were determined in rats from oral administration and IV administration studies. 4 male rats, typically weighing 225-260 g, were fasted overnight prior to dosing. Compounds were prepared for oral and IV dosing by addition to a vehicle as shown in the table below. IV formulation was administered to 2 rats via pre-cannulated jugular vein, and oral dosing was administered to 2 rats via oral gavage. Blood was collected by pre-cannulated artery, typically at predose, 2, 8, 15, 30 min, 1, 2, 4, 6, and 8 hr postdose for IV, and at predose, 15, 30 min, 1, 2, 4, 6, 8 h for oral dosing. Samples were collected in K2EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound. Plasma pharmacokinetic parameters were calculated for IV and oral dosing data by non-compartmental methods. Oral bioavailability was determined as the ratio of the dose-normalized plasma area under the curve (AUC) following oral dosing vs. IV dosing.

Vehicle, dose, dose volume, and concentration are shown in the table below.

|  | Vehicle | | Dose [mg/kg] | | Dose volume [mL/kg] | | Conc. [mg/mL] | |
| --- | --- | --- | --- | --- | --- | --- | --- | --- |
|  | IV | PO | IV | PO | IV | PO | IV | PO |
| Ex-1 | DMSO/PG/H$_2$O (20/60/20) | TWEEN80/PG/ H$_2$O (10/40/50) | 1 | 2 | 1 | 5 | 1 | 0.4 |
| Ex-2 | DMSO/PG/H$_2$O (20/60/20) | DMSO/PG/H$_2$O (20/60/20) | 1 | 2 | 1 | 5 | 1 | 0.4 |
| Ex-3 | DMSO/PG/H$_2$O (20/60/20) | TWEEN80/PG/ H$_2$O (10/40/50) | 1 | 2 | 1 | 5 | 1 | 0.4 |
| Ex-6 | DMSO/PG/H$_2$O (20/60/20) | TWEEN80/PG/ H$_2$O (10/40/50) | 1 | 2 | 1 | 5 | 1 | 0.4 |
| Ex-7 | 30% Captisol | 10% Tween 80 | 1 | 2 | 1 | 2 | 1 | 1.0 |

Procedure for Dog IV/PO Pharmacokinetic Studies

Plasma pharmacokinetic parameters for clearance, volume of distribution, half-life, mean residence time (MRT) and oral bioavailability were determined in dogs from oral administration and IV administration studies. 4 male dogs, typically weighing 8-12 kg, were fasted overnight prior to dosing. Compounds were prepared for oral and IV dosing by addition to a vehicle as shown in the table below. IV formulation was administered to 2 dogs via the saphenous or cephalic vein, and oral dosing was administered to 2 dogs via oral gavage. Blood was collected by the cephalic or jugular vein, typically at predose, 2, 8, 15, 30 min, 1, 2, 4, 6, 8 and 24 h postdose for IV, and at predose, 15, 30 min, 1, 2, 4, 6, 8, and 24 hr for oral dosing. Samples were collected in K2EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound. Plasma pharmacokinetic parameters were calculated for IV and oral dosing data by non-compartmental methods. Oral bioavailability was determined as the ratio of the dose-normalized plasma area under the curve (AUC) following oral dosing vs. IV dosing.

Vehicle, dose, dose volume, and concentration are shown in the table below.

|  | Vehicle | | Dose [mg/kg] | | Dose volume [mL/kg] | | Conc. [mg/mL] | |
| --- | --- | --- | --- | --- | --- | --- | --- | --- |
|  | IV | PO | IV | PO | IV | PO | IV | PO |
| Ex-1 | DMSO/PG/H$_2$O (20/40/40) | 10% TWEEN80 | 0.25 | 0.5 | 1 | 2 | 0.25 | 0.25 |
| Ex-2 | DMSO/PG/H$_2$O (20/40/40) | 10% TWEEN80 | 0.05 | 0.5 | 1 | 2 | 0.05 | 0.25 |
| Ex-3 | DMSO/PG/H$_2$O (20/40/40) | TWEEN80/PG/ H$_2$O (10/40/50) | 0.25 | 0.5 | 1 | 5 | 0.25 | 0.1 |
| Ex-6 | 30% Captisol | 10% TWEEN80 | 0.25 | 0.5 | 1 | 2 | 0.25 | 0.25 |

Procedure for Dog IV Cassette Pharmacokinetic Studies

Plasma pharmacokinetic parameters for clearance, volume of distribution, half-life, and mean residence time (MRT) were determined in dogs from IV cassette administration studies. 2 male dogs, typically weighing 8-12 kg, were fasted overnight prior to dosing. Compounds were prepared for oral and IV dosing by addition to a vehicle as shown in the table below. IV formulation was administered to 2 dogs via the saphenous or cephalic vein. Blood was collected by the cephalic or jugular vein, typically at predose, 2, 8, 15, 30 min, 1, 2, 4, 6, 8 and 24 h postdose. Samples were collected in K2EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound. Plasma pharmacokinetic parameters were calculated by non-compartmental methods.

Vehicle, dose, dose volume, and concentration are shown in the table below.

|  | Vehicle | Dose [mg/kg] | Dose volume [mL/kg] | Conc. [mg/mL] |
| --- | --- | --- | --- | --- |
| Ex-7 | DMSO/PEG400/H$_2$O (20/40/40) | 0.05 | 0.5 | 0.1 |

The results of pharmacokinetic studies are presented in the table below.

|  | Ex-1 | | Ex-2 | | Ex-3 | | Ex-6 | | Ex-7 | |
| --- | --- | --- | --- | --- | --- | --- | --- | --- | --- | --- |
| Species | Rat | Dog | Rat | Dog | Rat | Dog | Rat | Dog | Rat | Dog |
| CLp [mL/min/kg] | 24 | 5.0 | 40 | 18 | 40 | 10 | 36 | 8.0 | 35 | 7.7 |
| Vd [L/kg] | 2.0 | 0.65 | 6.1 | 2.6 | 4.0 | 2.2 | 5.1 | 3.7 | 4.0 | 1.4 |
| MRT [h] | 1.4 | 2.2 | 2.5 | 2.4 | 1.7 | 3.6 | 2.4 | 7.8 | 1.9 | 3.1 |
| F % | 11 | 17 | 10 | 29 | 7.5 | 15 | 18 | 59 | 15 | ND |

Procedure for PKPD Studies with AsPC-1 Xenograft Model

Effect of inhibitors on pERK inhibition were evaluated in the AsPC-1 xenograft model using female NOD SCID (6-8 weeks old, Charles River Laboratories). Mice were implanted with AsPC-1 tumor cells in 100% Matrigel ($5\times10^6$) subcutaneously in the flank. Once tumors reached an average size of ~250 mm$^3$ mice were randomized to treatment groups and administration of test article or vehicle (5% Tween-80) was initiated. Solution formulations were prepared by addition of 5% Tween-80 to the material, and acidification to pH 2-5 using 2 N HCl. The formulations were administered using a dosing volume of 10 mL/kg. All compounds were administered by oral gavage and at pre-determined time points following compound administration, animals were euthanized, blood was collected from the jugular vein and tumors were resected and snap frozen.

Blood samples were collected in K2EDTA tubes, stored on ice, and centrifuged. Plasma was transferred to a micro titer plate and stored at −70° C. until analysis. Plasma samples were extracted using protein precipitation and analyzed by liquid chromatography separation followed by mass spec detection (LC-MS/MS), using a standard curve for each compound.

Freshly frozen tumor samples were weighed in Lysis Matrix H tubes (MP Biomedicals) and then lysed using freshly prepared complete lysis buffer (Tris Lysis Buffer, PMSF, SDS) from Phospho-ERK1/2 and Phospho/Total ERK1/2 assay kits (Meso Scale Discovery) supplemented with protease/phosphatase inhibitor (ThermoFisher). All samples were homogenized (Qiagen TissueLyser II) in Lysis Matrix H tubes for 5 mins at 4° C. then centrifugated at 15,000 rpm for 15 mins at 4° C. Lysate supernatants were collected into clean 1.5-mL centrifuge tubes for sonication. Total protein concentrations of samples were measured, and all samples were diluted using complete lysis buffer (described above) to the same concentration (>3 mg/mL). Linear ranges of total protein inputs for MSD plates were optimized via a pilot experiment for each study using dilutions of total protein lysates from 2-3 representative vehicle- and compound-treated samples. After determination of the optimized protein concentration for each MSD plate, all samples were diluted in complete lysis buffer (described above) to the optimized protein concentration followed by loading equal amounts of sample into MSD plates. Phospho-ERK1/2 and Phospho/Total ERK1/2 MSD assays were conducted following the manufacturer's protocol. Phospho-ERK signal alone or phospho-ERK and total ERK signals were measured using an MSD Plate Reader (Meso Scale Discovery). Relative phospho-ERK signal for each sample was calculated according to manufacturer's protocol, including background and total ERK normalization steps. Percent phospho-ERK levels were calculated by normalizing the relative phospho-ERK signal for each sample to the average relative phospho-ERK signal for all vehicle control samples per timepoint.

Figure 2:
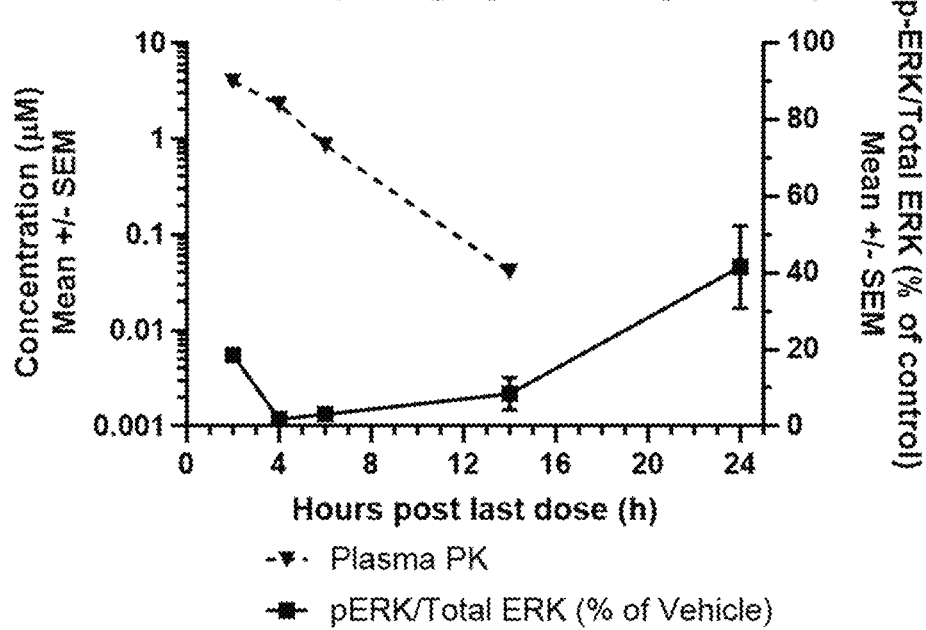
FIG. 2 is a graphical representation showing a PKPD study with respect to Ex-2.
Figure 3:
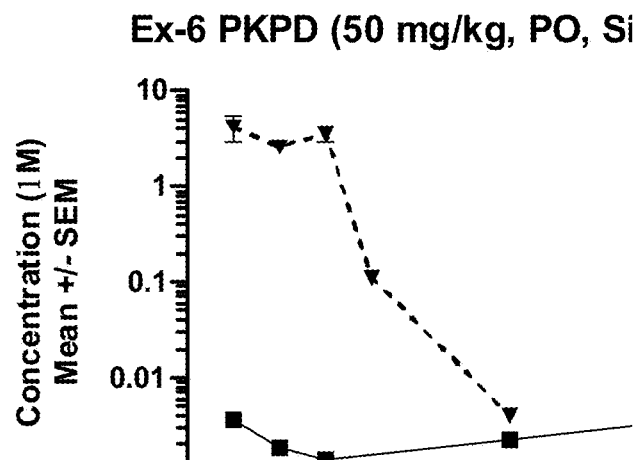
FIG. 3 is a graphical representation showing a PKPD study with respect to Ex-6.

The results of PKPD studies with Ex-1, Ex-2, and Ex-6 are shown in FIGS. 1, 2, and 3, respectively.

Procedure for 14-Day Efficacy Studies with AsPC-1 Xenograft Model

AsPC-1 cell line was obtained from the American Type Culture Collection and cultured in recommended medium. All animal experimental procedures were approved by Merck's Institutional Animal Care and Use Committee (IACUC) prior to conduct. During the study, the care and use of animals was conducted in accordance with the regulations of the Association for Assessment and Accreditation of Laboratory Animal Care (AAALAC). Female NOD SCID mice, 6-8 weeks of age, were purchased from Charles River Laboratories (Wilmington, MA) and were maintained in a pathogen-free environment. All animals received food and water ad libitum. Animals were inoculated subcutaneously in the lower right flank with 5×10E6 AsPC-1 cells (100% Matrigel, Corning, 356237). Tumor volume measurements were determined using the formula $0.5\times L\times W^2$ in which L refers to length and W refers to width of each tumor. Resultant tumors were grown to approximately 250 mm$^3$ in size before initiating treatment. Mice were randomized to treatment groups (10 mice/group) and treated with test article or vehicle (5% Tween-80). Test articles were prepared by addition of 5% Tween-80 to the material, and acidification to pH 2-5 using 2 N HCl. The formulations were administered using a dosing volume of 10 mL/kg. All compounds were administered by oral gavage twice in a day for 14 days. Tumors and body weights were measured twice times per week.

Figure 4:
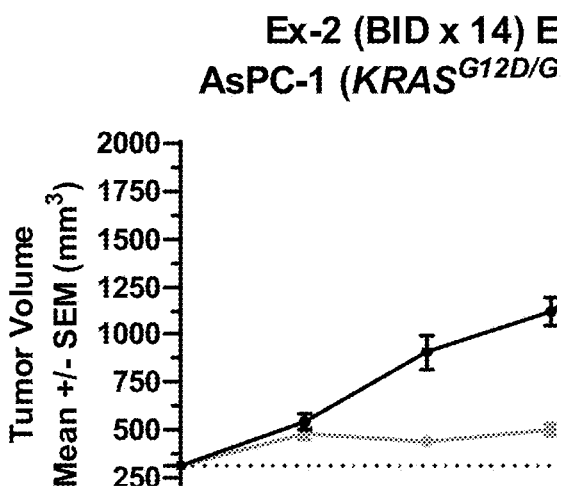
FIG. 4 is a graphical representation showing a 14-day efficacy study with respect to Ex-2.
Figure 5:
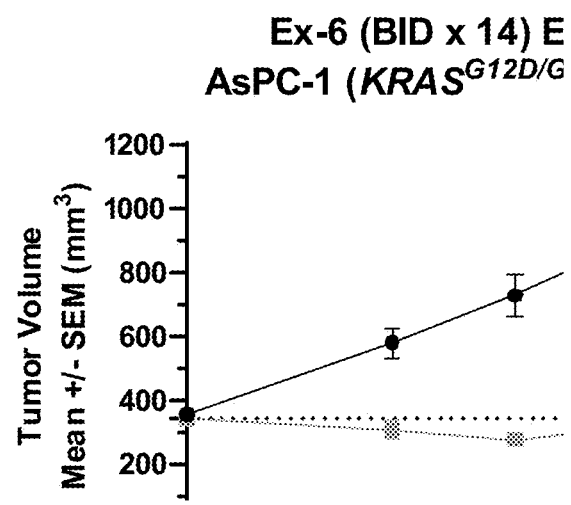
FIG. 5 is a graphical representation showing a 14-day efficacy study with respect to Ex-6.

The results of 14-day efficacy studies with Ex-2 and Ex-6 are shown in FIGS. 4 and 5, respectively.

Sequences

Recombinant Human KRAS G12C

SEQ ID NO: 1

GLNDIFEAQKIEWHETEYKLVVVGACGVGKSALTIQLIQNHFVDEYDPTI

EDSYRKQVVIDGETSLLDILDTAGQEEYSAMRDQYMRTGEGFLLVFAINN

TKSFEDIHHYREQIKRVKDSEDVPMVLVGNKSDLPSRTVDTKQAQDLARS

YGIPFIETSAKTRQGVDDAFYTLVREIRKHKEK

Recombinant Human KRAS G12D

SEQ ID NO: 2

GLNDIFEAQKIEWHETEYKLVVVGADGVGKSALTIQLIQNHFVDEYDPTI

EDSYRKQVVIDGETCLLDILDTAGQEEYSAMRDQYMRTGEGFLCVFAINN

TKSFEDIHHYREQIKRVKDSEDVPMVLVGNKCDLPSRTVDTKQAQDLARS

YGIPFIETSAKTRQGVDDAFYTLVREIRKHKEK

Recombinant Human KRAS G12V

SEQ ID NO: 3

GLNDIFEAQKIEWHETEYKLVVVGAVGVGKSALTIQLIQNHFVDEYDPTI

EDSYRKQVVIDGETCLLDILDTAGQEEYSAMRDQYMRTGEGFLCVFAINN

TKSFEDIHHYREQIKRVKDSEDVPMVLVGNKCDLPSRTVDTKQAQDLARS

YGIPFIETSAKTRQGVDDAFYTLVREIRKHKEK

Recombinant Human KRAS G13D

SEQ ID NO: 4

GLNDIFEAQKIEWHETEYKLVVVGAGDVGKSALTIQLIQNHFVDEYDPTI

EDSYRKQVVIDGETCLLDILDTAGQEEYSAMRDQYMRTGEGFLCVFAINN

TKSFEDIHHYREQIKRVKDSEDVPMVLVGNKCDLPSRTVDTKQAQDLARS

YGIPFIETSAKTRQGVDDAFYTLVREIRKHKEK

Recombinant Human HRAS WT

SEQ ID NO: 5

GGGGSHMTEYKLVVVGAGGVGKSALTIQLIQNHFVDEYDPTIEDSYRKQV

VIDGETCLLDILDTAGQEEYSAMRDQYMRTGEGFLCVFAINNTKSFEDIH

QYREQIKRVKDSDDVPMVLVGNKCDLAARTVESRQAQDLARSYGIPYIET

SAKTRQGVEDAFYTLVREIRQH

Recombinant Human NRAS WT
SEQ ID NO: 6
GGGGMTEYKLVVVGAGGVGKSALTIQLIQNHFVDEYDPTIEDSYRKQVVI
DGETCLLDILDTAGQEEYSAMRDQYMRTGEGFLCVFAINNSKSFADINLY
REQIKRVKDSDDVPMVLVGNKCDLPTRTVDTKQAHELAKSYGIPFIETSA
KTRQGVEDAFYTLVREIRQYRMKKLN Recombinant Human SOS1 Protein
SEQ ID NO: 7
MGSSHHHHHHSGENLYFQGSSGLNDIFEAQKIEWHESSEEQMRLPSADVY
RFAEPDSEENIIFEENMQPKAGIPIIKAGTVIKLIERLTYHMYADPNFVR
TFLTTYRSFCKPQELLSLIIERFEIPEPEPTEADRIAIENGDQPLSAELK
RFRKEYIQPVQLRVLNVCRHWVEHHFYDFERDAYLLQRMEEFIGTVRGKA
MKKWVESITKIIQRKKIARDNGPGHNITFQSSPPTVEWHISRPGHIETFD
LLTLHPIEIARQLTLLESDLYRAVQPSELVGSVWTKEDKEINSPNLLKMI
RHTTNLTLWFEKCIVETENLEERVAVVSRIIEILQVFQELNNFNGVLEVV
SAMNSSPVYRLDHTFEQIPSRQKKILEEAHELSEDHYKKYLAKLRSINPP
CVPFFGIYLTNILKTEEGNPEVLKRHGKELINFSKRRKVAEITGEIQQYQ
NQPYCLRVESDIKRFFENLNPMGNSMEKEFTDYLFNKSLEIEPRNPKPLP
RFPKKYSYPLKSPGVRPSNPRPGT Recombinant Human KRAS WT
SEQ ID NO: 8
GGGGTEYKLVVVGAGGVGKSALTIQLIQNHFVDEYDPTIEDSYRKQVVID
GETCLLDILDTAGQEEYSAMRDQYMRTGEGFLCVFAINNTKSFEDIHHYR
EQIKRVKDSEDVPMVLVGNKCDLPSRTVDTKQAQDLARSYGIPFIETSAK
TRQGVDDAFYTLVREIRKHKEK Recombinant Human KRAS G12A
SEQ ID NO: 9
GLNDIFEAQKIEWHETEYKLVVVGAAGVGKSALTIQLIQNHFVDEYDPTI
EDSYRKQVVIDGETCLLDILDTAGQEEYSAMRDQYMRTGEGFLCVFAINN
TKSFEDIHHYREQIKRVKDSEDVPMVLVGNKCDLPSRTVDTKQAQDLARS
YGIPFIETSAKTRQGVDDAFYTLVREIRKHKEK Recombinant Human KRAS G12S
SEQ ID NO: 10
GLNDIFEAQKIEWHETEYKLVVVGASGVGKSALTIQLIQNHFVDEYDPTI
EDSYRKQVVIDGETCLLDILDTAGQEEYSAMRDQYMRTGEGFLCVFAINN
TKSFEDIHHYREQIKRVKDSEDVPMVLVGNKCDLPSRTVDTKQAQDLARS
YGIPFIETSAKTRQGVDDAFYTLVREIRKHKEK Recombinant Human KRAS G12R
SEQ ID NO: 11
GLNDIFEAQKIEWHETEYKLVVVGARGVGKSALTIQLIQNHFVDEYDPTI
EDSYRKQVVIDGETCLLDILDTAGQEEYSAMRDQYMRTGEGFLCVFAINN
TKSFEDIHHYREQIKRVKDSEDVPMVLVGNKCDLPSRTVDTKQAQDLARS
YGIPFIETSAKTRQGVDDAFYTLVREIRKHKEK Recombinant Human KRAS Q61H
SEQ ID NO: 12
GLNDIFEAQKIEWHETEYKLVVVGAGGVGKSALTIQLIQNHFVDEYDPTI
EDSYRKQVVIDGETCLLDILDTAGHEEYSAMRDQYMRTGEGFLCVFAINN
TKSFEDIHHYREQIKRVKDSEDVPMVLVGNKCDLPSRTVDTKQAQDLARS
YGIPFIETSAKTRQGVDDAFYTLVREIRKHKEK

---

SEQUENCE LISTING

```
Sequence total quantity: 12
SEQ ID NO: 1            moltype = AA  length = 183
FEATURE                 Location/Qualifiers
source                  1..183
                        mol_type = protein
                        organism = synthetic construct
SEQUENCE: 1
GLNDIFEAQK IEWHETEYKL VVVGACGVGK SALTIQLIQN HFVDEYDPTI EDSYRKQVVI   60
DGETSLLDIL DTAGQEEYSA MRDQYMRTGE GFLLVFAINN TKSFEDIHHY REQIKRVKDS  120
EDVPMVLVGN KSDLPSRTVD TKQAQDLARS YGIPFIETSA KTRQGVDDAF YTLVREIRKH  180
KEK                                                                183

SEQ ID NO: 2            moltype = AA  length = 183
FEATURE                 Location/Qualifiers
source                  1..183
                        mol_type = protein
                        organism = synthetic construct
SEQUENCE: 2
GLNDIFEAQK IEWHETEYKL VVVGADGVGK SALTIQLIQN HFVDEYDPTI EDSYRKQVVI   60
DGETCLLDIL DTAGQEEYSA MRDQYMRTGE GFLCVFAINN TKSFEDIHHY REQIKRVKDS  120
EDVPMVLVGN KCDLPSRTVD TKQAQDLARS YGIPFIETSA KTRQGVDDAF YTLVREIRKH  180
KEK                                                                183

SEQ ID NO: 3            moltype = AA  length = 183
FEATURE                 Location/Qualifiers
source                  1..183
                        mol_type = protein
                        organism = synthetic construct
SEQUENCE: 3
GLNDIFEAQK IEWHETEYKL VVVGAVGVGK SALTIQLIQN HFVDEYDPTI EDSYRKQVVI   60
```

```
DGETCLLDIL DTAGQEEYSA MRDQYMRTGE GFLCVFAINN TKSFEDIHHY REQIKRVKDS    120
EDVPMVLVGN KCDLPSRTVD TKQAQDLARS YGIPFIETSA KTRQGVDDAF YTLVREIRKH    180
KEK                                                                 183

SEQ ID NO: 4            moltype = AA  length = 183
FEATURE                 Location/Qualifiers
source                  1..183
                        mol_type = protein
                        organism = synthetic construct
SEQUENCE: 4
GLNDIFEAQK IEWHETEYKL VVVGAGDVGK SALTIQLIQN HFVDEYDPTI EDSYRKQVVI     60
DGETCLLDIL DTAGQEEYSA MRDQYMRTGE GFLCVFAINN TKSFEDIHHY REQIKRVKDS    120
EDVPMVLVGN KCDLPSRTVD TKQAQDLARS YGIPFIETSA KTRQGVDDAF YTLVREIRKH    180
KEK                                                                 183

SEQ ID NO: 5            moltype = AA  length = 172
FEATURE                 Location/Qualifiers
source                  1..172
                        mol_type = protein
                        organism = synthetic construct
SEQUENCE: 5
GGGGSHMTEY KLVVVGAGGV GKSALTIQLI QNHFVDEYDP TIEDSYRKQV VIDGETCLLD     60
ILDTAGQEEY SAMRDQYMRT GEGFLCVFAI NNTKSFEDIH QYREQIKRVK DSDDVPMVLV    120
GNKCDLAART VESRQADLA RSYGIPYIET SAKTRQGVED AFYTLVREIR QH             172

SEQ ID NO: 6            moltype = AA  length = 176
FEATURE                 Location/Qualifiers
source                  1..176
                        mol_type = protein
                        organism = synthetic construct
SEQUENCE: 6
GGGGMTEYKL VVVGAGGVGK SALTIQLIQN HFVDEYDPTI EDSYRKQVVI DGETCLLDIL     60
DTAGQEEYSA MRDQYMRTGE GFLCVFAINN SKSFADINLY REQIKRVKDS DDVPMVLVGN    120
KCDLPTRTVD TKQAHELAKS YGIPFIETSA KTRQGVEDAF YTLVREIRQY RMKKLN        176

SEQ ID NO: 7            moltype = AA  length = 524
FEATURE                 Location/Qualifiers
source                  1..524
                        mol_type = protein
                        organism = synthetic construct
SEQUENCE: 7
MGSSHHHHHH SGENLYFQGS SGLNDIFEAQ KIEWHESSEE QMRLPSADVY RFAEPDSEEN     60
IIFEENMQPK AGIPIIKAGT VIKLIERLTY HMYADPNFVR TFLTTYRSFC KPQELLSLII    120
ERFEIPEPEP TEADRIAIEN GDQPLSAELK RFRKEYIQPV QLRVLNVCRH WVEHHFYDFE    180
RDAYLLQRME EFIGTVRGKA MKKWVESITK IIQRKKIARD NGPGHNITFQ SSPPTVEWHI    240
SRPGHIETFD LLTLHPIEIA RQLTLLESDL YRAVQPSELV GSVWTKEDKE INSPNLLKMI    300
RHTTNLTLWF EKCIVETENL EERVAVVSRI IEILQVFQEL NNFNGVLEVV SAMNSSPVYR    360
LDHTFEQIPS RQKKILEEAH ELSEDHYKKY LAKLRSINPP CVPFFGIYLT NILKTEEGNP    420
EVLKRHGKEL INFSKRRKVA EITGEIQQYQ NQPYCLRVES DIKRFFENLN PMGNSMEKEF    480
TDYLFNKSLE IEPRNPKPLP RFPKKYSYPL KSPGVRPSNP RPGT                     524

SEQ ID NO: 8            moltype = AA  length = 172
FEATURE                 Location/Qualifiers
source                  1..172
                        mol_type = protein
                        organism = synthetic construct
SEQUENCE: 8
GGGGTEYKLV VVGAGGVGKS ALTIQLIQNH FVDEYDPTIE DSYRKQVVID GETCLLDILD     60
TAGQEEYSAM RDQYMRTGEG FLCVFAINNT KSFEDIHHYR EQIKRVKDSE DVPMVLVGNK    120
CDLPSRTVDT KQAQDLARSY GIPFIETSAK TRQGVDDAFY TLVREIRKHK EK            172

SEQ ID NO: 9            moltype = AA  length = 183
FEATURE                 Location/Qualifiers
source                  1..183
                        mol_type = protein
                        organism = synthetic construct
SEQUENCE: 9
GLNDIFEAQK IEWHETEYKL VVVGAAGVGK SALTIQLIQN HFVDEYDPTI EDSYRKQVVI     60
DGETCLLDIL DTAGQEEYSA MRDQYMRTGE GFLCVFAINN TKSFEDIHHY REQIKRVKDS    120
EDVPMVLVGN KCDLPSRTVD TKQAQDLARS YGIPFIETSA KTRQGVDDAF YTLVREIRKH    180
KEK                                                                 183

SEQ ID NO: 10           moltype = AA  length = 183
FEATURE                 Location/Qualifiers
source                  1..183
                        mol_type = protein
                        organism = synthetic construct
SEQUENCE: 10
GLNDIFEAQK IEWHETEYKL VVVGASGVGK SALTIQLIQN HFVDEYDPTI EDSYRKQVVI     60
```

```
DGETCLLDIL DTAGQEEYSA MRDQYMRTGE GFLCVFAINN TKSFEDIHHY REQIKRVKDS    120
EDVPMVLVGN KCDLPSRTVD TKQAQDLARS YGIPFIETSA KTRQGVDDAF YTLVREIRKH    180
KEK                                                                 183

SEQ ID NO: 11           moltype = AA  length = 183
FEATURE                 Location/Qualifiers
source                  1..183
                        mol_type = protein
                        organism = synthetic construct
SEQUENCE: 11
GLNDIFEAQK IEWHETEYKL VVVGARGVGK SALTIQLIQN HFVDEYDPTI EDSYRKQVVI     60
DGETCLLDIL DTAGQEEYSA MRDQYMRTGE GFLCVFAINN TKSFEDIHHY REQIKRVKDS    120
EDVPMVLVGN KCDLPSRTVD TKQAQDLARS YGIPFIETSA KTRQGVDDAF YTLVREIRKH    180
KEK                                                                 183

SEQ ID NO: 12           moltype = AA  length = 183
FEATURE                 Location/Qualifiers
source                  1..183
                        mol_type = protein
                        organism = synthetic construct
SEQUENCE: 12
GLNDIFEAQK IEWHETEYKL VVVGAGGVGK SALTIQLIQN HFVDEYDPTI EDSYRKQVVI     60
DGETCLLDIL DTAGHEEYSA MRDQYMRTGE GFLCVFAINN TKSFEDIHHY REQIKRVKDS    120
EDVPMVLVGN KCDLPSRTVD TKQAQDLARS YGIPFIETSA KTRQGVDDAF YTLVREIRKH    180
KEK                                                                 183
```

We claim:

1. A compound of:

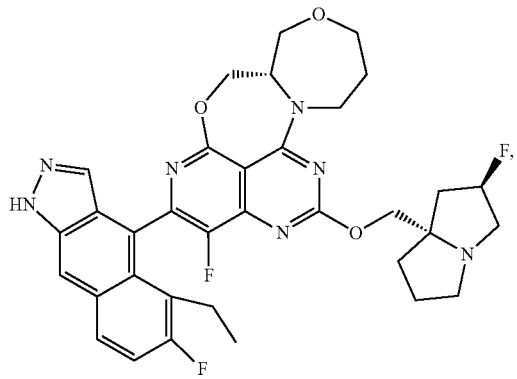

(III)

or a pharmaceutically acceptable salt thereof.

2. A compound of:

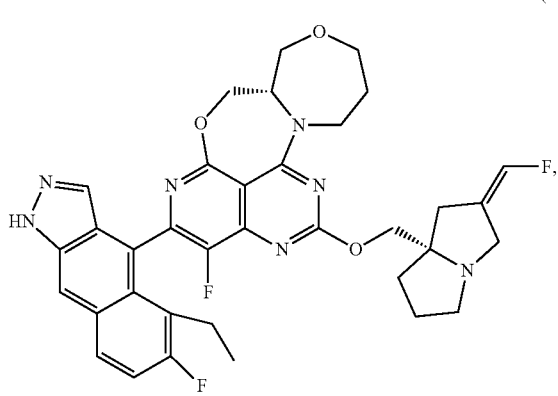

(IV)

or a pharmaceutically acceptable salt thereof.

3. A compound of:

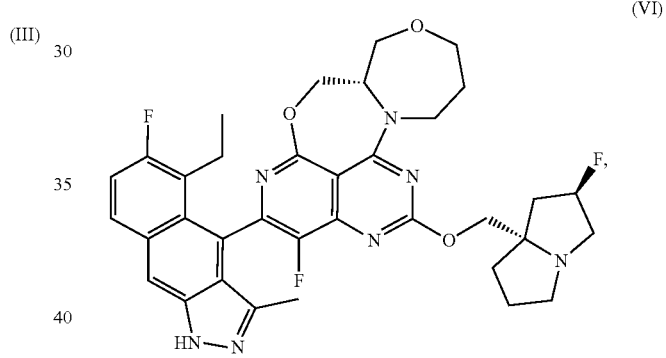

(VI)

or a pharmaceutically acceptable salt thereof.

4. A compound of:

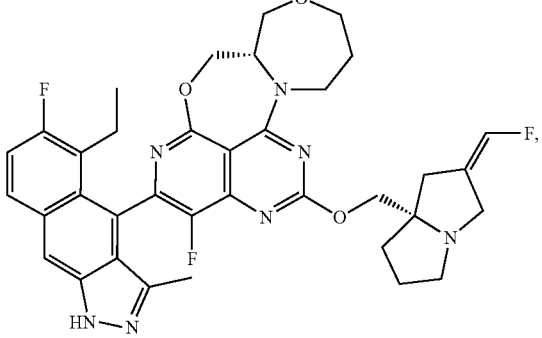

(VII)

or a pharmaceutically acceptable salt thereof.

5. A pharmaceutical composition comprising the compound of claim 1 or the pharmaceutically acceptable salt thereof, and a pharmaceutically acceptable carrier.

6. A pharmaceutical composition comprising the compound of claim 2 or the pharmaceutically acceptable salt thereof, and a pharmaceutically acceptable carrier.

7. A pharmaceutical composition comprising the compound of claim 3 or the pharmaceutically acceptable salt thereof, and a pharmaceutically acceptable carrier.

8. A pharmaceutical composition comprising the compound of claim 4 or the pharmaceutically acceptable salt thereof, and a pharmaceutically acceptable carrier.

9. A pharmaceutical composition comprising the compound of claim 1 or the pharmaceutically acceptable salt thereof, an additional anti-cancer agent, and a pharmaceutically acceptable carrier.

10. A pharmaceutical composition comprising the compound of claim 2 or the pharmaceutically acceptable salt thereof, an additional anti-cancer agent, and a pharmaceutically acceptable carrier.

11. A pharmaceutical composition comprising the compound of claim 3 or the pharmaceutically acceptable salt thereof, an additional anti-cancer agent, and a pharmaceutically acceptable carrier.

12. A pharmaceutical composition comprising the compound of claim 4 or the pharmaceutically acceptable salt thereof, an additional anti-cancer agent, and a pharmaceutically acceptable carrier.

13. A method of treating cancer comprising inhibiting at least one of KRAS-G12D protein, KRAS-G12C protein, KRAS-G12V protein, and KRAS-G13D protein by administering a therapeutically effective amount of the compound of claim 1, or the pharmaceutically acceptable salt thereof, to a subject in need of such treatment.

14. A method of treating cancer comprising inhibiting at least one of KRAS-G12D protein, KRAS-G12C protein, KRAS-G12V protein, and KRAS-G13D protein by administering a therapeutically effective amount of the compound of claim 2, or the pharmaceutically acceptable salt thereof, to a subject in need of such.

15. A method of treating cancer comprising inhibiting at least one of KRAS-G12D protein, KRAS-G12C protein, KRAS-G12V protein, and KRAS-G13D protein by administering a therapeutically effective amount of the compound of claim 3, or the pharmaceutically acceptable salt thereof, to a subject in need of such treatment.

16. A method of treating cancer comprising inhibiting at least one of KRAS-G12D protein, KRAS-G12C protein, KRAS-G12V protein, and KRAS-G13D protein by administering a therapeutically effective amount of the compound of claim 4, or the pharmaceutically acceptable salt thereof, to a subject in need of such treatment.

17. A method of treating cancer comprising administering a therapeutically effective amount of the compound of claim 1, or the pharmaceutically acceptable salt thereof, to a subject in need of such treatment.

18. A method of treating cancer comprising administering a therapeutically effective amount of the compound of claim 2, or the pharmaceutically acceptable salt thereof, to a subject in need of such treatment.

19. A method of treating cancer comprising administering a therapeutically effective amount of the compound of claim 3, or the pharmaceutically acceptable salt thereof, to a subject in need of such treatment.

20. A method of treating cancer comprising administering a therapeutically effective amount of the compound of claim 4, or the pharmaceutically acceptable salt thereof, to a subject in need of such treatment.

21. The method of claim 17, further comprising administering an additional active agent to the subject.

22. The method of claim 18, further comprising administering an additional active agent to the subject.

23. The method of claim 19, further comprising administering an additional active agent to the subject.

24. The method of claim 20, further comprising administering an additional active agent to the subject.

25. The compound of claim 1, wherein the compound is:

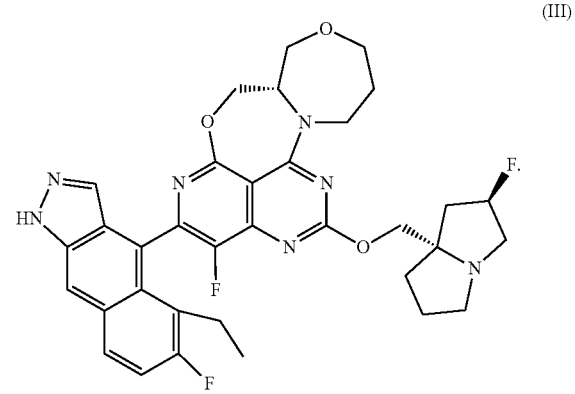 [SMILES: CCc1c(F)ccc2cc3[nH]ncc3c(-c3nc4c5c(nc(OC[C@@]67CCCN6C[C@H](F)C7)nc5c3F)N3CCCOC[C@H]3CO4)c12]

(III)

26. The compound of claim 2, wherein the compound is:

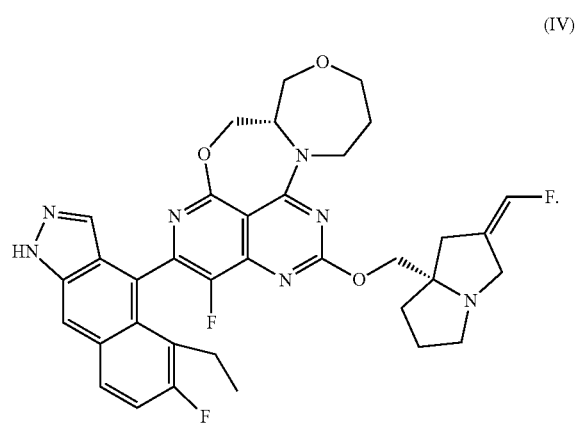 [SMILES: CCc1c(F)ccc2cc3[nH]ncc3c(-c3nc4c5c(nc(OC[C@@]67CCCN6C/C(=C\F)C7)nc5c3F)N3CCCOC[C@H]3CO4)c12]

(IV)

27. The compound of claim 3, wherein the compound is:

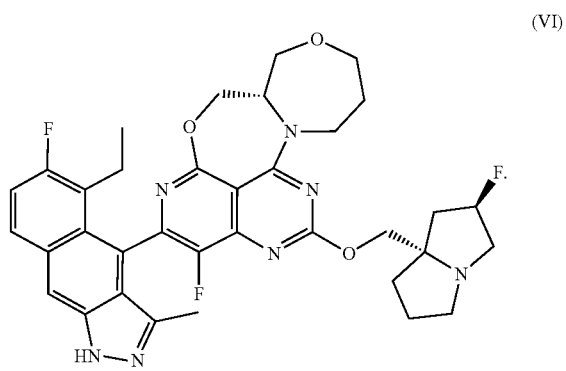 [SMILES: CCc1c(F)ccc2cc3[nH]nc(C)c3c(-c3nc4c5c(nc(OC[C@@]67CCCN6C[C@H](F)C7)nc5c3F)N3CCCOC[C@H]3CO4)c12]

(VI)

28. The compound of claim 4, wherein the compound is:
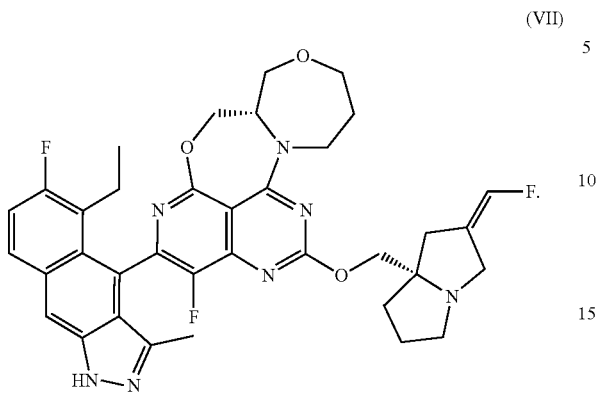
(VII)